May 8, 1945.   G. B. SAYRE   2,375,252
AUTOMATIC MOLDING APPARATUS
Filed Dec. 2, 1939   17 Sheets-Sheet 2
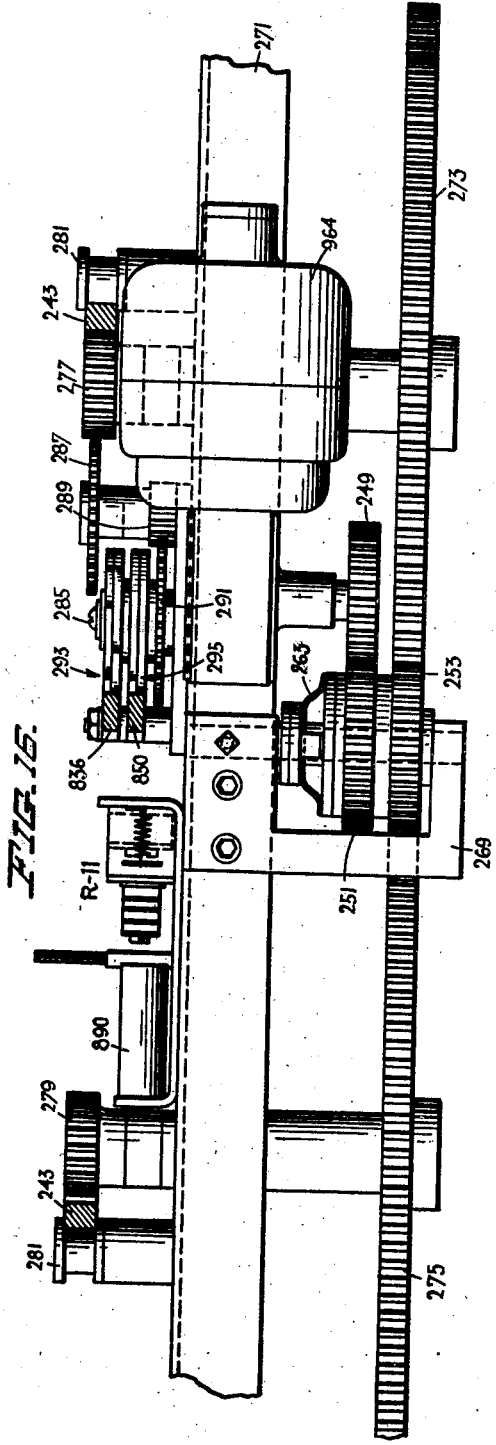
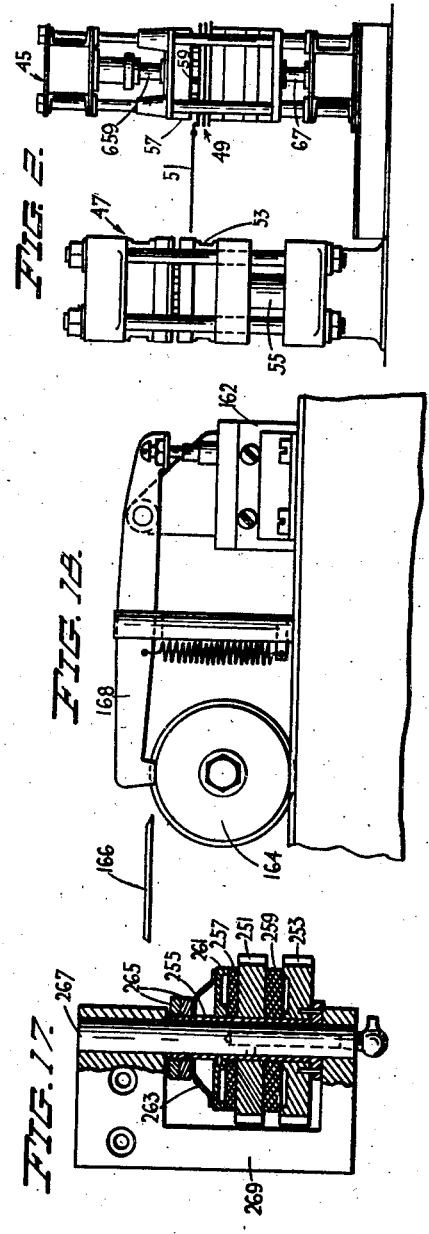
INVENTOR
GORDON B. SAYRE
ATTORNEY May 8, 1945.  G. B. SAYRE  2,375,252
AUTOMATIC MOLDING APPARATUS
Filed Dec. 2, 1939   17 Sheets-Sheet 3
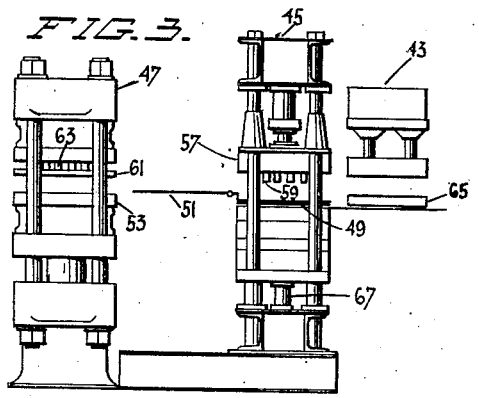
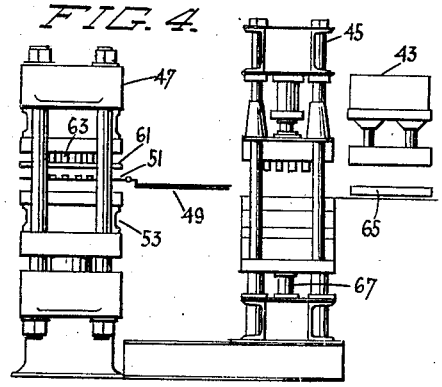
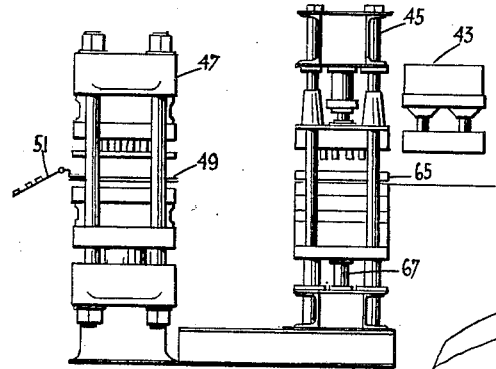
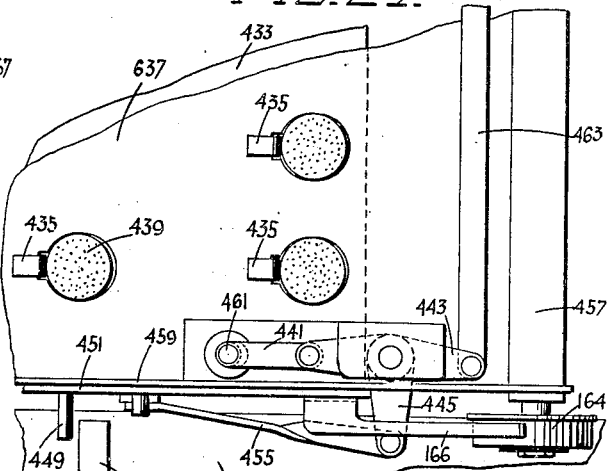
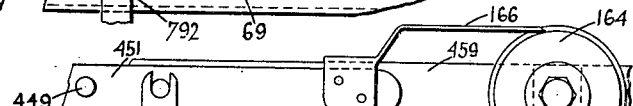
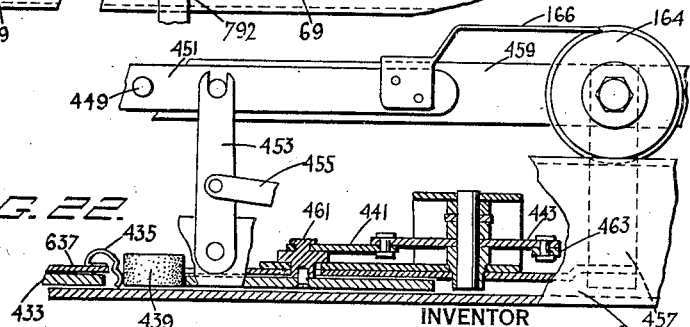
INVENTOR
GORDON B. SAYRE
BY James & Franklin
ATTORNEY

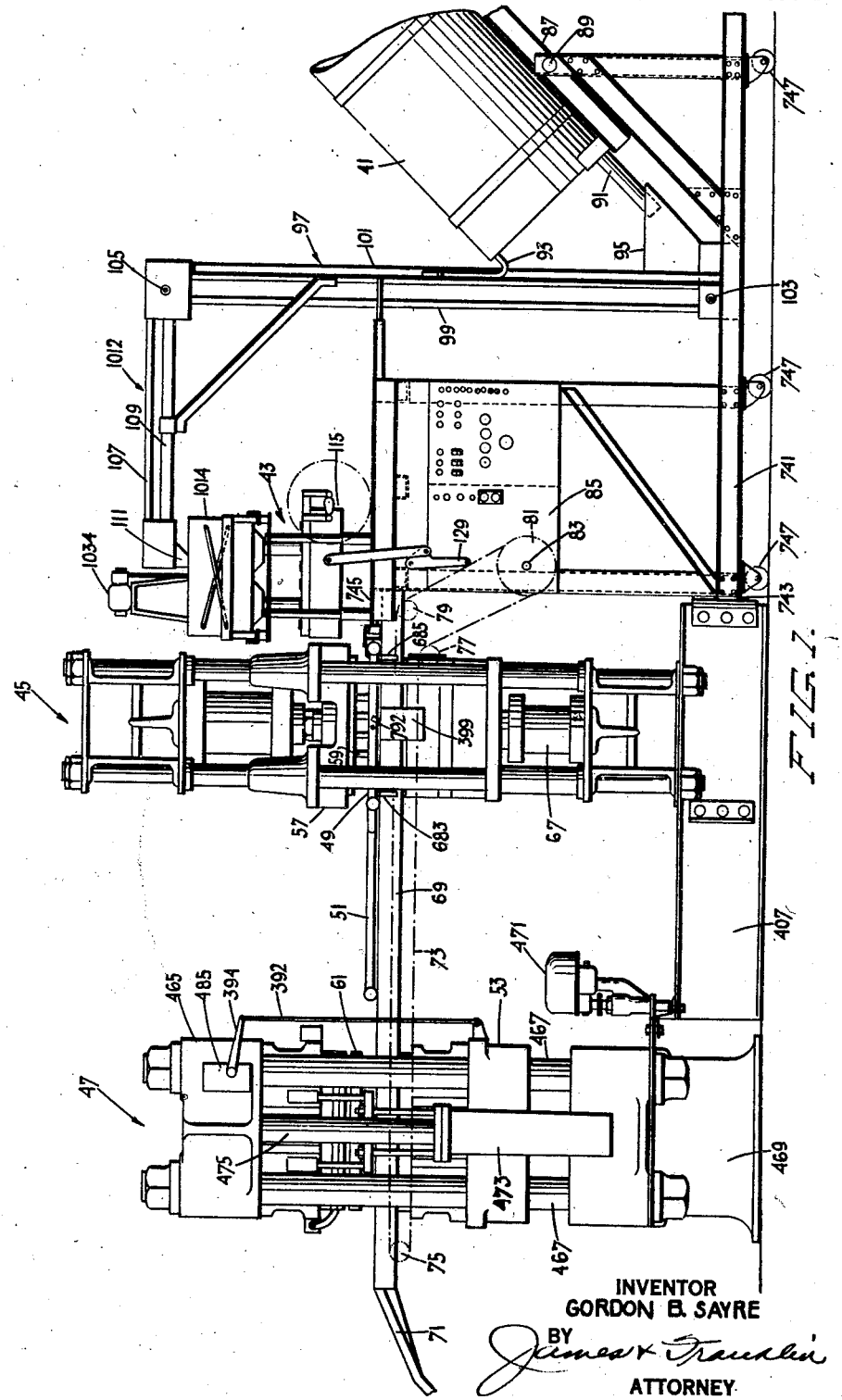

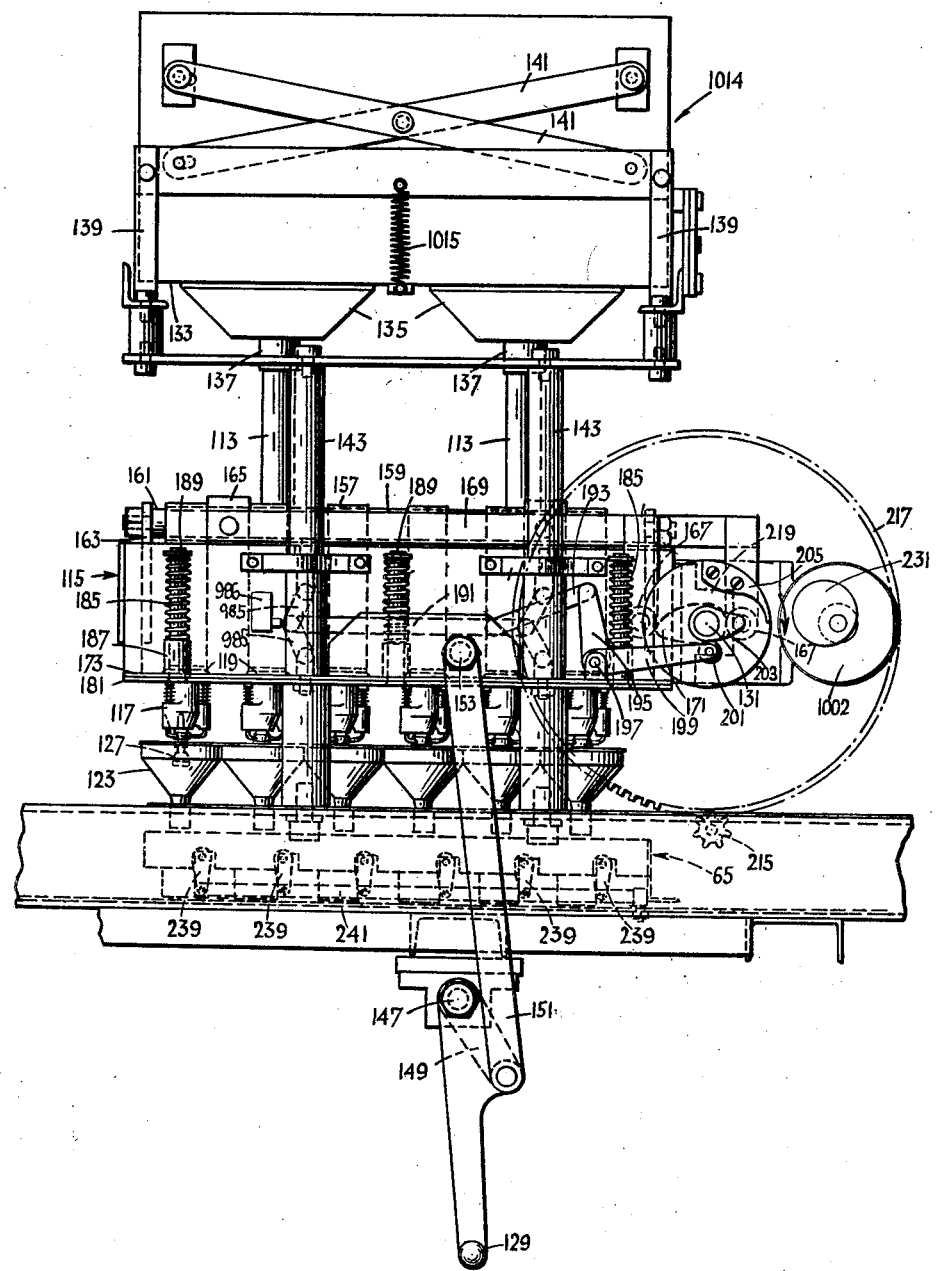

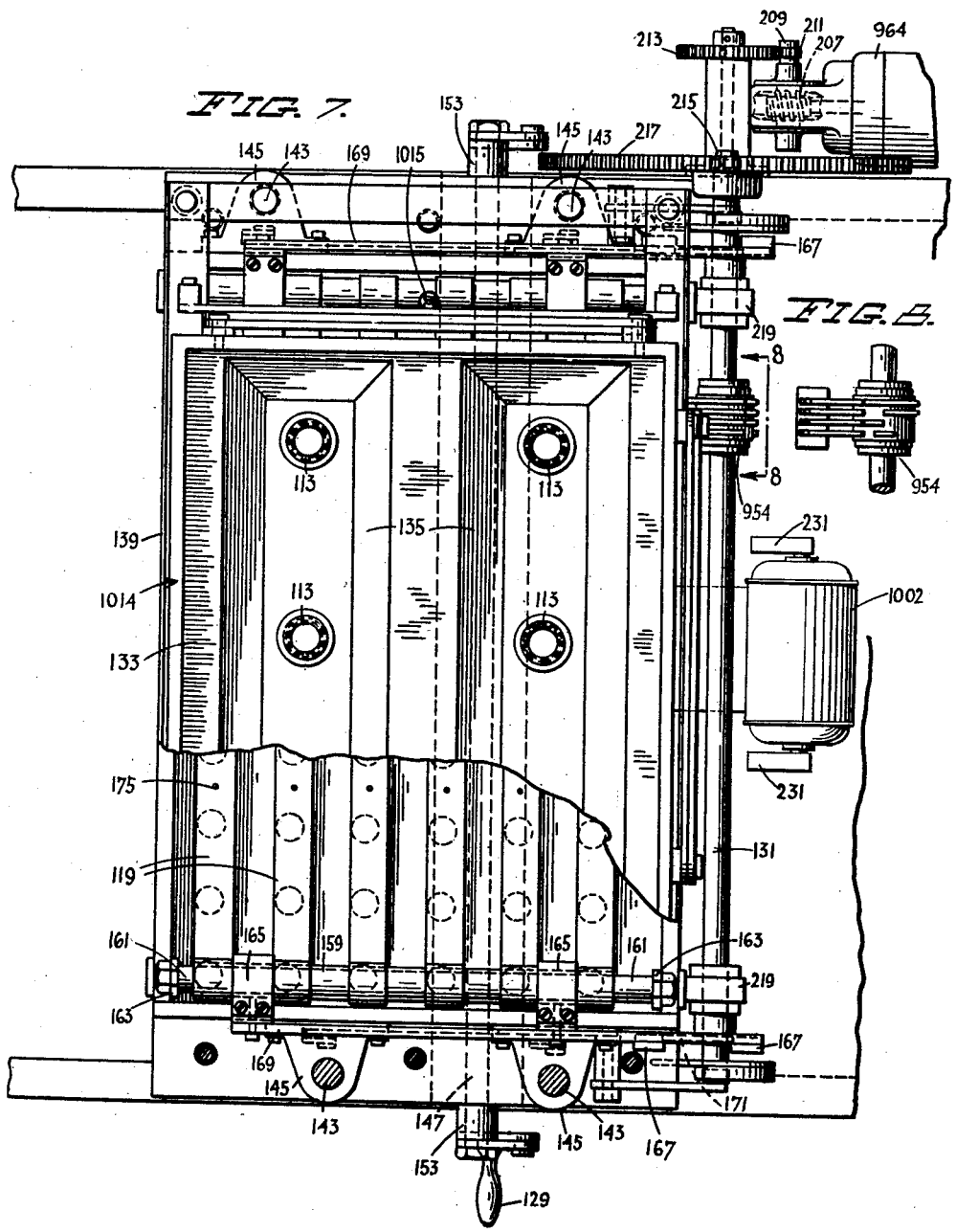

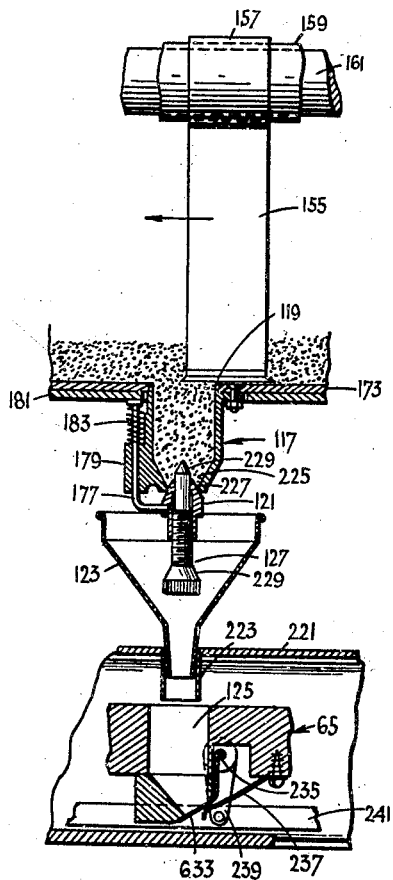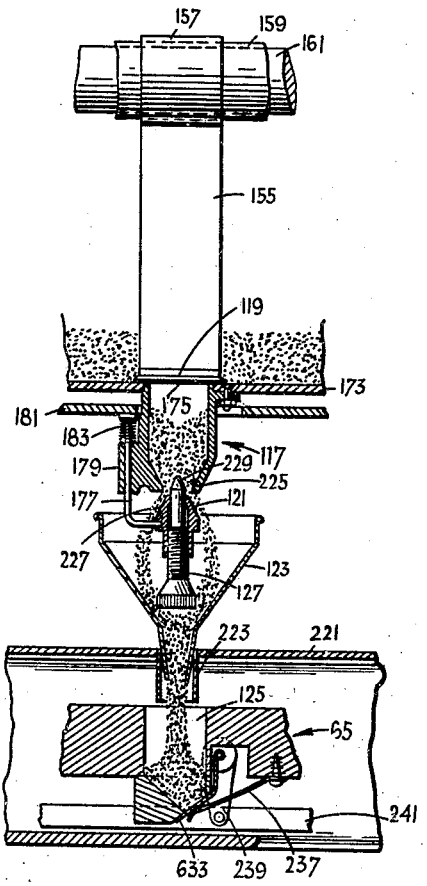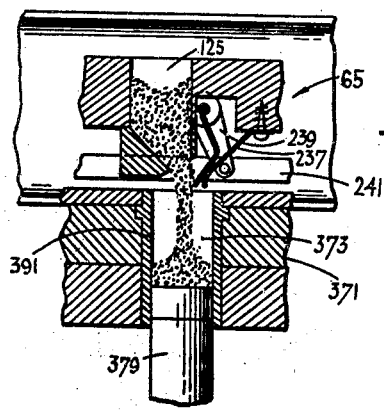

May 8, 1945.　　　　　G. B. SAYRE　　　　　2,375,252
AUTOMATIC MOLDING APPARATUS
Filed Dec. 2, 1939　　　17 Sheets-Sheet 7
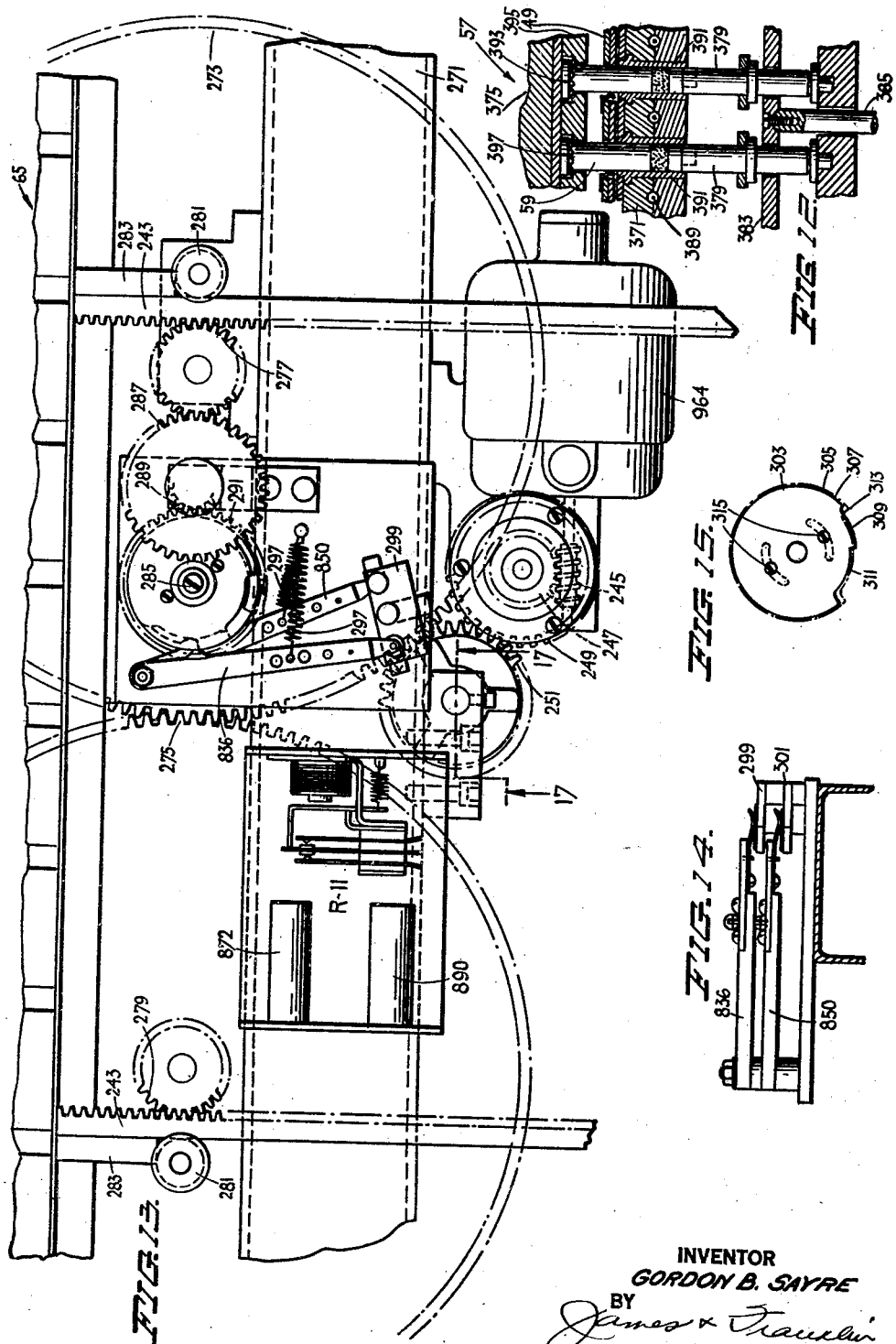
INVENTOR
*GORDON B. SAYRE*
BY
ATTORNEY

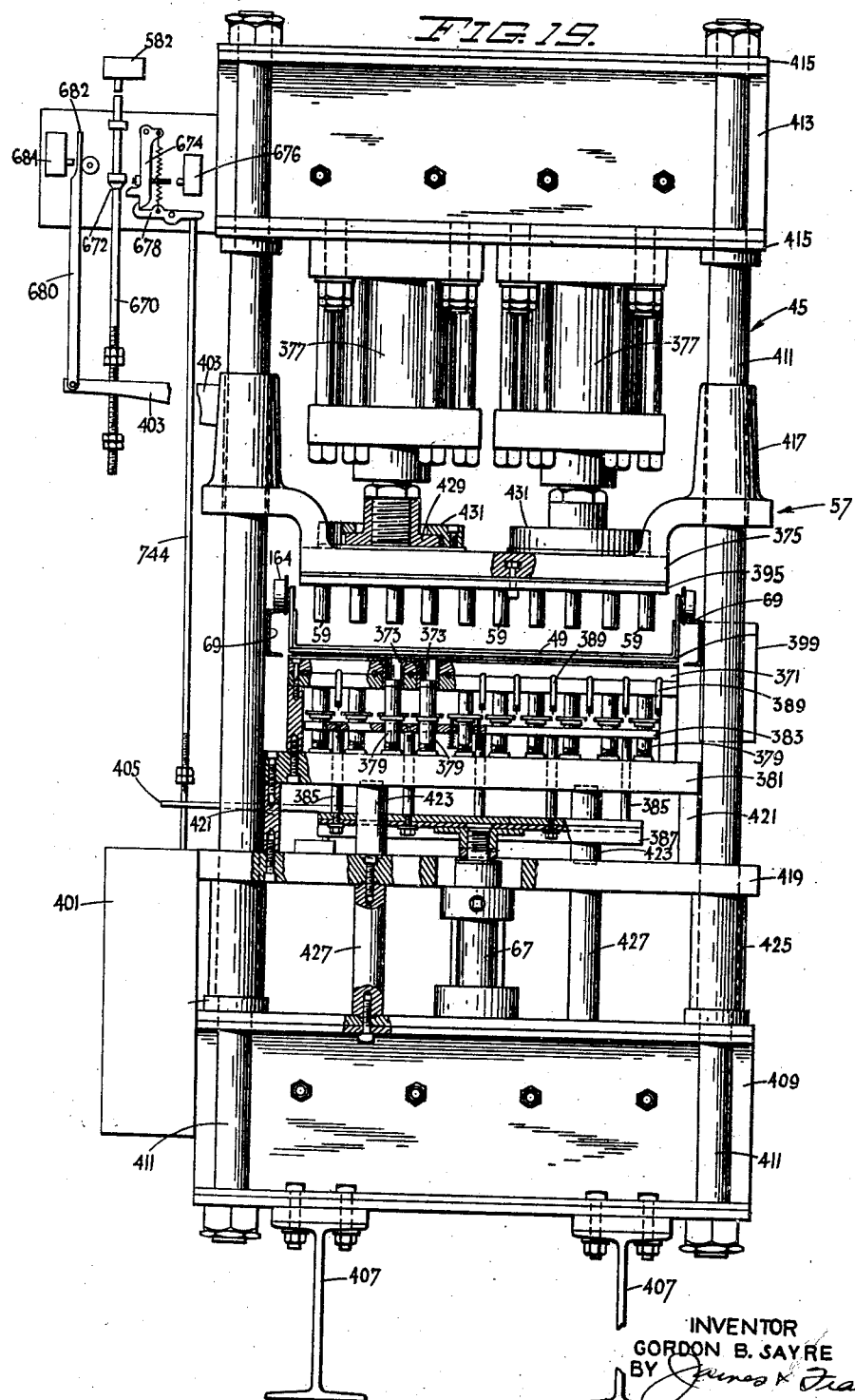

May 8, 1945.   G. B. SAYRE   2,375,252
AUTOMATIC MOLDING APPARATUS
Filed Dec. 2, 1939   17 Sheets-Sheet 9

INVENTOR
GORDON B. SAYRE
BY
ATTORNEY

May 8, 1945.  G. B. SAYRE  2,375,252
AUTOMATIC MOLDING APPARATUS
Filed Dec. 2, 1939   17 Sheets-Sheet 10
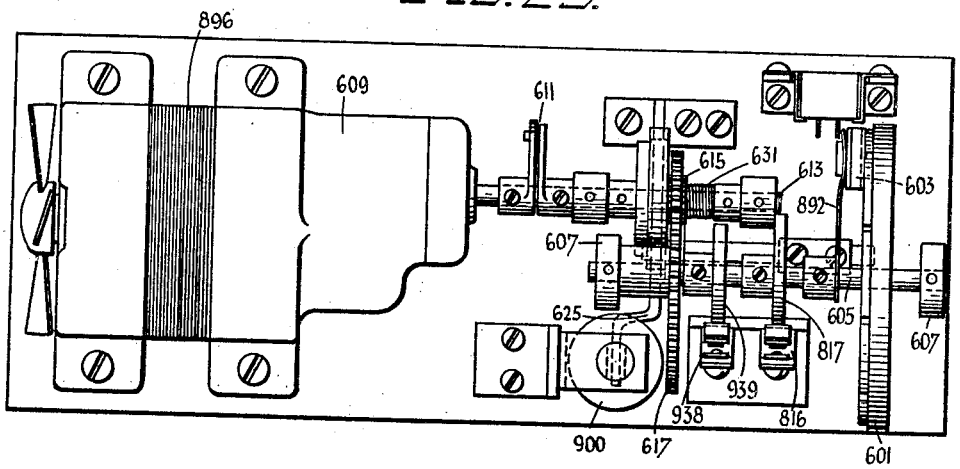
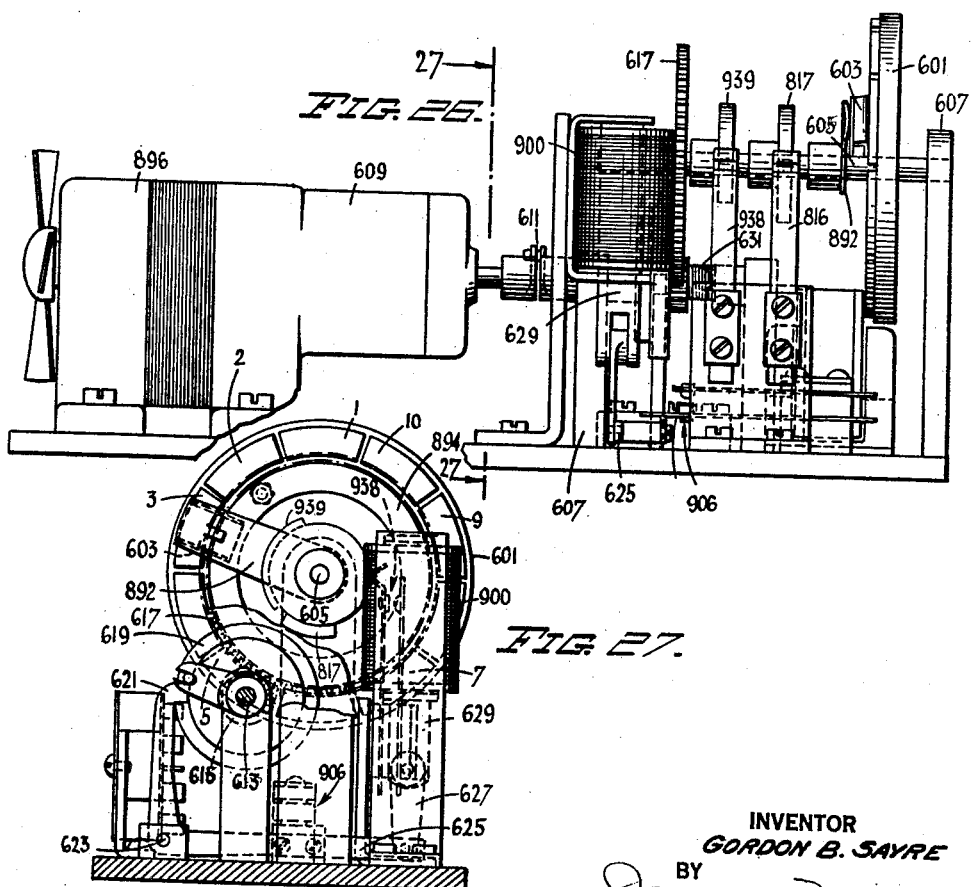
INVENTOR
GORDON B. SAYRE
BY
ATTORNEY

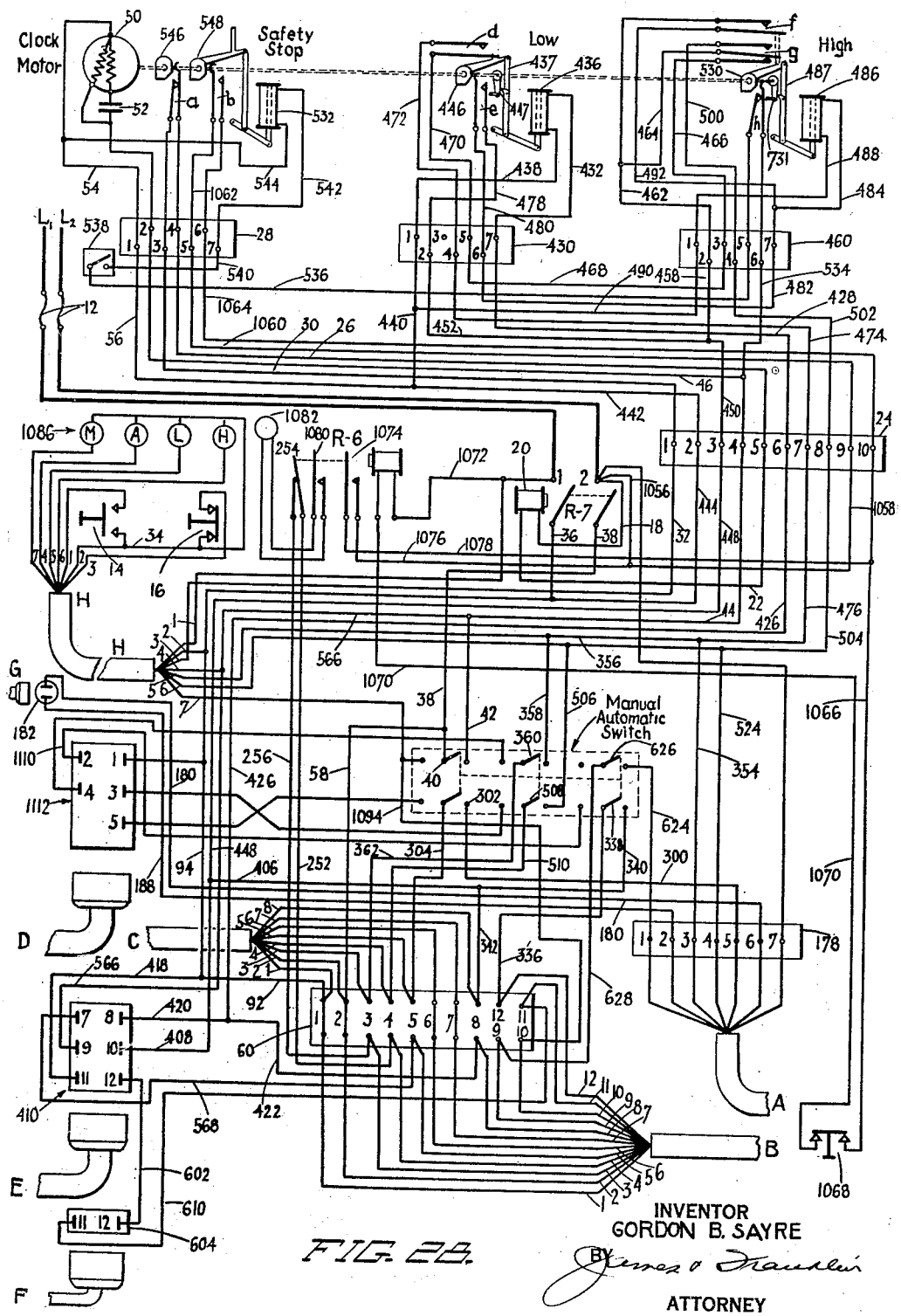

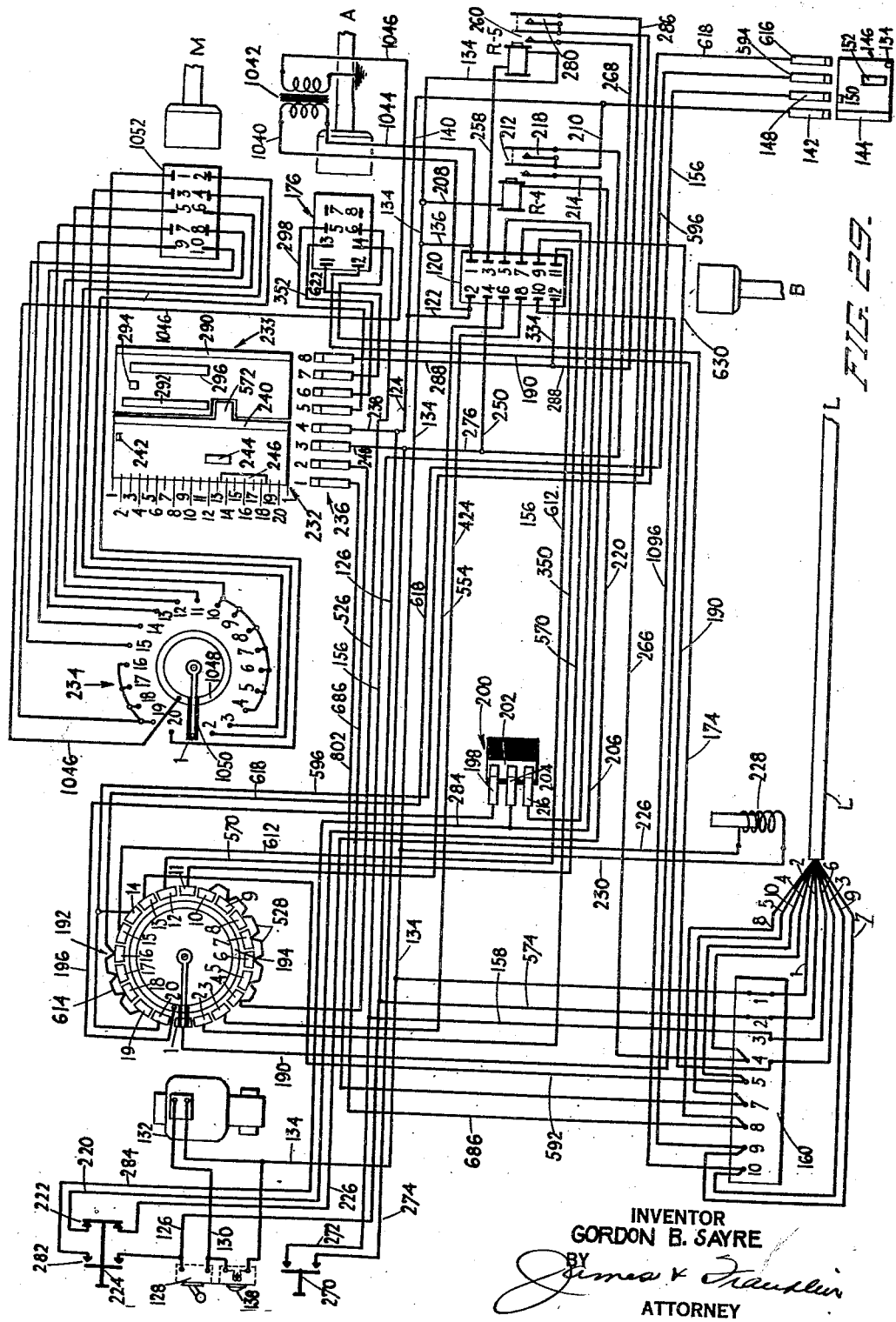

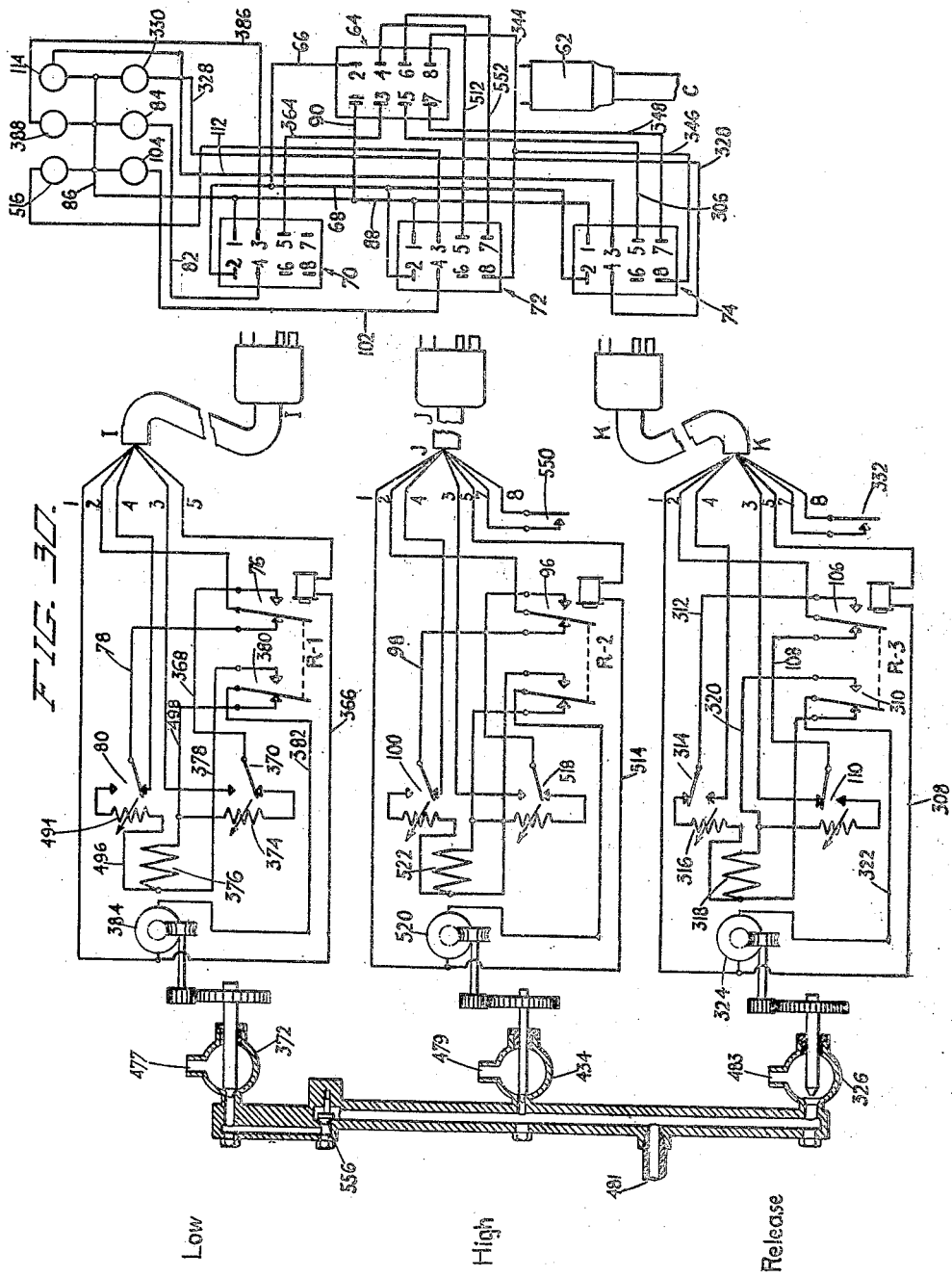

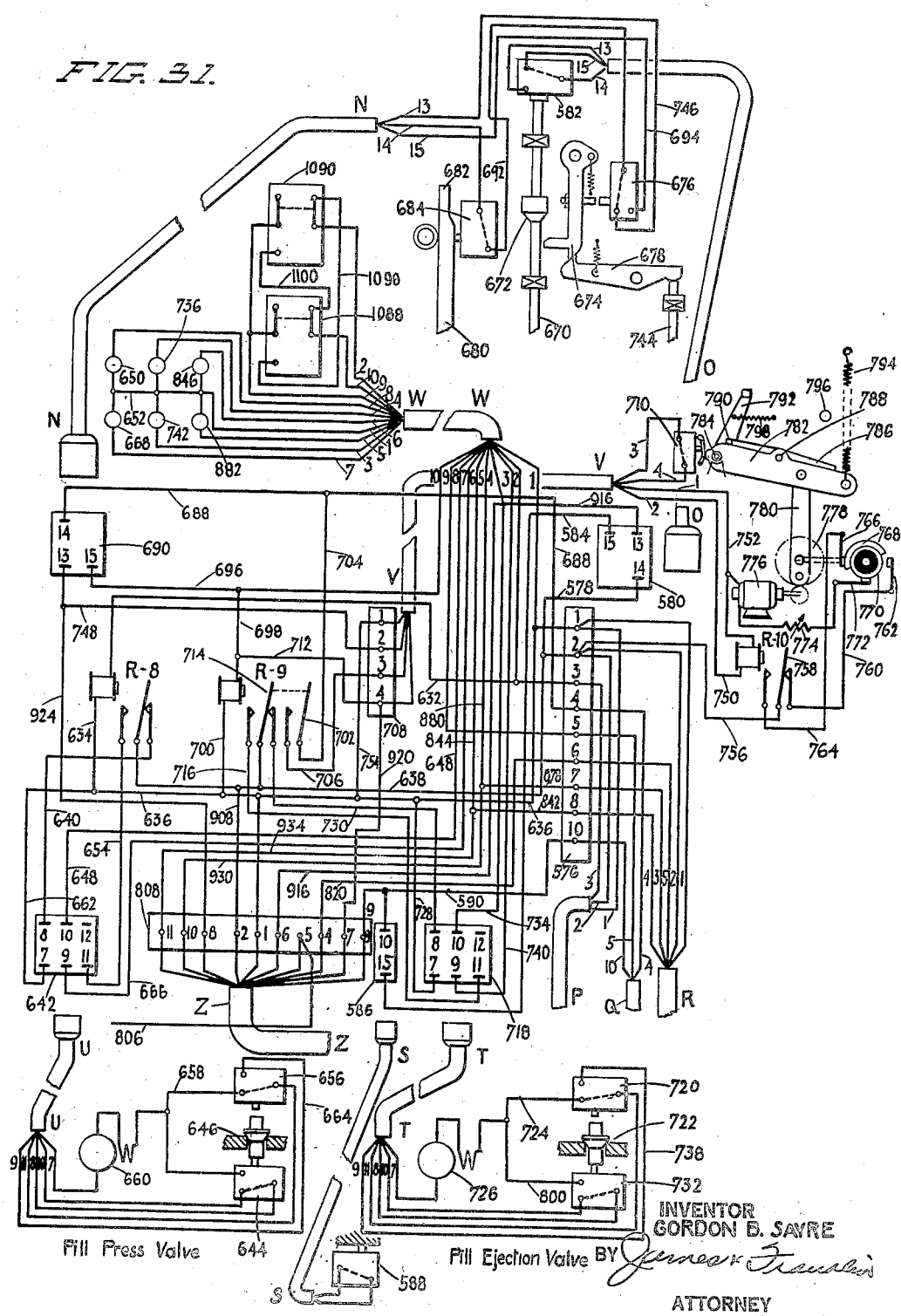

May 8, 1945.　　　　G. B. SAYRE　　　　2,375,252
AUTOMATIC MOLDING APPARATUS
Filed Dec. 2, 1939　　17 Sheets-Sheet 16
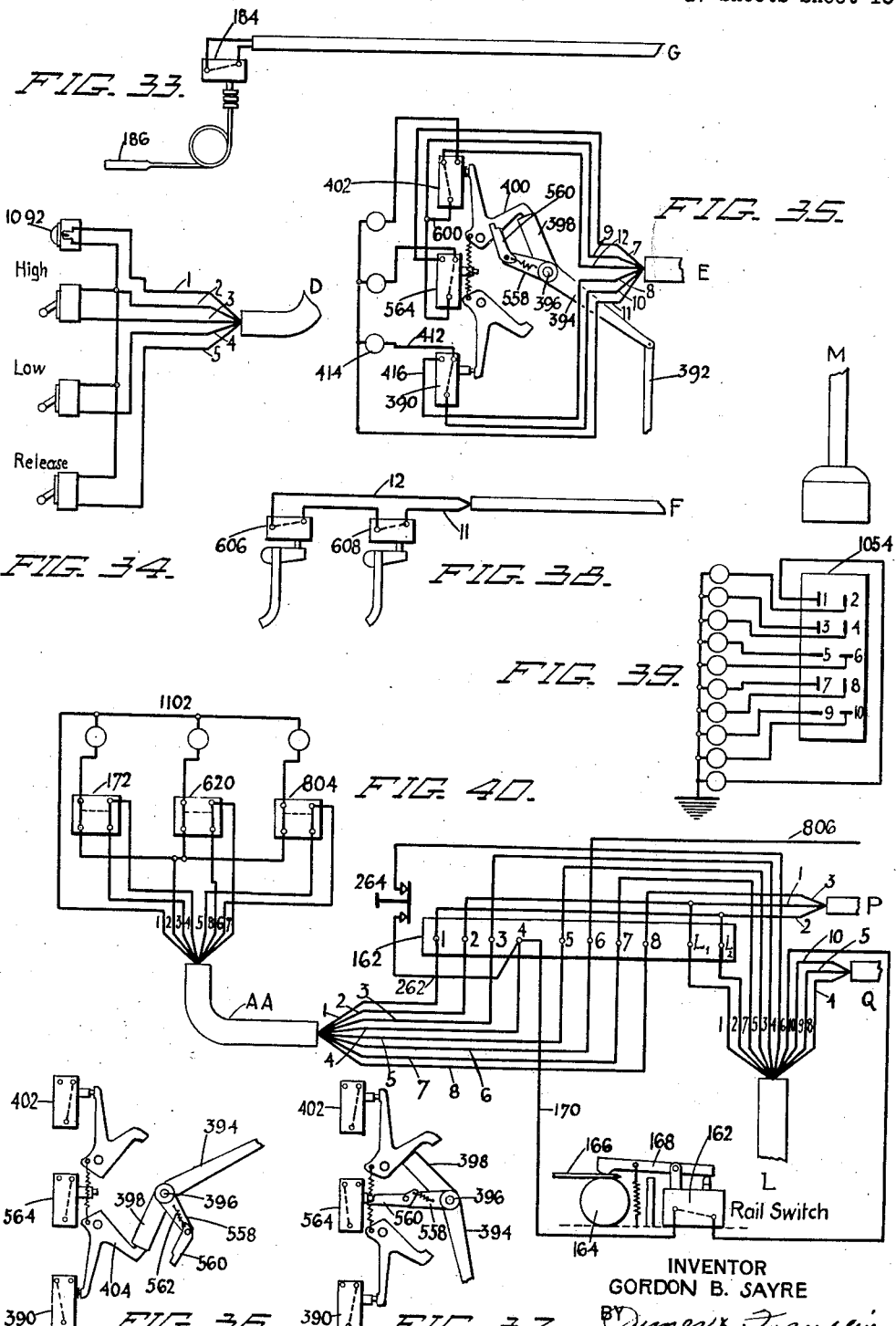

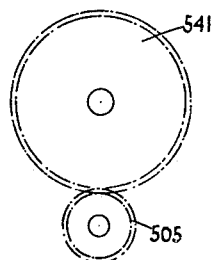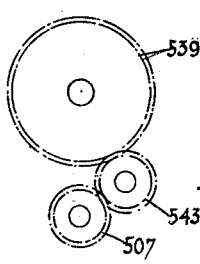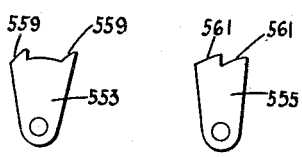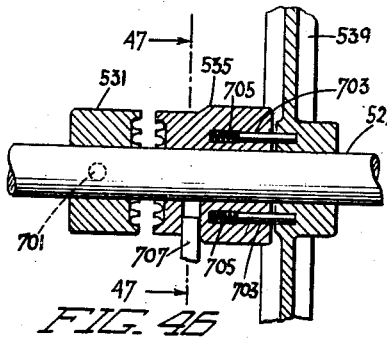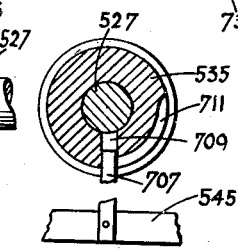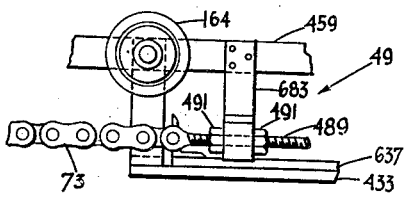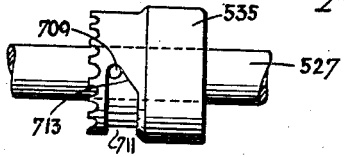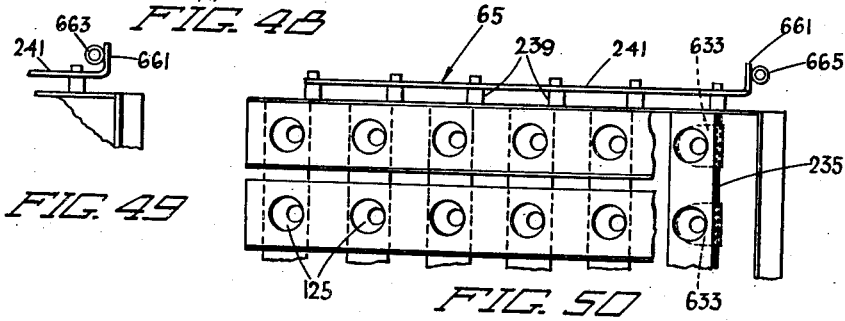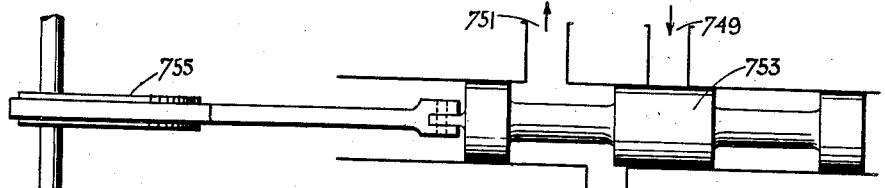

Patented May 8, 1945

2,375,252

UNITED STATES PATENT OFFICE 2,375,252

AUTOMATIC MOLDING APPARATUS

Gordon B. Sayre, Boonton, N. J., assignor to Boonton Molding Company, Boonton, N. J., a corporation of New Jersey Application December 2, 1939, Serial No. 307,268

77 Claims. (Cl. 18—30)

This invention relates to molding, particularly the molding of plastics.

The primary object of my invention is to generally improve the molding of plastics. A more particular object is to provide molding apparatus so fully automatic that it may be supplied with a container or barrel of molding powder at one end, and will deliver finished molded pieces at the other end, all without manual intervention of any kind.

An important object of the present invention is to provide such an apparatus which does not discard, but instead retains those elements and principles which have survived as most satisfactory in the course of decades of work with molding presses, molds, stripping mechanisms, and control valves. The press and mold designs are not radically altered, and their usual dependability and versatility are retained. Screw stem valves are retained for the main purpose because of their many advantages, but these are arranged for automatic control, in much the manner disclosed in by co-pending application, Serial No. 239,933 filed November 12, 1938, and its divisional application Serial No. 427,594, filed January 21, 1942, entitled "Automatic valve control for hydraulic press." In accordance with my invention, I provide actual clock timing for both the low and high pressure treatment in the press, and these times are readily independently adjustable at the clocks, the adjustment being made in actual time units (minutes and seconds). This is to be contrasted with conventional cam shaft timing, in which the changes are not readily made, and when made, are not independent of one another, nor in actual time units.

The invention in the particular example here illustrated is shown applied to a press carrying a large mold for a considerable number of small parts. In a general way the method in such case includes periodically simultaneously measuring out independently predetermined amounts of molding powder for each mold cavity, periodically transferring the measured amounts of powder simultaneously to an array of pill molds, and periodically compressing and heating the measured amounts of molding powder simultaneously to form a plurality of heated pills, one for each mold cavity. The array of pills is then bodily transferred to the molding press, each pill to its corresponding mold cavity, and there the pills are all simultaneously subjected to heat and pressure for a predetermined time.

Still another object of the invention centers about the formation of preforms or so-called "pills" during the transformation of the molding powder into the finished product. A plurality of pills may be made simultaneously, and the relative mass or weight of the pills may be independently adjusted for subsequent delivery to desired parts of a single large mold cavity, or to the cavities of a multiple cavity mold. This feature is broadly disclosed and claimed in my co-pending application, Serial No. 247,017, filed December 21, 1938, and entitled "Molding." This is of great value even with supposedly uniform mold cavities, for in practice they are not exactly uniform, and if the pills are dimensioned for the largest cavity then there is excessive flash and waste at all of the other cavities. In the present apparatus, each pill cavity is definitely related to a companion or mating mold cavity, and the amount of powder delivered to each pill cavity is independently adjustable to provide exactly the correct amount of molding material. This reduces the task of finishing the product for removal of the flash or fin.

The pill press is heated in order to preheat the pills during manufacture. Preheating is a critical matter, for if the pill is cured far enough to stiffen before reaching the molding press, it will not mold properly, and may even damage the mold. Inasmuch as the present apparatus is entirely automatic and operates in accordance with a definite time cycle, there is no danger attached to preheating of the pills, and this preheating may be carried much further than would otherwise be possible. As a result the molding or curing time in the main press is greatly shortened, and this speeds up the entire operating cycle of the machine. Moreover, the finished product is of better quality, and pieces which have delicate inserts or which are too complex to be made with cold pills are readily made in the present machine. During passage from the pill press to the molding press the heated pills are relieved of pressure, and gas generated therein is freely vented, thus dispensing with the need for "bumping" or venting at the main press.

It has already been mentioned that the actual timing of the cure in the molding press is by means of clocks. However, the timing of the complete apparatus is by means of a cycle control shaft. One object of the present invention is to reconcile these apparently conflicting controls, and in accordance with my invention, the cycle control shaft is operated in step by step fashion, and at an appropriate step initiates the closing of the main press. When the press has closed the clocks take over control until the desired low and high pressure curing times have elapsed, whereupon the step by step operation of the cycle control shaft is resumed and the apparatus is again under control of the latter.

At a number of points in the operation of the apparatus the movement of a valve functions to initiate the movement of another valve or the starting of a clock or movement of the cycle control shaft. In accordance with a feature and object of the present invention the transmission of a control impulse for this purpose is in response to completion of the valve movement, and not merely starting of the valve movement. This applies to the pill press valve as well as the main press valve.

A further object of the invention is to compare the time for the complete molding cycle with a predetermined normal or maximum safe time, and for this purpose, I provide a safety-stop clock which is automatically reset at the end of each normal molding cycle, but which operates to shut down the entire apparatus if its predetermined allowed time runs out before the molding cycle is completed.

The pills are transferred from the pill press to the molding press by means of a pillboard, while the finished product stripped from the molding press falls onto a catchboard. These are preferably connected together for simultaneous movement along guides running through the presses. A further object is to minimize the necessary space between the presses, and to economize in time, and in accordance with the present invention the power unit which moves the pillboard and catchboard (which together may be called the loader), so times the movement of the loader that the pillboard is kept in the pill press during the pill molding operation, the pill press working through the pillboard.

Further objects of the invention center about the power unit for moving the loader. It is desired that this not only move the loader with a step by step movement, but also lock it in position after each step of movement. For this purpose the movement is taken through single revolution clutches having automatic locking means. The arrangement preferably includes sprocket wheels which drive chains for moving the loader, said sprocket wheels having a periphery equal to one step of movement of the loader. The sprocket shaft carries differential pinions meshing with forward and backward running differential gears freely rotatable on the sprocket shaft. The driving motor is geared to a countershaft carrying two single revolution clutches, one of which is geared to the forward running differential gear, and the other of which is reversely geared to the backward running differential gear. With this arrangement one differential gear may be run while the other remains locked, and both are locked between movements of the loader.

I have found that forcible molding of the pills against the ejection plugs creates a vacuum between the pill and the plug, causing the pill to adhere strongly to the plug. An object of the present invention is to overcome this difficulty and to provide means for dislodging the pills from the plugs. For this purpose, the lower lamination of the pillboard is made the movable lamination, and a relatively powerful motor driven means is provided to close the pillboard by moving the lower lamination. This movement then functions to dislodge the pills and to at the same time grip the same in the pillboard.

Further objects of the invention are to interlock various steps or operations of the apparatus to prevent conflict or improper sequence. One such object is to prevent the molding press from going ahead with its clock timed cycle until the pill press has finished its preceding cycle. Another object is to eliminate this requirement in the event that the pill press is not started at all, for in such case the molding cycle may continue to complete the molding of the last set of pills when the apparatus is being shut down.

Another object is to prevent the ejection of pills unless they have been adequately pressed to desired small dimension. Another object is to prevent the ejection of pills, unless the pill press has first opened. Still another object is to prevent movement of the pillboard away from the pill press until after the press has opened, and also until after the ejection plugs have been raised and again lowered out of the way of the pillboard. A further object is to prevent the ejection plugs from lowering until after the pillboard has been closed in order to dislodge the pills from the ends of the ejection plugs and to grip the pills.

Another object is to provide appropriate safety means to shut down the apparatus if the stripper mechanism at the main press fails to strip the molded pieces from the mold. This shut down is immediate with the catchboard still in the molding press.

Still another object is to shut down the apparatus if the heating means for the mold fails so that the mold gets cold, and in this case the apparatus is shut down between complete molding cycles.

Another object of the invention is to shut down the apparatus in the event that the pillboard is not retracted fully into proper position in the pill press, for otherwise the pill press might smash the pillboard and the main press might smash the catchboard.

Another object is to insure not only retraction of the pillboard, but also that the pillboard is in open condition before the pill press cycle proceeds.

Further objects of the invention center about the powder measuring apparatus. This is in the main disclosed in my co-pending application, Serial No. 272,769, filed May 10, 1939, and entitled "Apparatus for measuring, preforming and molding plastics." In accordance with a feature and object of the present invention, the powder measurer is provided with weight control means for automatically starting and stopping a conveyor delivering powder to the hopper of the powder measurer, in order to keep the powder in the hopper between desired limits.

A further object is to prevent discrimination in the amount of fine and coarse particles of molding powder reaching the measuring cups, and to this end I provide a mixing means or stirrer in the powder hopper.

Still another object is to obtain accurate measurement by insuring complete filling and complete emptying of the measuring cups, and for this purpose the measuring cups are provided with a vibrator, preferably consisting of a motor with eccentric weights thereon. The vibrator is preferably operated only during the measuring and delivery of molding powder, and I provide switch means for this purpose.

Still another object is to make the design of the apparatus adaptable to different sizes of press. The space between the guide rails is selected to fit the size of the molding press. The space between the molding press and the pill press is selected to equal the size of the catchboard and pillboard, so that the loader may be moved in equal steps through its three positions. No change is needed in the power unit, for the spacing between the sprocket wheels on the sprocket wheel shaft may be accommodated to the spacing between the guide rails, and the diameter on the sprocket wheels may be accommodated to the size of the step by step movement of the loader.

To the accomplishment of the foregoing and other objects which will hereinafter appear, my invention consists in the molding apparatus elements and their relation one to the other as hereinafter are more particularly described in the specification and sought to be defined in the claims. The specification is accompanied by drawings, in which:

Fig. 1 is a side elevation of a complete molding apparatus embodying features of my invention;

Fig. 2 (on the same sheet as Figs. 16–18) is a schematic view showing the pill press and molding press in closed condition;

Fig. 3 schematically illustrates the apparatus after the molding operation, with the pill press open and the molding press half open;

Fig. 4 schematically illustrates a later stage in the operation, with the catchboard moved into the molding press, and the latter fully opened to strip the molded pieces onto the catchboard;

Fig. 5 shows a still later stage, during discharge of the finished pieces and renewed loading of the presses for another molding cycle;

Fig. 6 is a side elevation of the powder measurer;

Fig. 7 is a partially sectioned plan view of the powder measurer;

Fig. 8 is an elevation of a detail looking in the plane of the line 8—8 of Fig. 7;

Fig. 9 is a section through one of the measuring cups during the powder measuring operation;

Fig. 10 is a similar section showing discharge of the measured powder;

Fig. 11 is a section at a pill cavity in the pill press, showing loading of the same with powder;

Fig. 12 is a fragmentary section at the pill press showing the pill pressing operation;

Fig. 13 is a plan view of the mechanism for advancing and retracting the powder carrier;

Fig. 14 is a side elevation of the limit switches associated with said mechanism;

Fig. 15 is a detail of the cams for operating the limit switches;

Fig. 16 is an end elevation of the mechanism for moving the powder carrier;

Fig. 17 is a section taken in the plane of the line 17—17 of Fig. 13;

Fig. 18 is a side elevation of a rail switch associated with the powder measurer;

Fig. 19 is a partially sectioned elevation of the pill press, taken transversely of the guide rails;

Fig. 20 (same sheet as Figs. 3–5) is a fragmentary plan view of the pillboard, showing the same in open condition at the molding press;

Fig. 21 is a fragmentary plan view showing the pillboard in closed condition at the pill press;

Fig. 22 is a partially sectioned elevation through the pillboard closing linkage of the pillboard;

Fig. 25 is a plan view of a sequence relay associated with the powder measurer;

Fig. 26 is a side elevation thereof;

Fig. 27 is a transverse section looking in the direction of the arrows 27, 27 of Fig. 26;

Figure 32:
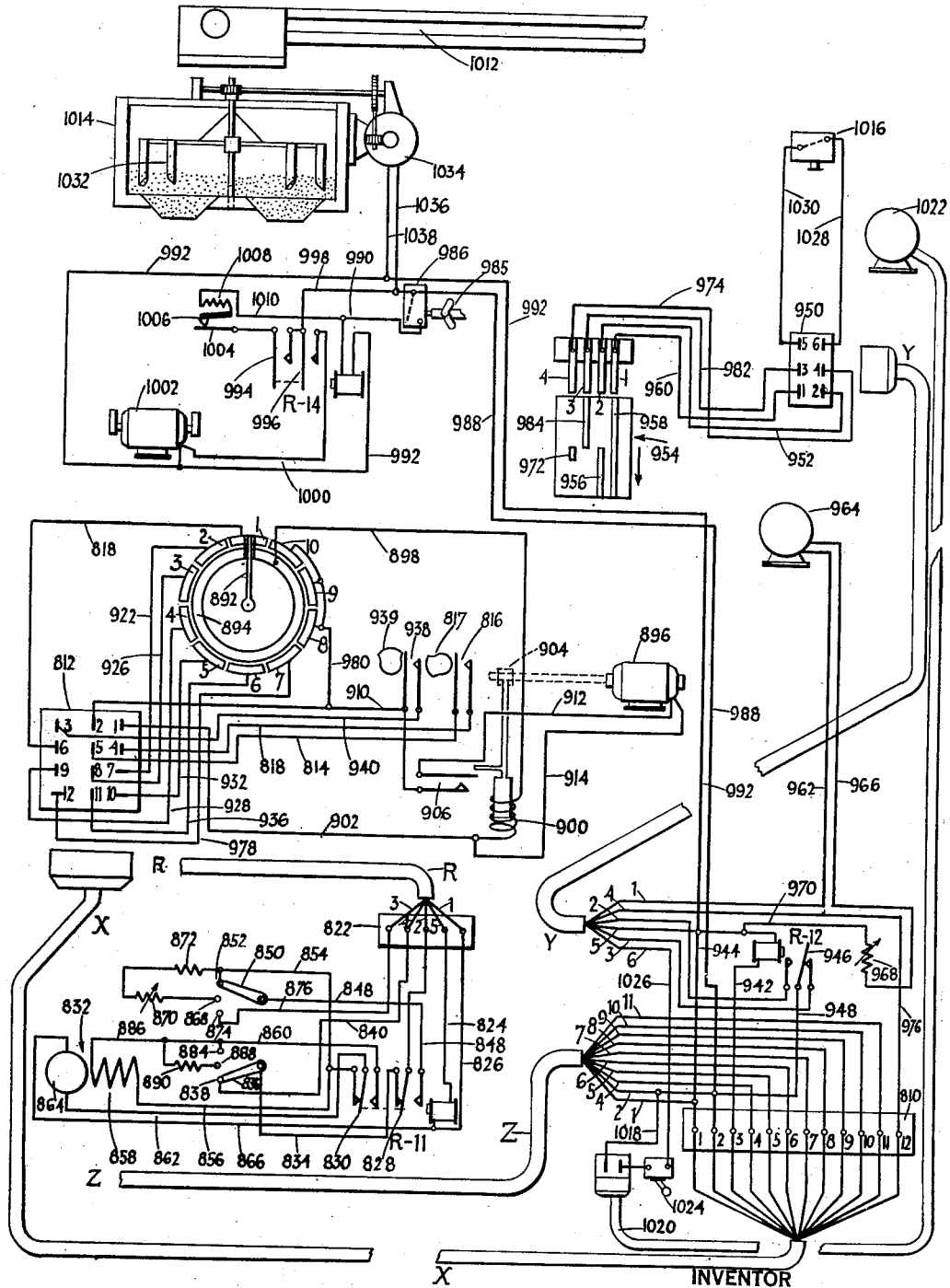

Figs. 28 through 40 together constitute a complete wiring diagram for the apparatus;

Fig. 28 shows the wiring associated with the timing clocks and control switches;

Fig. 29 shows the wiring associated with the cycle control mechanism;

Fig. 30 illustrates the wiring associated with the valves for the main molding press;

Fig. 31 shows the wiring associated with the pill press;

Fig. 32 shows the wiring associated with the powder measurer;

Figs. 33 through 40 show additional wiring details, and are further explanatory of the operation of the apparatus;

Figs. 41 and 42 are explanatory of certain forward and backward running gears used in the power unit for moving the loader;

Figs. 43 and 44 are explanatory of the clutch tripping cams mounted on the cycle shaft or main cam shaft in the power unit;

Fig. 45 is a fragmentary side elevation explanatory of the attachment of the chain to the pillboard;

Fig. 46 is a section taken in elevation through a self-locking single-revolution clutch forming a part of the power unit;

Fig. 47 is a transverse section taken in the plane of the line 47—47 of Fig. 46;

Fig. 48 is a bottom view of the driven part of the clutch, with the other parts omitted;

Figs. 49 and 50 are explanatory of the operation of the vanes of the powder carrier; and Fig. 51 is a schematic illustration of a valve used on the pill press.

Referring to the drawings, and more particularly to Fig. 1, the complete molding machine is so designed as to take a conventional barrel or container of molding powder, indicated at 41, and to transform the same into finished molded pieces which are descharged at the opposite end of the machine. The machine comprises a powder measurer generally designated 43, a pill press generally designated 45, and a main press or molding press generally designated 47. Powder is transferred from container 41 to the hopper 1014 of the powder measurer by means of a conveyor 1012. The powder in hopper 1014 is mixed by a stirrer driven by motor 1034. The measured powder is transferred from the measurer 43 to the pill press 45, by means of a powder carrier which is not visible in this figure of the drawings, but which is described later. The pills are transferred from pill press 45 to molding press 47 by means of a pillboard 49, movable along rails 69. The finished pieces, when stripped from the molding press, are deposited on a catchboard 51.

The general plan of operation may be briefly outlined with reference to the schematic showing in Figs. 3 through 5 of the drawings, and also Fig. 2 (which is grouped with Figs. 16 through 18). In Fig. 2, both presses are closed, this showing the condition of the machine during the molding operation. The pillboard 49 is in the pill press, while the catchboard 51 is between the presses. The molding press 47 closes by raising its lower platen 53, this being done by a main ram 55. The pill press is closed by lowering of its upper platen 57, which carries the force plugs 59 for compressing the pills. The upper platen 57 is forced downwardly by a main ram 659 located over the platen. The force plugs 59 operate through the openings of the pillboard 49.

At the end of the molding operation the presses open, as shown in Fig. 3. Pill press 45 opens all the way, the upper platen 57 and the force plugs 59 being elevated clear of the pillboard 49. The main press 47 opens only part way, the lower platen 53 being lowered about half way down, enough to receive the catchboard 51, but not enough to cause the stripper plate 61 to strip the molded pieces from the upper die. In the present case the machine happens to be molding bottle caps, which are molded in inverted position about the lower ends of core pins 63.

The powder carrier 65 is in its retracted position beneath the powder measurer 43. When the pill press 45 is open, appropriate ejection plugs, not visible in these figures, are raised by a suitable ejection ram received in ejection cylinder 67, and these plugs raise the pills into pillboard 49, which then closes to dislodge the pills from the ends of the plugs and to grip the pills. The pillboard and catchboard assembly or "loader" then moves to the left until catchboard 51 is in the molding press, while pillboard 49 is between the presses, as is illustrated in Fig. 4. The molding press 47 then continues to open, that is, the lower platen 53 descends further until it causes the stripper plate 61 to strip the finished pieces from core pins 63, and so dropping them onto the catchboard 51, as is shown in the drawings.

When the main press 47 is fully open the loader is advanced another step, thereby bringing the pillboard 49 into the molding press 47, as shown in Fig. 5. There the pillboard is opened to drop the pills into the mold cavities. At the same time the catchboard 51 moves through and beyond the molding press where it discharges the molded pieces. For this purpose it preferably moves onto downwardly inclined guides, which tilt the catchboard, as shown, so that the molded pieces slide off. In the meantime, the powder carrier 65 moves from the powder measurer 43 into the pill press 45, where the measured charges of powder are discharged into their respective pill cavities. The powder carrier 65 then returns to measurer 43, and the loader 49, 51 returns all the way back to the pill press 45, as shown in Fig. 3, whereupon the presses close for another molding cycle, as is illustrated in Fig. 2.

Reverting now to Fig. 1, the loader moves on guide rails 69 which pass through both presses just inside the pillars or columns thereof, and which are preferably provided with inclined ends 71. These guide rails were omitted in schematic Figs. 2 through 5 in order to more clearly show the working parts of the apparatus. The loader is moved by endless chains the ends of which are attached to the loader, one at each side of the apparatus, these being indicated by the dot and dash line 73. The chains are guided on idle or guide wheels 75, 77 and 79, and are driven by sprocket wheels 81 mounted on a sprocket wheel shaft 83 which extends entirely across the apparatus so that it may be fitted with a sprocket wheel at each end. Shaft 83 forms a part of what I term a "power unit," which is housed at 85, and the working parts of which are shown in detail in Figs. 23 and 24 of the drawings.

The pill press 45 is mounted on foundation or frame members 407 which preferably extend to and are bolted to the main press 47, in order to accurately fix the spacing between the presses. This spacing is preferably made equal to the width of the catchboard or/and pillboard, which in turn are made equal to the width of the presses (measured in the direction of the guide rails 69). In this way the loader may be intermittently moved by equal steps to bring the same to any of three positions; the first position with the pillboard in the pill press and the catchboard between the presses, as is shown in Figs. 1, 2 and 3; the second, with the catchboard in the molding press and the pillboard between the presses, as is shown in Fig. 4; and the third, with the pillboard in the molding press and the catchboard beyond the molding press, as is shown in Fig. 5. The sprocket wheel 81 for chain 73 is preferably given a periphery equal to one step of movement of the loader, so that each revolution of the sprocket wheel shaft 83 corresponds to one of the desired movements of the loader.

The barrel 41 may be the regular metal container in which molding powder is commonly shipped by manufacturers of the plastic to the various molding plants. The barrel is rested on a frame 87 which is pivoted at 89. When a new barrel is to be started the frame 87 is tilted with its right-hand end down to the floor, and the new barrel is wheeled up to and tipped onto the cradle or frame. A discharge pipe or spout 91 and a vent pipe 93 are applied to the upper end of the barrel, and the frame 87 is then tilted up to the position shown in the drawings.

The molding powder flows from the barrel through pipe 91 into a hopper 95 forming the lower end of a vertical conveyor or elevator 97. This consists of pipes 99 and 101, through which runs an endless chain, the latter being carried on sprockets mounted on shafts 103 and 105. The powder is then transferred to a horizontal conveyor 1012 which consists of pipes 107 and 109 through which runs an endless chain mounted on sprockets, one of which is carried on the aforesaid shaft 105. The powder is discharged at a spout or nozzle 111 directly into the powder hopper 1014, which forms a part of the powder measurer.

The powder measurer

The powder measurer may be described in greater detail with reference to Figs. 6 through 10 of the drawings. Referring to Fig. 6, it comprises a hopper 1014 from which the molding powder is fed by means of discharge pipes 113 to a powder box 115. A series of powder measuring chambers or "cups" 117 are disposed at the bottom of powder box 115. The supply of powder to cups 117 may be cut off at the top by suitable cut off plates or slide plates 119, best shown in Figs. 7, 9 and 10. The discharge of powder from the powder cups 117 is controlled by suitable bottom closures or valves 121. The powder is guided by funnel 123 into a registering chamber or "pocket" 125 of the powder carrier 65.

The amount of powder measured in each cup 117 may be independently adjusted. I here show a regulator screw 127, projecting into the measuring cup through valve 121. For access to the regulators 127, I elevate the powder box 115 by means of a lift handle 129 (Figs. 6 and 7). The supply pipes 113 are arranged slidably in hopper 1014, and are raised with powder box 115. The operation of cut off plates 119 and discharge valves 121 is controlled by means of a cam shaft 131 driven through appropriate reduction gearing by means of a motor 964 (Fig. 7).

Considering the arrangement in greater detail, the hopper 1014 is open at the top and comprises side walls and a bottom wall 133, shaped as indicated at 135, to form troughs leading to discharge collars 137 slidably receiving the supply pipes 113. Pipes 113 are flanged outwardly at their upper ends to limit their descent. The lower ends of pipes 13 determine the lever to which powder is filled in powder box 115. The hopper 1014 is floatingly supported within a frame 139, and is guided by crossed arms 141, the lower ends of which are secured to frame 139, and the upper ends of which are secured to hopper 1014. The weight of the hopper with its load of powder is taken by tension springs 1015, the upper ends of which are secured to frame 139, and the lower ends of which are connected to hopper 1014. In this way, the weight of the hopper may be used to control a suitable switch (1016 in Fig. 32) for automatically starting and stopping the motor of the conveyor (1022 in Fig. 32), thereby maintaining an adequate supply of molding powder in the hopper, in accordance with the rate of use of the powder.

The powder box 115 is vertically slidable on columns 143, it being connected to the columns by appropriate ears 145 (Figs. 6 and 7). Columns 143 are stepped in diameter, the lower, larger diameter portions limiting the downward movement of powder box 115. Upward movement is provided by means of the lift handle 129 secured to a shaft 147 extending from one side of the machine to the other, and said shaft 147 having arms 149 connected to links 151 extending upwardly to the powder box at 153.

The slide plates 119 are secured at their ends to vertical straps 155 (Fig. 9) the upper ends 157 of which are turned about and fixedly secured to a sleeve 159, which is slidable on a guide rod 161, carried by straps 163 (Fig. 7) projecting upwardly from powder box 115. Sleeve 159 is reciprocated by cam shaft 131. Blocks 165 are secured to sleeve 159 and are connected to one another and to cam followers 167 by means of straps 169. The cam follower rollers 167 engage a rapid motion cam 171 (Figs. 6 and 7), for positive motion in both directions. This mechanism is duplicated at both ends of cam shaft 131.

Referring now to Figs. 9 and 10, slide plates 119 are elevated somewhat above the bottom 173 of the powder box. This elevation may be a matter of, say, only $\frac{1}{32}$ of an inch, but it is very important in order to avoid sliding surfaces which may rub and tend to cure the molding powder. The cut off plates 119 are made wider than the diameter of measuring cup 117 for complete cut off. They are provided with a few pins 175 (Figs. 7 and 10) projecting downwardly an amount equal to the desired spacing, say, $\frac{1}{32}$ of an inch. The leading and trailing edges of the cut off plates 119 are preferably tapered, as shown in Figs. 9 and 10.

The discharge valve 121 is supported on three slender guide pins 177, these being slidably received in bearings 179 (Figs 9 and 10) cast integrally with cups 117. (Only one is shown in Figs. 9 and 10, but others are visible in Fig. 6.) The upper ends of pins 177 rest beneath an operating plate 181. Pins 177 and valve 121 are normally elevated by springs 183 coiled about pins 177. When operating plate 181 is depressed from the position shown in Fig. 9 to that shown in Fig. 10, the pins 177, and with them the valve 121 are depressed, thus opening the measuring cup 117 to discharge the contents thereof.

Referring now to Fig. 6, the operating plate 181 may be heavy and rigid, as it is normally held upwardly against the bottom 173 of the powder box by means of compression springs 185, the lower ends of which rest on bearings 187 secured to bottom 173, and the upper ends of which bear against rods 189, which pass downwardly through springs 185 and bearings 187 to the valve operating plate 181.

The operating plate is moved downwardly by toggle mechanism including upper and lower arms 985 (Fig. 6), the upper arms being pivoted on the powder box 115, and the lower arms being pivoted on the operating plate 181. Arms 985 are connected together and to a link 191, which is connected to a link 193, the outer end of which is connected to an arm 195 mounted on rod 197, which carries cam follower arm 199, the outer end of which is provided with a cam follower roller 201. This is moved by a cam mounted on cam shaft 131, said cam including an inner portion 203, and an outer portion 205, for positive motion in both directions. This entire toggle and cam mechanism is duplicated on both sides of the machine.

Cam shaft 131 is driven by motor 964 (Fig. 7) through appropriate reduction gearing. Specifically, motor 964 drives a worm 207 which meshes with a worm gear mounted on shaft 209. This drives pinion 211 meshing with gear 213, which drives a pinion 215 (Figs. 6 and 7). The latter meshes with a large gear 217 mounted directly on cam shaft 131. Cam shaft 131 is carried in bearings 219 mounted on the side of powder box 115. When the powder box is elevated by lift handle 129, the cam shaft and gear 217 are elevated, the latter separating temporarily from pinion 215.

Cam shaft 131 carries a switch drum 954 (Figs. 7 and 8), the contact segments of which are connected into the motor circuit as is later desribed in greater detail. Briefly, switch drum 954 stops motor 964 after cam shaft 131 has turned through a half revolution. Cam shaft 131 is a half revolution shaft, and in one dwell position, the cut off plates 119 are closed and discharge valves 121 are open, while in the opposite dwell position the valves 121 are closed and the cut off plates 119 are open. The cams on cam shaft 131 are quick action cams, guarding against both valves being open at one time.

Reverting now to Figs. 9 and 10, the funnels 123 are supported by a suitable funnel plate 221. The latter may, if desired, be provided with a series of tubes 223, the latter functioning to improve the support of the funnels and to guide the discharged powder downwardly to a point immediately above the powder carrier 65.

The arrangement is substantially devoid of flat surfaces. The surfaces are either vertical, or are disposed at an angle steeper than the angle of repose of the powder. In the present case, the angle is steeper than forty-five degrees. This applies to the bottom wall 225 of the measuring cup, and to the top wall 227 of valve 121, and the upper end 229 of the regulator screw, as well as the surfaces of funnel 123.

The adjusting screws 127 are intended only for fine changes in measurement. For coarse changes in measurement, sleeves are inserted in the measuring chambers, thereby reducing the capacity of the same. For example, in a specific case dealing with the molding of bottle caps, the measuring cups have a capacity of about ten grams. The range of adjustment provided by the adjusting screw is a matter of only one-half of a gram. However, bottle caps using only, say, four grams of material, are made by inserting sleeves of appropriate size in the measuring cups. The needed accuracy of measurement will be understood if it is mentioned that an error equivalent to only a fraction of a turn of the adjustment screw is enough to produce a flash extending around a bottle cap all the way to the edge of the cavity insert.

The powder measurer as above described is substantially the same as that disclosed and claimed in my co-pending application, Serial No. 272,769 previously mentioned.

With some molding materials which tend to cling to the walls of the measuring cup, I find it desirable to add means to vibrate the entire assembly of cups. For this purpose I provide motor 1002 (Figs. 6 and 7) with eccentric or unbalanced weights 231. The motor is started and stopped during a part of each cycle, by switch means later described, so that the motor runs during measuring and discharge of powder from the powder cups.

Referring now to Fig. 32, the hopper 1014 is preferably provided with a stirrer 1032 which is continuously rotated in order to mix the powder in the hopper, and to maintain a uniform distribution of the finer and coarser particles of the molding powder. In Fig. 32, the driving motor 1034 for the stirrer is shown at the side of the hopper, but its actual location may be above the hopper, as shown in Fig. 1.

*The powder carrier*

The powder carrier and the motor driven mechanism for moving the same are generally similar to that disclosed and claimed in my aforesaid application, Serial No. 272,769, but their control, which is described in connection with the wiring of the apparatus, is different and is related to and interlocked with the cycle control of the complete automatic apparatus.

Referring to Figs. 9 through 11 and 50, it will be seen that the bottom of powder carrier pocket 125 is closed by a suitable door or valve 633, here designated a vane to distinguish from the other valves. Vane 633 extends upwardly to and is secured on a spindle 235. The vane is normally closed by a wire spring 237. The vane may be opened against spring 237 by oscillation of spindle 235, caused by arm 239, moved by link 241.

The vanes are opened when the powder carrier has been moved into the pill press and is in proper registration with the pill cavities, as is indicated for one cavity in Fig. 11, the pill cavity being shown at 373, and the ejector plug forming the bottom of the pill cavity being shown at 379. Figs. 6 and 50 show the manner in which the arms 239 for each of the rows of vanes on powder carrier 65 are connected together by link 241. This linkage is duplicated at the opposite sides of the powder carrier. The end of link 241 is bent sidewardly to form means 661 (Fig. 49) cooperating with a stationary stop 663 located at the pill press and functioning to open all of the vanes when the powder carrier is moved fully into the pill press so that it is in registration with the pill cavities. Another stop 665 (Fig. 50) may be located in the powder measurer and functions to insure closing of the vanes when the powder carrier is moved back into the powder measurer, although, ordinarily, the vanes closing spring 237 (Fig. 9) are adequate.

The powder carrier is moved by means independent of the pillboard, for greater flexibility in their relative cycle of movement. It is here moved by gear and rack mechanism under propulsion of a reversing motor. The mechanism may be described with reference to Figs. 13, 16 and 17 of the drawings.

Referring to those figures, the motor 964 drives a worm 245 meshing with a worm gear 247, the depending shaft of which carries a gear 249 meshing with a gear 251. The latter drives a subjacent pinion 253 through a suitable friction clutch mechanism. This is best shown in Fig. 17, in which it will be seen that pinion 253 is secured to sleeve 255, which rotatably carries gear 251, the latter being located between friction discs 257 and 259. The parts are axially compressed together by means of a flange plate 261 keyed to sleeve 255 and urged downwardly by means of the bent arms of spring plate 263. The force of spring 263 may be regulated by means of lock nuts 265 threadedly received on sleeve 255. The entire sleeve 255 is freely rotatable on a pin 267, the latter being supported in a suitable bearing yoke 269, which is secured to a cross frame member 271 (Figs. 13 and 16) extending from one side of the apparatus to the other.

Pinion 253 meshes with a large gear 273, and this meshes with a similar large gear 275. Gear 273 turns a pinion 277, which meshes with one of the racks 243. Gear 275 turns a pinion 279, which meshes with the other rack 243. The racks are held in mesh with pinions 277, 279 by guide rollers 281. In Fig. 13 one edge of the powder carrier 65 is shown in its retracted position, and at this time the stop blocks 283 abut the rollers 281, thus acting as motion limiting stops.

The motor 964 is stopped at the end of the forward or rearward movement of the powder carrier by appropriate motion limit switches. These are also arranged to act as decelerating switches to slow down the motor speed as the powder carrier approaches the end of its travel. The motion limit switches may be described with reference to Figs. 13 through 16 of the drawings. Pinion 277 drives a cam shaft 285 through appropriate reduction gearing so selected that the cam shaft turns substantially less than one revolution during the complete forward or backward movement of the powder carrier. Specifically, pinion 277 meshes with the gear 287, which in turn drives a pinion 289 meshing with a gear 291 mounted on cam shaft 285.

The cam shaft 285 carries upper and lower cam assemblies 293 and 295 (Fig. 16). The upper cam 293 operates an upper switch arm 836, while the lower cam 295 operates a lower switch arm 850. One of these limits the forward drive of motor 964, and the other the rearward drive. The switch arms are normally moved against the cams by pull springs 297 (Fig. 13). The ends of the switch arms are movable over a series of three contacts mounted on insulation strips 299 and 301 (Fig. 14).

Each cam assembly is made up of two relatively movable cam discs, and the reason for this may be explained with reference to Fig. 15, in which one of the discs 303 is shown in solid lines, and the other 305 is shown in broken lines. Disc 303 may be considered the main cam disc, and it is cut to three different radii, the largest at 307, the intermediate at 309, and the smallest at 311. When the switch lever bears against the large radius portion 307 of the cam, the motor circuit is closed and the powder carrier is in motion. When the switch arm engages the intermediate radius portion 309 of the cam, it is moved to the center contact, at which time the motor is decelerated to slow speed, as by the insertion of a speed reducing resistor in series with the motor. When the switch arm engages the small radius portion 311 of the cam, the motor circuit is opened. There is adequate room for over-travel of the powder carrier after the motor is stopped, the powder carrier then being stopped by appropriate positive abutments, including those numbered 283 (Fig. 13), and others on the back ends of racks 243 which come in contact with other guide rollers.

It is desirable, though not at all essential, to provide for adjustment of the deceleration of the powder carrier, and this adjustment may be different for the forward movement than for the rearward movement. During the forward movement, the powder carrier is preferably brought to a gradual stop not only to avoid shock, but also to prevent the powder being discharged from the pockets from being thrown forwardly beyond the pill press cavities. During rearward movement of the powder carrier, it is empty and the only requirement is to avoid mechanical shock. The adjustment of deceleration is made in either and preferably both of two ways; first, by adjustment of the magnitude of the inserted resistor, and second, by adjustment of the time or point at which the motor is changed from full speed to slow speed operation.

In the present case, this latter adjustment is provided by the extra disc 305, for by relative adjustment of the discs, the location of the point 313, or in other words, the length of the slow speed portion 309 may be varied, thereby changing the duration of the slow speed operation. When the discs 303 and 305 have been adjusted to desired relation, this adjustment may be locked by means of screws 315.

It may be pointed out that it is not essential to use stationary pockets with valves therebeneath for the powder carrier, the important thing being the provision of pockets adapted to transfer the powder and to discharge the same at the pill press. For example, I have successfully employed a powder carrier in which no valves are used at all, and instead, the pockets are oscillatably mounted and discharge their contents by being tilted to inverted position.

*The pill press*

The pill press is much like that disclosed in my co-pending application Serial No. 247,017 previously referred to, but requires no screw adjustment for the ejector plugs. Simple stops as mentioned in Serial No. 272,769 are sufficient. Motor driven valves and interlocked limit switches are added.

The pill press is best shown in Fig. 19, which is a partially sectioned view taken transversely of the guide rails 69. The pillboard 49 is shown in the pill press, as well as the wheels 164 on which it runs.

The pill press comprises a cavity plate 371 having plurality of pill cavities 373 there. There is a movable platen assembly 57 moved by one or more hydraulic piston and cylinder assemblies 377, said platen carrying force plugs 59 mating with the pill cavities 373. The pill cavities are closed at the bottom by ejector plugs 379, the lower ends of which rest on stops carried by a stationary reaction plate 381. No adjustment of the stops is necessary, the pill cavity being made much larger than the volume of powder delivered thereto. The ejector plugs 379 may be moved upwardly by means of an ejector plate 383, which in turn is moved by ejector rods 385 and plate 387 carried by a hydraulic piston and cylinder assembly 67.

The cavity plate 371 is preferably heated, as by means of electrical heating units, the ends of which are shown at 389. These are preferably calrod units and are controlled by two thermostatic elements disposed in the cavity plate, which units regulates the supply of current to the heating elements in order to maintain the temperature at a desired value.

The manner in which the pill cavities 373 are filled with molding powder is illustrated in Fig. 11. Each pill cavity 373 is formed by a cylinder 391 fixedly received in cavity plate 371, which is preferably a split plate in order to facilitate the insertion of the electric heating units 389 therebetween, as is clearly shown in Fig. 12. The pill cavities are closed at the bottom by the upper ends of the ejector plugs 379. When these are retracted they descend so low that the charge of molding powder does not reach the top of the pill cavity, hence the force plug 59 may safely enter the pill cavity before it begins to compress the molding powder.

After delivery of the powder the powder board moves out of the pill press and the pillboard 49 moves into the pill press. The press then closes, causing the force plugs 59 to pass through the openings in the pillboard 49, as is clearly shown in Fig. 12. The molded powder is compressed to a fraction of its original volume, and under heat and pressure is transformed into a solidly compacted, readily transferable unit.

The force plugs 59 are secured to the upper platen 57 in a manner shown in Fig. 12. The upper ends of the plugs are enlarged to form a head 393 which is received in a mating but oversized recess in a holding plate 395. The hole through which the force plug passes is also oversized, thus permitting lateral movement of the force plug relative to the platen. A spring washer 397 is disposed between the lower side of head 393 and the bottom of the recess in plate 395. This spring member may, for example, be radially corrugated to provide a spring action in an axial direction. The main downward pressure of the hydraulic rams is taken through the upper part 375 of platen 57, and is applied directly on the upper ends of the force plugs. This force is not applied to the resilient members, but the latter members make possible an automatic self-adjustment of the force plugs in a lateral direction. This is desirable because the cavity plate is heated and the spacing between the cavities may be somewhat less when the plate is cold than when it is hot. After the pills have been treated for a predetermined time the pressure in cylinders 377 (Fig. 19) is released and the platen 57 is raised, as by means of city water supply pressure constantly applied to the lower face of the pistons in cylinders 377. The ejection plunger is then subjected to pressure, thereby raising the plugs 379, which in turn force the pills upwardly to the pillboard. The pillboard is then closed by pillboard closing mechanism, which is housed at the side of the pill press in a casing indicated at 399. This mechanism is described later.

The valves which control the operation of the pill press, together with the driving motors for the same, are housed in a casing 401 mounted at the opposite side of the pill press. These valves are numbered 646 and 722 in Fig. 31.

The pill press is provided with a group of switches 582, 676 and 684 (shown also in Fig. 31). The exact functions of these switches are described later in connection with the wiring of the apparatus, but at present it may be pointed out that switch 582 (Fig. 19) is an open-limit switch which is operated by a rod 670 when the upper platen 57 rises to its topmost position, it being operated by an arm 403 secured to and projecting sidewardly from the platen. Rod 670 passes through a hole in arm 403. Switch 684 is operated by a camming bar 680 which is also connected to the arm 403. Switch 676 is operated by an arm 674 which is moved to the right by a camming projection 672 on rod 670. When thus moved to the right it may be engaged and latched by a pawl 678. The latter may be disengaged by a rod 744, the lower end of which is disposed to be acted upon by an arm 405 secured to and projecting sidewardly from the ejector plate 387. These parts are shown more or less schematically in an effort to clarify the operation, rather than the precise details of the bearings and guides holding the various parts.

The pill press is carried by two I members 407 (Fig. 19) which rest directly on the floor and extend to the molding press, as is best shown in Fig. 1. The U-channel members 409 (Fig. 19) are secured transversely of the I members 407. The columns or tie rods 411 pass through the flanges of the U-members 409. The columns are similarly joined at their upper ends by U-members 413 which are connected by plates 415.

Movable platen 57 is provided with bearing bosses 417 which slide on the columns 411. The stationary reaction plate 381 is supported on a stationary plate 419 by means of blocks 421 and posts 423. Plate 419 is supported by spacers 425 and posts 427.

The main cylinders 377 are secured to the U-members 413, and the reaction of the cylinders is taken by these members. The piston rods are connected to the platen 57 by means of flanges 429 threadedly mounted on the piston rods, said flanges bearing on the top of the platen, and being held against upward movement by flanged rings 431. In this way lateral adjustment is permitted.

*Pillboard and pillboard closing*

Referring now to Figs. 20, 21 and 22 (which are on the same sheet as Figs. 3-5) the pillboard comprises a lower lamination 433 and a plurality of springs 435 which are movable relative to holes in lamination 433. The springs 435 are most conveniently mounted on an upper lamination 637. In Fig. 22 it will be seen that the lower or working end of each spring 435 is preferably brought down into the plane of the lower lamination 433, so that a pill 439 may be gripped between the oversized hole in the lamination and the spring 435. In Fig. 20 the pillboard is shown in open condition, and in Figs. 21 and 22 the pillboard is shown in closed condition.

Suitable linkage may be provided to produce a relative movement of the laminations 433 and 637. In the present case this consists of toggle links 441 and 443, the latter of which is provided with an arm 445. When the pillboard runs into the molding press the arm 445 runs against a fixed stop 647 (Fig. 20) thus turning the arm and moving the toggle links to open the pillboard and so drop the pills into the mold cavities.

When the pillboard has run back into the pill press it remains in open condition until after the pill molding operation. When the pills have been raised or ejected to the level of the pillboard, a pillboard closer operates, causing an arm 792 (Fig. 21) to move forcibly against a pin 449 projecting from a strap 451. The strap is thereby moved to the left and oscillates an arm 453 (Fig. 22) in a counter-clockwise direction. This pulls link 455 which is connected to arm 445 and so straightens the toggle links 441, 443. At the same time a finger 166 connected to strap 451 is pulled from its position above the highest point of wheel 164, thereby changing one of the safety or control switches, as is described later in connection with the wiring.

The desired relative movement of the laminations is obtained by moving the lower lamination 433. The upper lamination 637 is connected to U-shaped support members 457 which depend from wheel 164 and a frame 459 carrying the said wheels. When the toggle links 441 and 443 are straightened, a stud 461 passing through a slot in the upper lamination, and connected to the lower lamination, is moved to the left, thereby moving the lower lamination 433 to the left (see Figs. 21 and 22) and so jamming the pills against the springs 435. The reason it is preferable to move the lower lamination is so that it will physically dislodge the pills from the upper ends of the ejection plugs.

The toggle linkage 441, 443 is duplicated at both sides of the pillboard and a connecting link 463 may be provided to insure simultaneous equal operation of the linkage at both sides.

The construction of the pillboard closer is schematically illustrated in Fig. 31, and will be described later in connection with the wiring there shown. For the present it is sufficient to state that the arm 792, only the upper end of which is shown in Fig. 21, is shown in its entirety in Fig. 31.

*The main molding press*

The main molding press may be entirely conventional. In fact, the remaining apparatus is "built around" and is dimensioned to fit a standard molding press. Referring to Fig. 1, the press here shown is one having a stationary head 465 carried at the upper end of columns 467 secured to a base 469 in which the main ram operates. The movable platen 53 is carried at the upper end of the main ram. My special motor-operated valve group for controlling the main press 47 is in this instance located at 471. The valve group 471 controls the admission of low and high pressure fluid beneath the main ram. The return or downward movement of platen 53 is accomplished by "hydraulic springs," that is, cylinders 473 (one at each side of the press) mounted on platen 53 and cooperating with stationary plungers 475 fixedly mounted on the head 465 of the press. Cylinders 473 are under continuous pressure and function to open the press whenever pressure on the main ram is relieved.

The valve assembly at 471 consists of three valves, a low pressure valve, a high pressure valve, and a release valve, and operating motors for each of these valves. The valve arrangement is shown in somewhat greater detail, although only schematically, in Fig. 30 of the drawings. Referring to that figure, low pressure fluid is admitted at 477 and is controlled by valve 372. High pressure fluid is admitted at 479 and is controlled by valve 434. A check valve 556 is disposed between the low and high pressure valves in order to prevent the high pressure fluid from backing up into the low pressure line when the valves are simultaneously opened. Communication to the main cylinder of the press is through an outlet 481. A discharge or relief pipe is connected at 483 and is controlled by valve 326. These valves are preferably screw stem valves of conventional type and are controlled by reversing motors with lost motion gearing and with appropriate limit switches and transfer switches, all as is disclosed in greater detail in my co-pending application Serial No. 427,594 previously referred to.

Reverting to Fig. 1, it will be seen that the movable platen 53 is connected through a link 392 to an arm 394 leading into a switch box 485 mounted on the stationary head 465 of the press. The mechanism contained in this box 485 is shown in greater detail in Figs. 35, 36 and 37, there being an open-limit switch 402, a closed-limit switch 390 and a third switch 564 to indicate partial opening of the press during the opening, but not during the closing movement of the press.

Reverting to Fig. 1, the stripper mechanism is not shown in detail because it may be conventional. It consists essentially of a stripper plate 61 which surrounds the core pins and which is connected by appropriate linkage to the movable platen 53. When the press opens, the product, for example bottle caps, remains on the core pins carried by the upper half of the mold, which is mounted on the stationary head of the press. The bottle caps are withdrawn from the mold cavities as the lower half of the mold descends with the lower platen 53. The connection between the lower platen and the stripper plate is a lost-motion connection, such that the stripper plate does not function until after the press is more than half open. When the press is half open the catchboard 51 moves into the press, and thereafter continued opening of the press causes the stripper plate 61 to be pulled downwardly against the bottle caps, thereby stripping the same off the core pins, so that they fall freely onto the catchboard.

*Power unit with cycle control mechanism*

It has already been mentioned that a so-called "power unit" is mounted at 85 (Fig. 1) for operation of the sprocket wheels 81 which drive the chains 73. The pillboard 49 is connected to the chains at 683 and 685, and the nature of this connection is shown in greater detail in Fig. 45, which shows the connection 683. The chain 73 terminates in a threaded rod 489 connected to arm 683 by nuts 491. Arm 683 is secured to a strap 459, which forms a part of the pillboard frame as described in Figs. 21 and 22. The threaded connection 489 provides for adjustment of the exact location of the pillboard relative to the presses in order to bring the various openings into proper registration. This adjustment need only cover the extent of one chain link, for large changes can be made by shifting the chain relative to the sprocket wheels. It will be understood that the connection 685 (Fig. 1) may be exactly like the connection 683, except that it is pointed in the opposite direction, the chain running off to the right, instead of to the left.

Figure 24:
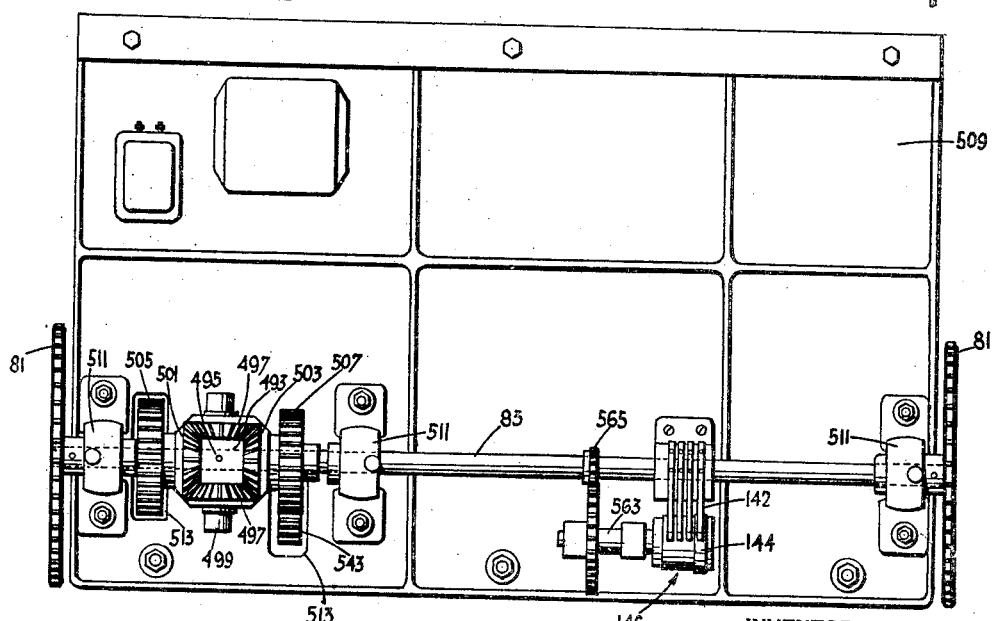
Fig. 24 shows the opposite side of the power unit, carrying the sprocket shaft which moves the loader.

Referring now to Fig. 24, the sprocket wheels 81 are mounted at the ends of a shaft 83. A block 493 is mounted on shaft 83 and is connected thereto, as by means of a pin 495. Differential pinions 497 are freely rotatably carried on a shaft 499 passing through block 493. The differential pinions 497 mesh with differential bevel gears 501 and 503 which are freely rotatable on shaft 83. Bevel gear 501 is fixedly secured to a spur gear 505, while bevel gear 503 is fixedly secured to a spur gear 507. These mesh with and are driven by spur gears located on the opposite side of the main plate 509 on which the mechanism is mounted. Shaft 83 is carried on plate 509 by bearings 511. The plate 509 is cut away, as is indicated at 513, to make it possible for the spur gears 505 and 507 to mesh with driving gears carried on the other side of plate 509.

Figure 23:
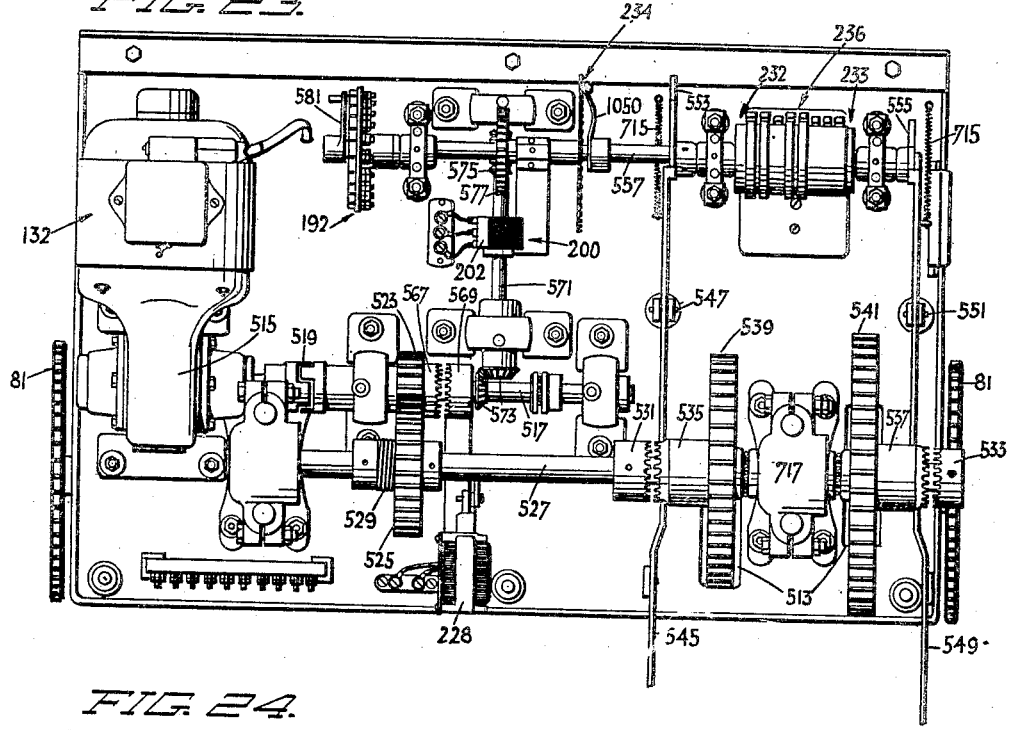
Fig. 23 is an elevation of the power unit which controls the entire apparatus and which moves the loader.

Referring now to Fig. 23, the driving power is supplied by a continuously rotating motor 132. After appropriate speed reduction by gearing housed at 515, this motor drives a shaft 517 through a suitable coupling 519. Shaft 517 has secured thereto a pinion 523 which meshes with a gear 525 mounted on a countershaft 527. The drive between gear 525 and shaft 527 preferably includes a friction coupling 529. Countershaft 527 carries the driving parts 531 and 533 of two single-revolution clutches. The driven parts 535 and 537 are connected to gears 539 and 541 respectively. Gear 539 meshes with gear 507 (Figs. 24 and 42) through a direction reversing idler 543, while gear 541 meshes directly with gear 505 (Fig. 41). In both cases the driving ratio is the same, it being a 2 to 1 step-up ratio.

The clutches are self-locking single-revolution clutches, such that after either gear 539 or 541 is turned through one revolution it is stopped and locked in position. Clutch 531, 535 (Fig. 23) is tripped or released by an arm 545 pivoted at 547, while clutch 533, 537 is controlled by an arm 549 pivoted at 551. The upper ends of the arms are provided with cam followers arranged to be acted upon by cams 553 and 555 respectively, these cams being mounted on a cycle control shaft 557 which corresponds in a general way to the main timing shaft of most automatic machinery, but which in the present case is moved with a step by step movement, rather than continuously, and with dwell periods dependent upon timing clocks and upon the time needed for various parts of the apparatus to operate. The arms are pulled toward the cams by return springs 715. The lower ends of the arms may project down, as shown, to form levers for manual tripping of the clutches, when servicing the machine.

One type of single revolution, self-locking clutch which may be used on the countershaft 527 is illustrated in Figs. 46–48 of the drawings. The driving part 531 of the clutch is pinned to shaft 527 at 701. The driven part 535 is axially movable on shaft 527. It and gear 539 are freely rotatable on shaft 527, but are compelled to rotate with one another by means of pins 703. Springs 705 urge the driven part 535 axially into engagement with the driving part 531. Gear 539 is not axially movable, it being restrained by bearing 717 (Fig. 23).

The driven part 535 is normally locked by a pin 707 which is connected at its lower end to the trip arm 545 previously referred to. Pin 707 locks clutch part 535 by entering a hole 709. The clutch part 535 is further provided with a peripheral slot 711 (Fig. 47) having a cam surface 713 (Fig. 48). It will be evident that when trip arm 545 is pulled down, the pin 707 is withdrawn from hole 709, and clutch part 535 then moves axially toward and engages the driving part 531, which thereupon causes the driven part 535 and gear 539 to rotate together. In the meantime, lock pin 707 again seeks to rise under the action of its restoring spring 715 (Fig. 23). Toward the end of a single revolution the slot 711 reaches pin 707, which rises into the slot. When camming surface 713 reaches pin 707 the driven part 535 of the clutch is moved axially to the right to the retracted position shown in Fig. 46, the pin 707 being fixed against transverse movement, and being movable only in an axial direction. The clutch is therefore a single revolution clutch which is not only disengaged but locked at the end of one revolution.

Whenever the clutch 531, 535 is tripped it drives the gear 507 (Fig. 24) and with it the differential bevel gear 503. This causes the differential pinions 497 to rotate and these then revolve about the stationary or locked bevel gear 501, thus turning the block 493, and so causing the sprocket shaft 83 to rotate. The step-up or gain of 2 to 1 between gears 539 and 507 is lost in the differential gearing, which introduces a step-down ratio of 1 to 2, so that a single revolution of gear 539 produces a single revolution of sprocket shaft 83.

If clutch 533, 537 is tripped the gear 541 turns gear 505, thereby turning the bevel gear 501 through two revolutions, which in turn rotates the differential pinions 497. These then revolve about the stationary or locked bevel gear 503, but in opposite direction, thus turning the block 493 for one revolution, and with it the sprocket shaft 83.

In either case the shaft turns through one revolution and is locked. In this way the loader (pillboard and catchboard) is advanced one step of movement, and is then locked in its new position. One of the clutches functions to advance the loader in a direction from the pill press toward the molding press, while the other functions to return the loader toward the pill press.

The cam 553 drives the loader in a forward direction and is therefore provided with two camming projections 559, which are spaced apart, as is shown in Fig. 43, in order to trip the forward running clutch twice; once to move the catchboard into the molding press as shown in Fig. 4; and the second time to move the catchboard beyond the molding press, as shown in Fig. 5. The spacing of the cams is explained later, in connection with the functioning of cycle shaft 557. The cam 555 is similarly provided with two cams 561, as is shown in Fig. 44, but in this case the cams are close together and, as will be described later in connection with the wiring, the clutch is tripped twice in succession so that the movement of the loader back to the pill press is one continuous movement produced by two continuous rotations of the sprocket shaft 83. The proper angular relation between the two cams (which are approximately at right angles) is also explained later.

Referring to Fig. 24, reference may be made to a loader position switch 146, which is a drum switch mounted on a shaft 563 geared to sprocket shaft 83 through reduction gearing 565, say 1 to 3, so that switch 146 turns less than a revolution for two revolutions of shaft 83. As will appear later in the description of the wiring the loader position switch 146 serves to indicate at any time the position of the loader relative to the presses.

The powder unit includes not only the mechanism so far described for moving the loader, but also the cycle control shaft or main cam shaft 557 (Fig. 23), which is driven by the same motor 132 as is used to drive the sprocket shaft. For this purpose shaft 517 is provided with a single revolution clutch, said clutch comprising a driving part 567 and a driven part 569. The clutch is tripped under remote control by a solenoid 228. The driven part 569 of the clutch turns a worm shaft 571 through mitre gearing 753. A worm 575 on shaft 571 meshes with a worm gear 577 mounted on the cycle shaft 557. The worm reduction ratio is 20 to 1, so that each revolution of the single revolution clutch turns the cycle control shaft 557 through one-twentieth of a revolution. Shaft 557 turns a contact arm 581 which cooperates with a contact disc 192 having twenty contacts or segments therearound. Energization of a contact feeds solenoid 228 and trips the clutch 567, 569, thus moving the cycle shaft to the next contact. The cycle shaft 557 also turns a switch drum having two parts 232 and 233 which are insulated from each other and which cooperate with a bank or group 236 of contact fingers, all as will be more fully described in connection with the wiring. Cycle shaft 557 also turns a contact arm 1050 cooperating with a contact disc 234, which functions to light a series of lamps showing the position of the cycle shaft at any time. Omitting the non-essential contact disc 234 from consideration, the cam shaft or cycle shaft 557 drives the contact arm 581 for the twenty position contact disc 192 which controls the stepping of the cycle shaft ahead from one position to the next; and drives the cams 553 and 555 which mechanically control the clutches for moving the loader; and drives the drum switches 232, 233 which electrically control the operation of the various presses and other parts of the apparatus. A drum switch 200 is mounted on worm shaft 571 and the purpose of this is described later in connection with the wiring of the apparatus. Briefly, it de-energizes clutch solenoid 228 after the latter has caused clutch 567, 569 to engage, thus limiting the clutch to single-revolution operation. The mechanical details of clutch 567, 569 need not be described, for any conventional single revolution clutch will do.

*Sequence relay*

In order to appropriately interlock the various parts of the apparatus and to prevent powder feed from taking place at an improper time, the powder measurer is preferably provided with a localized control means, which is here called a sequence relay, and is best shown in Figs. 25 through 27.

Referring to Figs. 25–27 the sequence relay comprises a circle of contacts or segments located on a stationary insulation disc 601. These provide a desired step by step movement of a shaft 605, as is later explained in detail in connection with the wiring of the apparatus. The segments are sequentially engaged by a wiper 603 insulatedly carried at the end of a contact arm 892. A slip ring 894 (Fig. 27) is mounted within the contacts, and is also engaged by the wiper 603. Contact arm 892 is mounted on the shaft 605, which is carried in bearings 607. Shaft 605 is driven by a motor 896 having integrally built reduction gearing at 609, which is coupled at 611 to a pinion shaft 613 carrying a pinion 615 meshing with a gear 617 mounted on shaft 605.

In the present case where the sequence relay is arranged for ten step operation and is provided with ten segments, the gear ratio between pinion 615 and gear 617 is preferably 1 to 10, so that one complete revolution of shaft 613 corresponds to a movement of contact arm 892 from one segment to the next. Shaft 613 carries a notched disc 619 (Fig. 27) controlled by a dog 621. (The gear ratio may be 1 to 5, and disc 619 provided with two notches a half revolution apart.) Dog 621 is pivoted at 623 and has a horizontally extending arm 625 connected by a link 627 to the lower end of a solenoid core 629 arranged to be drawn upwardly into solenoid coil 900 when the latter is energized. The dog arm 625 also operates a motor switch 906, the horizontally extending contacts of which are best shown in Fig. 26. The upper contact is stationary, while the lower contact rests on dog arm 625. Release of dog 621 by solenoid 900 closes motor switch 906, the latter then remaining closed until the dog returns to locking position, which can not take place until shaft 613 has completed a full revolution. The dog then moves into the notch of disc 619, thereby abruptly stopping the mechanism, and at the same time opening motor switch 906 and de-energizing the motor.

To avoid gear shock, the connection between shaft 613 and the notched disc 619 preferably takes place through an appropriate friction clutch. Disc 619 is fixedly connected to pinion 615, and both are rotatable on shaft 613. They are held against rotation by appropriate friction surfaces pressed axially by means of compression spring 631 (Figs. 25 and 26).

The immediate purpose of the sequence relay is to control the operation of two switches. For this purpose, the shaft 605 is provided with cams 817 and 939, these respectively operating switches 816 and 938. The switches comprise vertical spring contacts, the outer contact being a stationary contact (see Fig. 27), and the inner contact being moved by the cam. The switch 938 initiates the powder measuring operation, while switch 816 causes movement of the powder carrier. Switch 938 is closed on segment #7 of the sequence relay, and opens just before the contact arm stops on segment #1. The powder carrier switch 816 is closed on segments 5 and 6.

To summarize, the purpose of motor 896 is to drive the relay shaft 605 ahead from time to time. The purpose of solenoid 900 is to cause motor 896 to advance the relay shaft, which it does by releasing the locking dog 621 (Fig. 27) and at the same time closing the motor switch 906. The purpose of the segments is to divide the movement of the relay shaft into desired fractions of a revolution, and more specifically, to first energize the solenoid 900 through one segment and to then de-energize the solenoid when the relay shaft has been moved ahead to the next segment.

It may be mentioned that the sequence relay above described is generally similar to that disclosed in my co-pending application Serial Number 272,769 previously referred to, but in the present case the relay is arranged to act as a ten-step relay instead of a five-step relay, and some of the steps are connected or grouped to provide an increased time interval for the discharge of powder from the measuring cups into the powder carrier.

*The main wiring (and operation) including the cycle control and molding press*

For purposes of the following description, the apparatus is assumed to be in a condition of rest between molding cycles. Specifically, the main press is open, the pill press is open, and the loader is in retracted position, that is, the catchboard is between the presses, and the pillboard is in the pill press. The powder carrier is in retracted position at the powder measurer.

It will not be assumed, however, that the apparatus is just starting up in the sense that powder is first being admitted to a completely empty machine. Instead, the rest position is the normal position between molding cycles after the machine has been in operation. In practice, there are four charges of material in the machine at once, the first charge being in the form of pills which are already placed in the molding press ready to be molded; the second charge being in the form of powder which is already deposited in the pill cavities ready to be made into pills; the third charge being the powder in the powder carrier waiting to be run forward to the pill press; and the fourth charge being the powder in the powder measuring cups later to be discharged into the powder carrier (after the latter has moved up to and returned from the pill press). The present description assumes that the machine is in this condition, that is, that the machine has been in operation long enough so that there are pills in the molding press ready to be molded.

The wiring of the apparatus may be described with reference to Figs. 28 through 40 of the drawings. It is unfortunate that the requirements of the Patent Office limit the maximum size of the drawings to a comparatively small sheet, thus making it necessary to break up the complete wiring diagram, as properly drawn on a single large sheet, into a considerable number of smaller sheets, with many cables broken between one such sheet and another. This makes it very difficult to trace the complete wiring.

The main supply of power to the apparatus is indicated at L1, L2 in Fig. 28. The switching is all done in L2, therefore if it is so desired, the return line or L1 may be grounded. The metal frame of the apparatus may be used in place of the line 1 wires. The apparatus is protected by fuses 12. The power supply is then led to a magnetic switch R7, the magnet of which is controlled by a starting button 14 and a stop button 16.

On pressing the starting button 14 current flows from terminal 2 on R7 through conductor 18 to magnet 20 and thence through conductor 22 to terminal 5 on terminal-strip 24, then through conductor 26 to terminal 4 on clock strip 28 to normally closed contacts $a$, and thence to terminal 3 of strip 28, and thence through conductor 30 to terminal 1 of strip 24, and thence through conductor 32 to conductor 3 of cable H which in turn runs to the upper contact of normally closed stop button 16, thence to the lower contact of button 16, and through conductor 34 to the lower contact of starting button 14, which at this time is closed, hence the circuit is completed through the upper contact of button 14 through conductor 1 of cable H, which in turn leads to terminal 1 of switch R7. The resulting energization of magnet 20 causes switch R7 to close so that the main power supply L1, L2 flows through R7. Button 14 need only be pressed momentarily, for upon release, the previously described circuit running as far as conductor 34 leads also to conductor 2 of cable H and thence to conductor 36, which conductor is now alive, it being connected through the left switch blade of switch R7 to the common return L1. The switch R7 therefore remains closed unless and until the stop button 16 is pressed, or until contacts $a$ in the clock unit are opened. The rare occasion for opening of contacts $a$ in the clock unit will be explained later in the description.

On closing switch R7, line L2 is closed through R7 to conductor 38 leading to the terminal 40 of a manual-automatic switch, which as here illustrated, is in the automatic position when thrown to the right, and in the manual position when thrown to the left. For the present description it is assumed thrown to the right or automatic position. The switch consists in reality of a six-pole double-throw switch, but is illustrated as three double-pole double-throw switches which are thrown in unison to the normal automatic position, but which may be thrown to manual position, at which time the operative steps of the presses may be controlled under manual switch control, all as will be described later.

L2 current flows from contact 40 up through conductor 42, and conductor 44, to terminal 4 on strip 24 and thence through conductor 46 to terminal 2 of strip 28, and thence to the clock motor 50. This is a self-starting synchronous motor wound for two-phase operation, one phase being displaced from a single phase supply by a condenser 52. The circuit from motor 50 is completed through conductor 54 to terminal 1 of strip 28 and thence through conductors 56 and 442 to terminal 2 of strip 24, and thence through conductor 444 to conductor 36 to switch R7, and back to common return L1. This causes the clock motor to start, and it runs continuously during the operation of the apparatus in the automatic position. The actual timing depends upon the operation of certain solenoid clutches, as will be described later.

Current then flows from conductor 58 sidewardly through conductor 58 to terminal 2 of strip 60, and thence upwardly to conductor 2 of cable C. Referring now to Fig. 30, cable C terminates in a plug 62 which is received in a receptacle 64, conductor 2 leading to terminal 2 of connector 64. Terminal 2 of connector 64 is connected through wire 66, to a common lead 68 running to terminal 2 of connectors 70, 72 and 74. These correspond respectively to the low pressure valve, high pressure valve, and release valve for the molding press. Terminal 2 of connector 70 leads to conductor 2 of cable I, which in turn is connected to the center or movable contact of contact group 76 in relay R—1. The relay is normally de-energized, and contact is therefor made to the left-hand contact, and thence through conductor 78 to closed-limit switch 80 of the low pressure valve. When the valve is closed this switch is closed downwardly, as shown, and current flows through the lower contact to conductor 4 of cable I to terminal 4 of connector 70 and thence through conductor 82 to green indicator lamp 84, and thence through common lamp return conductor 86, to a conductor 88 which joins terminal 1 of all three connectors 70, 72 and 74. The common return conductor 88 is connected through conductor 90 to terminal 1 of connector 64, which in turn goes to conductor 1 of cable C. Returning now to Fig. 28, conductor 1 of cable C leads to terminal 1 of strip 60. The circuit is completed by conductor 92 running to the left from terminal 1, then upwardly through conductor 94, and then through wire 36 back to L1 at magnetic switch R—7.

Lamp 84 referred to in Fig. 30 is an indicator lamp which indicates that the low pressure valve is closed. A bank of six lamps is used for the three valves of the main molding press, the three upper lamps being red and indicating the open position of the valves, and the three lower lamps being green and indicating the closed position of the valves. Lamps 114 and 330 correspond to the release valve 326; lamps 388 and 84 correspond to the low pressure valve 372; and lamps 516 and 104 correspond to the high pressure valve 434. On the actual apparatus, these lamps are appropriately marked and may be understood at a glance.

Considering next the high pressure valve in Fig. 30, the L2 current from terminal 2 of connector 72 runs through conductor 2 of cable J to the center or movable contact of group 96 in relay R—2, and the relay being de-energized at this time, the contact is closed to the left, and thence through conductor 98 to the closed-limit switch 100 of the high pressure valve. The valve being closed, the switch is closed to the lower contact, leading to conductor 4 of cable J, and thence to terminal 4 of connector 72, which in turn leads through conductor 102 to green lamp 104, and thence to common return wire 86, conductor 90, and terminal 1 of connector 64 which, as previously described, leads through cable C ultimately back to common return L1.

Next considering the release valve, terminal 2 of connector 74 leads through conductor 2 of cable K to the contact group 106 of relay R—3. This relay being de-energized, it is closed to the left, and current flows through conductor 108 to open-limit switch 110 of the release valve. This release valve being normally open, the limit switch 110 is closed upwardly, and current flows through conductor 3 of cable K, to terminal 3 of connector 74, and thence through conductor 112 to red lamp 114, which in turn is connected to the common lamp return 86, which, as before described, is connected to L1 through wire 90. The lighting of red lamp 114 signifies that the release valve is open. The lighting of the green lamps on the low and high pressure valves, and the red lamp on the release valve, indicates the normal release positions of the main press valves, and indicates that the main press is open.

Reverting now to Fig. 28, power from L2 may be taken at terminal 2 of strip 60, downwardly through conductor 2 of cable B, thence to cable B in Fig. 29, to terminal 2 of connector 120, then wire 122, wire 124, wire 126, to switch 128, which is normally closed, and thence back through conductor 130 to motor 132 which is the main driving motor of the power unit. (The power unit is shown and described in connection with Figs. 23 and 24 of the drawings.) The circuit through the motor is completed by way of wire 134 and down through wire 136 to terminal 1 of connector 120. This in turn leads through conductor 1 of cable B, and reverting to Fig. 28, wire 1 is connected to terminal 1 of strip 60 which, as previously described, leads back to the common return L1. Reverting to Fig. 29, the indicator light 138 is connected in shunt across the motor 132 to indicate when the motor is in operation.

Power from L2 also flows from terminal 2 of connector 120 (Fig. 29) through conductor 122, then branching right through conductor 140, to contact finger 142, which bears against slip ring 144 of the loader position switch drum 146. This drum is geared to the sprocket shaft of the power unit through 1 to 3 ratio reduction gears. In the normal rest position, contact finger 148 is on segment 150. There are three such segments marked 150, 152 and 154, these corresponding respectively to the molding position, the stripping position and the loading position of the catchboard and pillboard. The normal position is the molding position, with the pillboard and catchboard out of the main press, the pillboard being in the pill press, and the catchboard being between the two presses.

Inasmuch as the boards are in retracted position, the current supply at slip ring 144 is connected through segment 150 to contact finger 148 (the segments 150, 152 and 154 all being connected or formed integrally with the slip ring 144). Current then flows through conductor 156, and downwardly through conductor 158 to terminal 3 of strip 160. The current then flows through conductor 6 of cable L, and now referring to Fig. 40, it will be seen that conductor 6 of cable L runs to rail switch 162, which is in closed position because the wheel 164 and the finger 166 are disposed beneath the arm 168 controlling the switch. Current therefore flows through conductor 170 to terminal 4 of strip 162, and thence to conductor 4 of cable AA to automatic cycle switch 172, which is closed. The current flows through the switch to conductor 3 of cable AA, and thence to terminal 3 of strip 162, and thence through conductor 3 of cable L.

Reverting to Fig. 29, conductor 3 of cable L is connected to lower post 4 of strip 160. This in turn is connected by conductor 174 to contact 6 of connector 176, which in turn is connected to cable A. Referring now to Fig. 28, conductor 6 of cable A is connected to terminal 6 of strip 178, which in turn leads through conductor 180 to connector 182 and two-wire cable G. Referring now to Fig. 33, the cable G leads to a thermostatic switch 184 which is controlled by a thermostatic element 186 which is in contact with the steam plate at the main press mold. It being assumed that the main press mold is up to its proper temperature (for we are in the midst of automatic operation of the apparatus), switch 184 is closed. Current then returns through cable G to connector 182 (Fig. 28), then back through conductor 188 to post 2 of strip 178, and thence to conductor 2 of cable A. Referring back to Fig. 29, conductor 2 of cable A is connected to contact 2 of connector 176, which in turn leads through conductor 190 to contact 1 on a cycle control means, here exemplified by partly mechanical and partly electrical means, or specifically a cam shaft combined with a contact drum. The cam shaft contact disc is generally designated 192.

The resulting operation which is next described and which transfers the cycle control shaft (cam shaft and contact arm) through its successive positions, is applicable to all of the contacts. When contact 1 is energized it initiates a stepping movement from contact 1 to contact 2, and similarly, when each contact is energized it initiates a step or movement to the next contact. This operation may be initiated by a brief impulse of current, for once the stepping operation is started, it must continue to its completion, because of the stick action or holding action of relay R—4 hereinafter described.

Current flows from contact 1 through the movable contact arm to the slip ring 194, and thence through wire 196 to contact finger 198 of the release drum switch 200. This is called a "release drum switch" because it releases contact to the cam shaft stepping solenoid when the cam shaft actually is in motion. There is a one-to-twenty gear reduction ratio between the drum switch 200 and the arm at twenty-contact disc 192 (that is, the cycle shaft or cam shaft which was numbered 557 in Fig. 23), and the primary function of drum 200 is to prevent more than one step of movement at the contact disc 192 (or what is equivalent, one full rotation of the drum 200) by de-energizing the clutch trip solenoid 228.

The circuit then runs from finger 198 through contact segment 202 to contact finger 204, and thence downwardly through conductor 206 to the magnet of relay R—4. The magnet circuit is completed through the wire 208, wire 134, and wire 136, leading back to contact 1 of connector 120, which as previously described, returns to the common return L1. This energizes the magnet of R—4. With relay R—4 closed, power flows from terminal 2 of connector 120 through conductor 122, conductor 140, conductor 210, to movable contact 212, which at this time bears against the left-hand contact and thus completes a circuit to wire 214, which in turn leads to the contact finger 216 of the release drum switch 200. The circuit continues from contact finger 216 through segment 202 and contact finger 204 through conductor 206 to the magnet of relay R—4, thence through conductor 208 to L1, as previously explained. The relay is thus held in energized position as long as segment 202 is connecting the fingers 216 and 204. Thus only a momentary current impulse to finger 198 on drum 200 is necessary to cause relay R—4 to close, but relay R—4 will remain closed until the circuit between fingers 204 and 216 is broken.

Reverting now to relay R—4, current flows from wire 210 through contacts 218 which are now closed, to conductor 220, to the normally closed contacts 222 of push button switch 224, from which current flows through conductor 226 to cam shaft trip solenoid 228, and thence up through conductor 230, right on conductor 134, then down conductor 136, to terminal 1 of connector 120, which is common return L1. Energizing trip solenoid 228 causes the main power unit motor 132 to be clutched through the medium of a single revolution clutch and a twenty-to-one reduction to the main cam shaft. This causes drum 200 to take one revolution, while cam shaft contact at disc 192 (and with it the drum switch 232, 233 and indicator at disc 234) moves through one-twentieth of a revolution. In other words, the cycle control means steps from position 1 to position 2. It is evident that when drum 200 starts to rotate, contact is broken between fingers 198, 204 and 216, and relay R—4 is released, opening contacts 218 which open the circuit to solenoid 228. Segment 202 does not again connect fingers 198, 204 and 216 until the arm at contact disc 192 has reached its No. 2 position.

It is apparent from the foregoing description that when the contact arm reaches a contact of disc 192 that is alive, or when a contact becomes alive while the contact arm is on it, the cam shaft will step from that contact to the next. In other words, the cam shaft cycle or revolution is divisible into twenty separate steps, each step being under the control of one of the twenty contacts, so that to step through the entire twenty positions requires sequential closing of these contacts.

While the cam shaft is moving from position 1 to 2, a momentary contact is made on drum 232. A development of this drum and its associated drum 233 is shown in Fig. 29, and it will be understood that in actuality, the array of eight contact fingers 236 is in engagement with the drums 232, 233 in one of the twenty designated positions. The aforesaid momentary impulse is supplied from terminal 2 of connector 120 through conductor 122, conductor 124, and conductor 238, to contact finger 4, which is in contact with a continuous slip ring 240. The slip ring 240 is connected to or formed integrally with the segments 242, 244 and 246. Segment 242 is a short segment which makes contact with finger 3 of group 236 during the passage of drum 232, 233 from position 1 to position 2, that is, it is not in contact at position 1 nor at position 2. The resulting impulse flows from finger 3 through conductors 248, 276, and 250, to terminal 4 of connector 120. This leads through conductor 4 of cable B.

Referring now to Fig. 28, conductor 4 of cable B leads to lower terminal 4 of strip 60, which in turn is connected through conductor 252 to contacts 254 of relay R—6, which contacts are normally closed so that current flows back through conductor 256 to lower terminal 3 of strip 60, which in turn leads to conductor 3 of cable B. Referring again to Fig. 29, wire 3 of cable B runs to contact 3 of connector 120, which in turn leads through conductor 258 to the magnet of relay R—5. The magnet circuit is completed through conductor 134 which, as previously described, goes through wire 136 to terminal 1 of connector 120, which is common return L1. The energization of magnet R—5 closes the contacts 260 which close a holding circuit or stick circuit to keep the magnet energized. The power for this holding circuit is taken through the loader position switch (146 in Fig. 29) and the rail switch (162 in Fig. 40), so that the relay will again open when these switches are open. The circuit from the loader position switch 146 in Fig. 29 and through the rail switch 162 in Fig. 40, has already been traced. Referring now to Fig. 40, current may be taken from wire 4 of strip 162 through conductor 262 and normally closed release switch 264, to conductor 4 of cable L. Referring now to Fig. 29, conductor 4 of cable L leads to upper terminal 4 of strip 160 which in turn is connected by way of conductor 266 to contacts 260. When these contacts are closed, the current flows through conductor 268 and conductor 250, to terminal 4 of connector 120. This in turn leads through wire 4, cable B to contacts 254 of relay R—6 (Fig. 28), which are in turn connected through wire 3 of cable B to the magnet of R—5, as previously explained.

It is evident that relay R—5 will remain closed as long as loader position switch 146 (Fig. 29) is in its No. 1 position, and the rail switch 162 (Fig. 40) stays closed, and the contacts 254 on R—6 (Fig. 28) remain closed. Opening of any of these contacts will release the relay R—5. Also manual opening of switch 264 (Fig. 40) will release the relay R—5. In case it is found necessary to release relay R—5 through manual switch 264 after the cam shaft has come to rest at position 2 or beyond, it is possible to re-energize relay R—5 manually by push button 270 (Fig. 29). The circuit for this may be traced as follows:

Starting at the loader position switch 146 from L2 at finger 142 to slip ring 144 and segment 150 contacting finger 148, which in turn is connected through wires 156 and 272 to switch 270, which is normally open. When the switch is closed, current flows from switch 270 through conductors 274, 276 and 250, to terminal 4 of connector 120, which leads to cable B. As previously explained, this will energize the magnet of R—5 provided that contacts 254 of relay R—6 (Fig. 28) are closed. Relay R—5 will now remain closed provided the circuit is complete through the loader position switch 146 (Fig. 29) and the rail switch 162 (Fig. 40) is complete.

It will also be noted that for operation of manual switch 270, it is necessary that the loader position switch be on segment 150, which corresponds to the retracted position of the loader. If the loader position switch is off contact 150, relay R—5 cannot be closed. As all the current for operating the valves is carried through the right-hand contact group 280 of relay R—5, it is apparent that no current can be applied to these valves when the loader is in any other position than retracted position 1. The sole purpose of R–5 is to establish a safety circuit connected between the continuously normally energized L2 and the valve operation circuits. It is only through the valve operating circuits that the hydraulic pressure valves can be placed in their open position, and the relief valve be placed in the closed position. Therefore, at any time while the valves are in operation, the release button 264 of Fig. 40 will cause the pressure valves to run closed, and the release valve to run open, for safety purposes, and manual operable switch 270 (Fig. 29) when pressed, will re-establish the previous condition.

Referring back to Fig. 29, there is a push button switch 224 with one pair of normally closed contacts 222 and one pair of normally open contacts 282. The purpose of this switch is for manually stepping the cam shaft ahead one step at a time, when necessary. With this switch arrangement, it is impossible to cause the cam shaft to step more than once for a single pressure on button 224. In short, this is accomplished when pressing button 224 by opening circuit 222 which is the feeding circuit to trip solenoid 228, and closing contacts 282 which causes relay R—4 to close, the latter holding itself closed through drum 200, and upon release of button 224, contact is again established at its contacts 222, causing the trip solenoid 228 to then become energized and the cam shaft to take a single step. This is accomplished by a circuit which continues from conductor 126 at switch 128 carrying L2 current to contacts 282 and thence through conductor 284, to conductor 206, to magnet of relay R—4, to wires 208, 134 and 136, back to L1. Thus, depression of button 224 opens the trip solenoid circuit at contacts 222 and closes relay R—4 circuit at contacts 282, and subsequent release of button 224 again energizes the trip solenoid 228 at contacts 222, so that the cam shaft is stepped ahead one step.

The provision for manual stepping of the cam shaft is primarily for convenience when adjusting or working on the machine, and the restriction to operating a single step at a time is important in order to avoid spoiling the cycle control sequence, because the cam shaft or cycle control means moves more rapidly than the loader (catchboard, pillboard, etc.), and if it were possible by merely keeping the button depressed to move the cam shaft continuously over several steps, the timing or cycle sequence would be completely upset.

The movement of the cam shaft and its drum 232, 233 from position 1 to position 2, has caused closing of relay R—5. Referring now to relay R—5 in Fig. 29, the closing of contacts 280 results in current being supplied through conductor 286, conductor 288, contact finger 8 of group 236, to slip ring 290 of drum 233. This slip ring 290 is connected to or formed integrally with the segments 292, 294 and 296. The parts 232 and 233 of the drum rotate together with the cam shaft but are electrically insulated from one another. The part 232 is for the regular L2 current supply, and slip ring 240 carries L2 current. The part 233 is for a safety current supply, described later, and slip ring 290 carries L2S safety current. At position 2, the segment 292 comes into engagement with finger 5, which in turn leads through conductor 298 to terminal 5 of connector 176, which in turn leads to cable A. Referring now to Fig. 28, wire 5 of cable A leads to terminal 5 of strip 178 which in turn leads by way of conductor 300 to contact 302 of the manual automatic switch, from which current flows through conductor 304 to upper terminal 5 of strip 60, and thence to conductor 5 of cable C.

Referring now to Fig. 30, wire 5 of cable C is connected to terminal 5 of connector 64, which leads through conductor 306 to terminal 5 of connector 74, which in turn leads to conductor 5 of cable K, which in turn is connected to the magnet of relay R—3. The magnet circuit is completed by way of conductor 308 to wire 1 of cable K, thence to terminal 1 of connector 74 which, as previously explained, leads to common return L1. The energization of relay R—3 causes the relief valve 326 to run closed. More specifically, it causes the contacts 106 and 310 to move from the left-hand position to the right-hand position. As previously explained, conductor 2 of cable K is energized continuously from L2. With contact group 106 closed to the right, energy flows through conductor 312 to closed-limit switch 314, which is now in contact with its upper contact because the valve is open. The circuit continues through the motor speed adjusting rheostat 316, through the series field winding 318 of the valve operating motor, thence through conductor 320 to contact group 310, which at this time is closed to the right. Current therefore flows through conductor 322 to the motor armature 324 and from the armature to conductor 1 of cable K, and thus back to common return L1. This causes the motor to operate in such a direction as to close the release valve 326.

Upon closing of the valve, the closed-limit switch 314 will change from the upper contact to the lower contact. In so doing, current will flow through conductor 4 of cable K to terminal 4 of connector 74, and thence through conductor 328 to green lamp 330, the lighting of which indicates that the release valve 326 has been closed. The circuit continues from lamp 330 to common return 86 and L1. It will be noted that the movement of the switch arms due to energizing R—3 causes the circuit to be opened through conductor 108, limit switch 110, wire 3 of cable K, line 112 and red light 114, which causes red light 114 to go out. In general, referring to the indicator lamp group in Fig. 30, only the green or the red lamp corresponding to any one valve can be lighted at any one time. The lighting of the green lamp is accompanied by extinguishment of the red lamp, and vice versa.

The release valve 326 is provided with a transfer switch 332 (and the high pressure valve 434 is provided with a similar transfer switch 550).

The structural detail of the transfer switches is not disclosed herein, it being described in full detail in my co-pending application Serial Number 239,933 filed November 12, 1938. For purposes of the present description, it is sufficient to state that the transfer switch 332 is so mechanically connected to the valve stem as to be momentarily closed during closing movement of the valve, near the end of the valve-closing operation. The structural arrangement is preferably such that the transfer contacts are not closed during opening movement of the valve.

Just before the valve closes, momentary contact is made through transfer switch 332. This initiates movement of the cam shaft from contact 2 to contact 3. The way this is accomplished may be described as follows: Referring to Fig. 29, power is taken from contact group 280 in relay R—5 through conductor 286, upward on conductor 288, and sideward on conductor 334, to terminal 12 of connector 120. This in turn leads to wire 12 cable B. Referring now to Fig. 28, wire 12 of cable B leads to terminal 12 of strip 60, which in turn leads through conductor 336 to switch blade 338, and thence through conductors 340 and 342 to terminal 8 of strip 60. The circuit continues through conductor 8 of cable C. Referring now to Fig. 30, conductor 8 of cable C runs to terminal 8 of connector 64, thence through wires 344 and 346, to terminal 8 of connector 74, and thence through wire 8 of cable K to the transfer switch 332. When the transfer switch is closed, the circuit continues back through wire 7 of cable K, to terminal 7 of connector 74, through conductor 348, to terminal 7 of connector 64, and thence to wire 7 of cable C.

Returning again to Fig. 28, conductor 7 of cable C runs to terminal 7 of strip 60 where it continues through to wire 7 of cable B. Referring now to Fig. 29, conductor 7 of cable B leads to terminal 7 of connector 120 which in turn leads through conductor 350 to contact 2 of the contact disc 192. As previously explained, energization of contact 2 serves to initiate a movement of the contact arm from contact 2 to contact 3. The shift of the cycle shaft from position 2 to position 3 brings the segment 294 of drum 233 into engagement with finger 6 of group 236. The resulting supply of current from slip ring 290 through segment 294 and finger 6 then flows through wire 352 to terminal 3 of connector 176, and thence to wire 3 of cable A.

Referring now to Fig. 28, wire 3 of cable A runs to terminal 3 of strip 178, and thence through conductors 354 and 356, and downwardly on conductor 358, to switch blade 360, from which the circuit continues along conductor 362 to upper terminal 3 of strip 60, and then to wire 3 of cable C. Referring now to Fig. 30, wire 3 of cable C leads to terminal 3 of connector 64 and thence through wire 364 to terminal 5 of connector 70. This in turn leads through conductor 5 of cable I to the magnet of relay R—1. The magnet circuit is completed by means of conductor 366 which leads into wire 1 of cable I, and thence back to the common return L1.

The resulting energization of the magnet R—1 shifts the switch blades from the left-hand position shown, to the right-hand position. As a result of this change in switch position, power flows from L2 through conductor 2 of cable I, through the right-hand contact of group 76, thence through conductor 368 to the open-limit switch 370 of the low pressure valve 372. Inasmuch as the valve is closed, the limit switch 370 is closed against the lower contact, and the circuit continues through motor speed adjusting resistor 374, to the motor field 376. The field circuit is completed by conductor 378 leading to contact group 380. The relay being closed toward the right, the circuit continues through conductor 382, to the motor armature 384, the return circuit of which takes place through wire 1 of cable I back to the common return L1. This causes the motor to run the low pressure valve 372 to open position, and thus begins the closing of the main molding press.

When the valve reaches its open position, the open-limit switch 370 moves from the lower contact to the upper contact, at which time current flows through conductor 3 to cable I to terminal 3 of connector 70, and thence through conductor 386 to the red lamp 388, the lighting of which indicates that the low pressure valve is open. The lamp circuit is completed through return wire 86 to Ll. It will be noted that when relay R—1 moves to the right, the line through contact group 76, conductor 78 and closed-limit switch 80 (in down position), conductor 4 of cable I, and wire 82 to green light 84, has been interrupted, thus causing the green light to go out.

With the release valve 326 closed and the low pressure valve 372 open, the main press begins to close. When the press reaches its closed limit, a limit switch 390 (Fig. 35) is shifted and causes the cam shaft to advance from position 3 to position 4. The shifting of limit switch 390 is brought about by a link 392 (Figs. 1 and 35) connected to the lower platen of the main press. The upper end of link 392 is connected to an arm 394 secured to shaft 396 carrying a cam 398. In the position shown in Fig. 35, the lower platen is assumed to be in its downward position, that is, the press is open, and at this time cam 398 is acting upon angle lever 400 to push the open-limit switch 402. However, when the press is closed, the lower platen rises and cam 398 is shifted from the upper position shown in Fig. 35, to the lower position shown in Fig. 36. At this time the cam 398 bears against angle lever 404 and causes it to shift the closed-limit switch 390 from the right-hand position shown in Fig. 35, to the left-hand position shown in Fig. 36.

The changes in electrical circuit produced by this shifting of the closed limit switch 390 may be outlined as follows. Referring to the manual automatic switch in Fig. 28, L2 power is taken at switch blade 338, through conductors 340, 406 and 408 to terminal 10 of connector 410, and thence through wire 10 of cable E. Referring now to Fig. 35, wire 10 of cable E runs to the switch blade of limit switch 390. When the press is open, the current continues through conductor 412 to indicator lamp 414, which indicates that the limit switch is "open." By "open" I refer to the true function of switch 390 as a limit switch, for which purpose a single-blade, single-throw switch may be used. The other contact leading to wire 412 is solely for the purpose of lighting indicator lamp 414, and it is for this reason that I speak of the switch as being "open" or "closed," depending on whether or not it is closed to conductor 416. With the limit switch "open" it is not in a position to advance the cycle control or cam shaft contact disc. The lamp circuit through lamp 414 is completed by way of wire 11 of cable E which, reverting to Fig. 28, runs to terminal 11 of connector 410, which in turn is connected by wires 418 and 92, to terminal 1 of strip 60, which is common return Ll.

When the molding press is closed, the current flowing through switch 390 (Fig. 35) is taken away from lamp 414, and applied through the left-hand contact and wire 416 to wire 8 of cable E. Referring now to Fig. 28, wire 8 of cable E leads to terminal 8 of connector 410, which in turn is connected by means of wires 420 and 422 to lower terminal 8 of strip 60, which in turn leads to wire 8 of cable B. Referring now to Fig. 29, wire 8 of cable B leads to terminal 8 of connector 120, which in turn leads through conductor 424 to contact 3 of the cam shaft contact disc 192. As was previously explained, energization of contact 3 will initiate movement from contact 3 to contact 4.

Reverting to Fig. 28, the previously described current flowing from terminal 8 of connector 410 through wire 420 also flows upwardly through wire 426 to terminal 6 of strip 24, and thence through wire 428 to terminal 7 of clock strip 430, from which the current flows through conductors 432 to starting solenoid 436 of the low pressure timing clock. The solenoid circuit is completed by way of conductor 438, terminal 1 of strip 430, conductor 440, conductor 442, terminal 2 on strip 24, conductor 444, and then upwardly on wire 36 to main switch R—7 and common return Ll. The energization of solenoid 436 raises the solenoid core, which in turn closes contact d through toggle link 437, and also starts the adjustable timing cycle, that is, the effective timing under drive of clock motor 50.

Holding contacts might be provided for solenoid 436, but are unnecessary on the low pressure clock, because solenoid 436 is continuously energized as long as the closed-limit switch 390 (Fig. 35) is closed, and as long as current is supplied through relay R—5 (Fig. 29). It is not meant that solenoid 436 is continuously energized at all times. It is initially energized at the proper time by the closing of the main press limit switch, and is de-energized with the opening of relay R—5 (Fig. 29) which opens the circuit between line L2 and the closed-limit switch at the main press.

The reason for closing the contacts d at this time is that stepping of the cycle shaft from position 3 to position 4 opens the circuit connection from the low pressure valve relay R—1 (Fig. 30) to segment 294 on drum 233 (Fig. 29), which might prematurely close the low pressure valve instead of leaving it open. It may be noted that when the closed-limit switch closes, causing the low pressure time clock to come into its timing cycle, the burden of holding the low pressure valve in its open position is taken over by the clock and is taken away from the cycle shaft. The cycle shaft initially takes over the function of opening the low pressure valve, so as to close the press to start the molding operation. It is then necessary to bring in the timing clock in order to time the low pressure cycle, because different molding compositions and different sizes of product are given different curing times, and this time is readily changed for optimum results at the timing clocks, which are provided for that very purpose. The segment 294 on drum 233 (Fig. 29) is localized at step 3 so that the low pressure clock will have full control, that is, so that the valve will not be held open by the segment 294 alone. Segment 294 is completely open to finger 6 in the No. 4 and succeeding positions. Segment 294 initiates the closing of the press, but has nothing to do thereafter with the duration of time over which the press remains closed. It will be noted that terminal 3 on strip 24 is fed with L2 current through relay R—5 (Fig. 29), and opening of relay R—5 will cause this supply circuit at terminal 3 is to be de-energized. In general, in this apparatus, L2 current is fed either directly, or in many cases through what might be termed an L2 "safety supply," the sole distinction being that the safety supply flows through relay R—5 and is therefore susceptible of being cut off instantaneously by pressing safety stop button 264 (Fig. 40). It was previously explained that depression of the safety stop button permits all valves to run to normal position with consequent opening of the presses. The clock solenoid current is taken through the L2 safety supply so that the clocks will be interrupted and reset to zero in case the safety button is used. However, this does not affect the supply of L2 current to the clock driving motor 50, which continues to run at all times while the manual-automatic switch is in the automatic position. The reason for this will be explained later in connection with a description of the safety stop clock mechanism.

The circuits connected with contacts d may be outlined as follows. Terminal 3 on strip 24 is the L2 safety supply for the clock mechanism. Current flows through wires 450 and 458, to terminal 2 of high pressure clock strip 460, from which it flows through wires 462 and 464 to the movable center blade of contacts g. This is normally closed downwardly, and the circuit continues through wire 466 to terminal 3 on strip 460 and thence through wire 468, to terminal 5 on strip 430, and thence through wire 470 to contacts d. At this time the contacts d are closed, and therefore the circuit continues through wire 472 to terminal 4 on strip 430 and thence through wire 474, to terminal 7 on strip 24, from which the circuit continues through wires 476, 356 and 358, to switch blade 360, and then as was earlier traced, this leads ultimately to relay R—1 (Fig. 30) of the low pressure valve. This keeps the relay energized and hence the low pressure valve remains opened during a period which is timed by the low pressure timing clock.

Running out of the low pressure timing clock causes it to initiate starting of the high pressure timing clock. This is done by a cam 446 closing contacts e, which in turn energize the starting solenoid 486 of the high pressure clock. Cam 446 is rotated by clock motor 50 during the timing by the low pressure clock, and when the predetermined adjusted time has run out the contacts e are closed. When cam 446 on the low pressure timing clock reaches contacts e, L2 safety current is supplied from terminal 3 on strip 24 through wires 450, 452, terminal 2 on strip 430, and wire 478, to contacts e. These being closed, the current flows through wire 480, terminal 6 on strip 430, wire 482, terminal 7 on strip 460, and wire 484, to solenoid 486 of the high pressure timing clock. The solenoid circuit is completed by means of conductor 488 leading to terminal 1 of strip 460, wires 490, 440, and 442, back to terminal 2 of strip 24, which is common return L1. Slightly after, say one second after cam 446 closes contacts e, contacts d are opened, and relay R—1 (Fig. 30) is de-energized. The clock shaft turns not only cam 446 but also a crank 447 which mechanically breaks the joint in toggle link 437, thereby releasing the low pressure clock. It immediately resets preparatory to another timing cycle to be begun whenever solenoid 436 is deenergized by opening the main-press closed-limit switch 390 (Fig. 35), and is again energized by closing the press and switch 390.

The energization of solenoid 486 starts the high pressure clock, the solenoid shifting the contacts f and g through toggle link 487. Contacts f control a holding circuit for solenoid 486. It will be noted that shifting the movable member of contacts g from the lower contact to the upper contact, opens that circuit previously described, which supplies current to relay R—1 (Fig. 30) of the low pressure valve, thus allowing the low pressure valve to run closed. At the same time a circuit is closed through the upper contact (g in Fig. 28), and current is supplied to relay R—2 (Fig. 30) of the high pressure valve, thus causing the high pressure valve to run open.

The running out of the low pressure clock which initiates closing of the low pressure valve, simultaneously initiates opening of the high pressure valve, so that the valves "cross" each other. This is done intentionally because if there is any time interval between closing the low pressure valve and opening the high pressure valve there will be a resulting shock or blow upon admission of the high pressure water. If there is any appreciable time occurring between the closing of the low pressure valve and the opening of the high pressure valve, leakage of water around the main press cylinder gasket would cause the press to relax its pressure, and opening of the high pressure valve admitting high pressure water might cause destructive sudden closing of the press. This dependable opening of the high pressure valve before closing of the low pressure valve is one of the important advantages of the present automatic molding apparatus (compared to hand operations). There is no loss of high pressure fluid into the low pressure supply line because a check valve 556 (Fig. 30) is provided between the low pressure valve 372 and the high pressure valve 434, in accordance with conventional practice.

Considering the circuits associated with contacts f in greater detail, L2 safety current flows from terminal 3 of strip 24 through conductor 450, conductor 458, terminal 2 of strip 460, conductor 462, contacts f, conductor 492, and conductor 484 to solenoid 486. The circuit from the solenoid is completed by wire 488 leading to terminal 1 of strip 460, which is the common return line 1 (completed to terminal 2 on strip 24 by wires 490, 440 and 442). The continued energization of solenoid 486 keeps the contacts f and g in shifted position until the high pressure time runs out. Also during this time the cam 530 associated with contacts h, and the crank 731 associated with toggle link 487, are being rotated by clock 50. The effect of this will be taken up later.

The circuits associated with contacts g may be described in detail as follows. The opening of lower contacts g interrupts the circuit from the center blade through the lower contact wire 466, terminal 3 of strip 460, wire 468, terminal 5 of strip 430, wire 470, contacts d of the low pressure clock, wire 472, terminal 4 of strip 430, wire 474, terminal 7 of strip 24, wire 476, downward on wire 358, to switch blade 360, and thence on wire 362, to upper terminal 3 of strip 60 and so to wire 3 of cable C.

Referring now to Fig. 30, the circuit continues through cable C, terminal 3 of connector 64, wire 364, terminal 5 of connector 70, and wire 5 of cable I to the magnet of relay R—1. The resulting de-energization of the magnet (because of opening of the bottom contacts g in Fig. 28) causes the contacts of relay R—1 to shift back to the position shown in Fig. 30, so that the low pressure valve runs closed. The circuit through the right-hand side of contact group 76 is broken, this leading through wire 368, contact 370 which, at this time, is in upward position, wire 3 of cable I, terminal 3 of connector 70, wire 386 to red lamp 388, thereby extinguishing the red lamp. Contact group 76 is closed to the left side and current flows from wire 2 of cable I through the left-hand contact of group 76, wire 78, the upper contact of limit switch 80, the speed-adjusting resistor 494, and wire 496 through field 376. It will be noted that the direction of current flow is in the opposite direction to that previously described for the opening of the valve. The circuit continues through wire 498, and the left-hand contacts of group 380, wire 382, through armature 384 and then back to wire 1 of cable I and the common line 1 return. This causes the motor to run in such a direction as to close the low pressure valve 372. Upon closure of low pressure valve 372, limit switch 80 shifts from the upper contact to the lower contact. Current now flows from center blade of contact group 76, through the left-hand contact, wire 78, limit switch 80 in its lower position, wire 4 of cable I, contact 4 of connector 70, and wire 82 to green lamp 84. The lighting of the green lamp indicates that the valve has been closed, and replaces the now extinguished red lamp 388 previously indicating the valve to be open.

Returning now to Fig. 28, the shifting of the center blade of contacts g from lower to upper position not only closes the low pressure valve, as just described, but also opens the high pressure valve, as is next described. Line 2 current from the center blade of g flows through the upper contact wire 500, terminal 4 of strip 460, wire 502, terminal 8 of strip 24, wire 504, down on wire 506, to switch blade 508, and thence through wire 510, to upper terminal 4 of strip 60 and so to wire 4 of cable C.

Referring now to Fig. 30, wire 4 of cable C leads to contact 4 of connector 64, which in turn leads through wire 512, contact 5 of connector 72, wire 5 of cable J to the magnet of relay R—2. The magnet circuit is completed by wire 514 leading to wire 1 of cable J, contact 1 of connector 72, wire 88, and wire 90, to contact 1 of connector 64 which, as previously described, is common return line 1.

The energization of R—2 magnet shifts the contacts from the left-hand position shown to the right-hand position. The result of this change of contacts need not be described in detail, because the circuits associated with R—2 duplicate those previously described in association with relay R—1, and the change in contacts results in operation of the motor for the high pressure valve in that direction which causes opening of the high pressure valve. Similarly, it results in lighting of the red lamp 516 and extinction of the green lamp 104, the green lamp going out as the relay shifts its contacts, and the red lamp being lighted when the open limit switch 518 is changed by completion of opening of the valve. The motor armature designated 520 corresponds to armature 384 for the low pressure valve motor, and the motor field 522 corresponds to field 376 for the low pressure valve motor. The limit switch 100 is a closed-limit switch, and limit switch 518 is an open-limit switch, these corresponding respectively to limit switches 80 and 370 for the low pressure valve.

In the meantime, the starting of the high pressure clock is accompanied by initiation of movement of the cycle control shaft (Fig. 29) away from position 4 toward position 5. This is done as follows. Referring to Fig. 28, the circuit closed by upward movement of contact g and flowing through wires 500, 502 and 504, branches downwardly through wire 524, terminal 4 of strip 178, and so to wire 4 of cable A.

Referring next to Fig. 29, wire 4 of cable A leads to terminal 4 of connector 176, which in turn leads through wire 526 to contact 4 of cycle shaft contact disc 192. As was previously described, energization of any one contact initiates movement of the movable contact arm from that contact toward the next. It will now be noted that contacts 4, 5, 6, 7, 8, 9 and 10 are all connected together by jumpers 528. Thus the contacts from 4 to 10 are all made alive simultaneously, and the cycle shaft will run continuously from position 4 to position 11, where it reaches dead contact 11. This section of the cycle movement is not in use in the automatic molding machine as here described. It is provided to make it possible to add other cycle steps if necessary. For example, if parts are to be molded in which bad gas pockets are formed in the mold, it may become desirable to open or vent the mold to relieve these gas pockets. Under this condition, cycle steps between 5 and 10 may be used in conjunction with segments on drum 233 to open the mold for venting, to hold it open for a desired time period, and to again close the mold to continue the molding operation. However, one important advantage of the present invention is that the pills are heated, as well as pressed, and are then exposed to the atmosphere without pressure during transfer from the pill press to the molding press, thus affording free escape of gases, so that additional venting during the molding operation has so far, in my experience, not been needed.

Referring to Fig. 28, the clock motor 50 drives not only the low pressure clock mechanism and the high pressure clock mechanism previously referred to, but also a mechanism marked "Safety stop." This merely defines a maximum time interval in which the machine should perform its complete cycle of operation. If the operation is not completed well within this maximum time allowance, something has gone wrong, and upon the expiration of the maximum time without the cycle being completed, the safety stop will act on contacts b and a to completely shut down the machine and to provide a warning signal. These contacts are so connected in circuit with contact h of the high pressure clock that opening of the contact h which marks the end of the molding cycle makes the safety stop contacts inoperative to shut down the machine. This safety stop clock mechanism is placed on the machine as a watch over the time required to complete a single molding cycle. The measuring period for the molding cycle starts at the expiration of the high pressure time period and finishes approximately two seconds before the high pressure time period expires. This allows a period of two seconds out of each molding cycle, during which the safety stop is allowed to release and reset.

The release and the reset of the safety stop clock is brought about through the opening of contacts h by cam 530. The circuit for the solenoid 532 of the safety stop clock is as follows. Line 2 current is taken from terminal 4 of strip 24, through wire 534, terminal 6 of strip 460, to normally closed contacts h. The circuit continues to terminal 5 of strip 460, wire 536, switch 538, wire 540 to terminal 7 of strip 28, and wire 542 to solenoid 532. The return circuit runs through wire 544 to wire 54, terminal 1 of strip 28, wire 56, and wire 442 to terminal 2 of strip 24, which is line 1 return.

The normal energization of solenoid 532 causes the cams 546 and 548 to be driven by clock motor 50. These cams are rotated away from contacts a and b back to a stop by a conventional return spring, not shown. The time required by clock motor 50 to move cams 546 and 548 to engage contacts b and a respectively is adjusted by moving the stop to a greater or lesser distance from the camming contact point. This adjustment is made when placing the machine in operation, and as long as switch 538 and contacts *h* on the high pressure clock are closed, cams 548 and 546 are caused to approach contacts *b* and *a* respectively by clock 50. The opening of switch 538 or of contacts *h* on the high pressure clock will cause de-energization of magnet 532, and the time that has been consumed in moving the cams is cancelled, the cams being reset to the stop. Re-energization of solenoid 532 will start the cycle time measurement all over again. Just before the crank 731 of high pressure clock strikes the toggle link 487 the cam 530 opens contacts *h*, allowing the safety stop cams to reset.

The functioning of contacts *b* and *a* will be explained later. In the normal operation of the machine these contacts are not called upon to function, due to the fact that contacts *h* are opened before contacts *b* and *a* are acted upon by their cams. The only time contacts *b* and *a* are acted upon by their cams is when something abnormal in the operation of the machine causes an extension of the cycle time period to an amount greater than that allowed by the safety stop clock.

As the high pressure time clock approaches its predetermined time setting, the crank 731 associated with cam 530 breaks the toggle link 487, causing contacts *f* and *g* to assume the lower position, in the drawing shown. Opening of the contacts *f* opens the holding circuit of solenoid 486, and the opening of the upper contact *g* opens the circuit to the high pressure valve relay R—2 (Fig. 30). It will be noted at this point that closing of the lower contact on contact *g* does not again open the low pressure valve, because contact *d* on the low pressure clock is now in open position, due to the earlier breaking of the toggle 437 on the low pressure clock. Upon breaking of the toggle 437 the contacts *d* will be in the position shown regardless of whether or not a continuous circuit exists through the solenoid 436.

The opening of the upper contact of group *g* on the high pressure clock severs the circuit to R—2 (Fig. 30) of the high pressure valve, and this shifts the contacts of R—2 and operates the motor in reverse direction to close the high pressure valve, all as was described in greater detail in connection with the low pressure valve. With the closing of the high pressure valve, contacts of transfer switch 550 (Fig. 30) are closed momentarily. This closes a circuit between wires 7 and 8 of cable J, which are connected to contacts 7 and 8 of connector 72, which in turn are connected through conductors 552 and 344 respectively to contacts 6 and 8 of connector 64. These lead to wires 6 and 8 of cable C. Referring now to Fig. 28, wires 6 and 8 of cable C lead to upper terminals 6 and 8 of strip 60.

As was previously explained, switch blade 338 of the manual automatic switch, which is in the right-hand position during automatic operation, is connected to line 2, and line 2 current then flows through wire 340, and wire 342 to upper terminal 8 of strip 60, which in turn is connected to wire 8 of cable C. Thus, terminal 8 of strip 60 is connected to line 2 and may be considered as a source of current supply, while terminal 6 of strip 60 continues on downward through wire 6 of cable B. Referring now to Fig. 29, wire 6 of cable B leads to contact 6 of connector 120, which in turn leads through wire 554 to contact 11 of the cycle shaft contact disc 192. Energization of contact 11 initiates a movement from position 11 to position 12.

On reaching position 12, drum 233 has now broken the connection between segment 292 and finger 5 (group 236), which connection held the release valve relay R—3 (Fig. 30) energized. De-energizing R—3 causes the release valve to run to its open position. It will be noticed that the actual closing of the high pressure valve initiates the operation of the cycle shaft which in turn causes opening of the release valve. The release valve is not opened by mere expiration of the time period, but is opened only by an indication received from the high pressure valve that it has been closed, this eliminating the possibility of high pressure water being allowed to flow out through the release valve by opening of the release valve before the high pressure valve becomes closed. If the high pressure valve and release valve were allowed to cross each other in their action, as do the low pressure valve and high pressure valve, high pressure water would be rushing through the valve aperture in the high pressure valve and out through the release valve when the valve needle is caused to seat. Closing the valve with the water rushing through it would soon erode and spoil the seat. This fault is in addition to the obvious waste of high pressure fluid.

The valve control circuit for the release valve is not a duplicate of the control circuits of the low and high pressure valves, for the normal position of the latter is closed, that is, with no current on their respective relays R—1 and R—2, these valves are closed. The wiring at R—3 is reversed, so that de-energization of the R—3 magnet causes the release valve to open. The normal position of all valves is the safe position, with the press open. Thus the accidental severing of all of the magnet circuits in R—1, R—2 and R—3 will cause these valves to run normal, which is closed for the low pressure valve, closed for the high pressure valve, and open for the release valve. Also, it may be said, without going into detail at this point, that this is what occurs when the safety stop clock functions.

At the beginning of the description of the wiring it was explained that energization of relay R—3 shifts the contacts to the right-hand position, at which time the motor runs the release valve closed. The de-energization of the magnet of R—3 now produced permits the contacts to return to normal position, and the motor circuit are connected with the field and armature relatively reversed, so that the valve is run to open position. When opened the open-limit switch 110 takes care of de-energizing the motor, much as was previously explained, and lights the red indicator lamp 114, indicating the open condition of the valve. The green lamp was extinguished by shifting of the relay contacts. The opening of the release valve releases the water in the cylinder of the main press, and the main press starts opening.

As the main press starts opening, cam 398 is in the position shown in Fig. 36, in which cam 398 is holding the closed-limit switch 390 in closed position. Rod 392 moves down and cam 398 moves in a clockwise direction (Fig. 36) causing cam 398 to release switch 390 to open. On the shaft 396 is an additional arm 558 carrying on its outer end a pawl 560 which is held in the position shown in Fig. 36 by a pull spring 562. As shaft 396 turns in a clockwise direction the notched end of pawl 560 catches on the operating plunger of switch 564, and further motion of arm 558 causes a straightening action to occur between arm 558 and pawl 560, thus pressing inward on the plunger, as is shown in Fig. 37. The arm 558 and pawl 560 are first brought into alignment, following which no further relative movement is possible, so that the continued movement of the arm reacts on the switch plunger and shifts the switch from the right-hand position of Figs. 35 and 36 to the left-hand position of Fig. 37. This marks the approach to the part or half-open position of the press (making room for entry of the catchboard).

Referring to Fig. 28, line 2 current is picked up from switch blade 40 of the manual automatic switch and fed through wire 42 and wire 566 to contact 9 of connector 410, and thence to wire 9 of cable E. Reverting now to Fig. 35, wire 9 of cable E leads to switch 564, which now being of cable E leads to switch 564, which now being momentarily in its left-hand position (as shown in Fig. 37), the circuit continues through the upper left-hand contact of switch 564 to wire 7 of cable E.

Reverting to Fig. 28, wire 7 of cable E leads to contact 7 of connector 410, which leads through wire 568 to lower terminal 5 of strip 60, which in turn leads to wire 5 of cable B. Referring now to Fig. 29, wire 5 of cable B leads to contact 5 of connector 120, which in turn leads through wire 570 to contact 12 of the cycle shaft contact disc 192. Energization of contact 12, even though only momentary, suffices to initiate the desired stepping of the shaft from position 12 to position 13. On reaching position 13 the rightward projection 572 of the slip ring 240 of drum 232 is now in contact with finger 5 of group 236. As previously explained, finger 5 is the circuit connection for relay R—3 (Fig. 30) on the release valve. Energizing finger 5 (group 236) causes relay R—3 to shift its position, and the release valve now runs closed.

The closing of the release valve arrests the opening movement of the main press. This leaves the press in a half open position with the molded pieces or product on the upper half of the mold, the stripper plate not yet acting. At this point the main press is dormant, and if the pill press is in operation, the main press waits at this point until the pill press completes its release and pill ejection cycle.

In this description so far I have not included the pill press and its operation. I have centered my description on the molding press. The pill press circuits and powder measurer circuits are described in detail later. However, I shall at this point refer to the "state of repose" of the pill press. In this state of repose, the pill press is open, the open-limit switch on the pill press is closed, and the down-limit switch of the pill ejection means is closed. This state of repose is a condition that the pill press will assume if the pill press operating switch is open, so that no action occurs at the pill press during the molding cycle. I so arrange the circuits that this state of repose brings about a continuous connection through the controlling limit switches, such that the operating cycle of the main molding press can continue past this point. On the other hand, had the pill press been in operation to produce pills during the molding cycle, its limit switches would be in a position such that it would be necessary for the main molding cycle to wait at this point (cycle position 13) until completion of the pill press cycle.

The advantages of so arranging the circuit that the molding press may continue while the pill press is in a state of repose, are as follows.

In setting up the machine it is possible to go through an automatic cycle at the molding press, without molding material, in order to exercise and test the mold and the stripping mechanism before putting pills therein. Also, in shutting the machine down, and in moving parts of the machine for examination, it is possible to take the pill press out of operation, yet leave an automatic molding cycle that will continue clear through to its completion without interruption from the pill pressing and powder feeding systems. In other words, the automatic cycle of the main press is independent and is not affected by the pill press when the pill press is intentionally withdrawn from operation, but when the pill press is placed in operation, the cycle of the main molding press comes under the influence of and is definitely interrelated with and dependent upon the pill press cycle.

In the state of repose of the pill press circuit, line 2 current flows from contact 2 of connector 120 (Fig. 29) through wires 122, 124, 126 and down wire 574 to terminal 2 of strip 160, and then through wire 2 of cable L. Referring now to Fig. 40, wire 2 of cable L leads to L2 terminal of strip 162, which is connected to wire 2 of cable P. Referring now to Fig. 31, wire 2 of cable P leads to terminal 2 of strip 576, which is connected to upwardly running wire 578 to contact 14 of connector 580. This leads through wire 14 of cable O upward to open-limit switch 582 of the pill press, which switch is now in contact with its upper contact, as shown in the drawings. The circuit continues through wire 15 of cable O downward to contact 15 of connector 580, which leads through wire 584 to contact 15 of connector 586. This leads through cable S to switch 588, which is the ejection limit switch of the pill press. With the ejector plate in retracted position, the switch is closed, as shown, and the circuit continues back through cable S to contact 10 of connector 586, which leads through wire 590 to terminal 10 of strip 576, which is connected to wire 10 of cable Q.

Referring now to Fig. 40, wire 10 of cable Q becomes wire 10 of cable L, and referring now to Fig. 29, wire 10 of cable L leads to terminal 5 of strip 160. This is connected by means of wire 592 to contact 13 of cycle shaft contact disc 192. Energization of contact 13 steps the cycle shaft from position 13 to position 14. In passing from position 13 to position 14 the loader clutch is mechanically tripped to move the loader forward to its middle position, that is, to the point at which the catchboard is in the molding press and the pillboard is in the space between the two presses. When this position is reached the loader position drum switch 146 (Fig. 29) has moved into its center position where contact is now made to finger 594. Line 2 current now flows from finger 142 to slip ring 144, to segment 152, to finger 594, and then along wire 596 to contact 14 of cycle shaft disc 192. The energization of contact 14 steps the cam shaft ahead to contact 15.

In position 15 of drum 232, 233 the finger 5 of group 326 leaves projection 572 of slip ring 240. The severing of the connection to finger 5 again causes the release valve relay R—3 (Fig. 30) to be de-energized, and the release valve again runs open, and the main press resumes its opening movement from the half open to the full open position, thereby bringing about the stripping operation which strips the molded pieces from the upper portion of the mold, so that they fall onto the catchboard. When the main molding press reaches its lower limit, that is, completely open, link 392 will be pulled down to the position shown in Fig. 35, and cam 398 moves arm 400 to change switch 402 to the left-hand contact, as shown.

It was previously shown that wire 9 of cable E supplies line 2 current, and this is connected at 600 to switch 402. The current then flows through the switch to wire 12 of cable E. Referring now to Fig. 28, wire 12 of cable E leads to contact 12 of connector 410, and this is connected by wire 602 to contact 12 of connector 604, and so to cable F. Referring now to Fig. 38, the wire 12 of cable F leads to switches 606 and 608 which are connected in series. Switches 606 and 608 are attached to the sides of the mold and are closed when the stripper plate reaches its extreme lower position. When the mold is closed, these switches are open, and when the mold is open and has been stripped, these switches are closed. The circuit then continues through the switches to wire 11 of cable F.

Returning now to Fig. 28, wire 11 of cable F leads to contact 11 of connector 604 which leads by way of wire 610 to terminal 11 of strip 60. This is connected to wire 11 of cable B. Referring now to Fig. 29, wire 11 of cable B leads to contact 11 of connector 120, which leads through wire 612 to contact 15 of the cycle shaft contact disc 192. This steps the cycle shaft ahead from position 15 to position 16. When passing from position 15 to position 16 the loader clutch is again mechanically tripped, and the loader moves to its advanced position, that is, the catchboard moves beyond the molding press and dumps the finished pieces, and the pillboard moves into the main molding press and drops the preforms into the main mold. The loader remains in advanced position because the clutch at the sprocket shaft is a single revolution clutch.

With the loader in its advanced position, contact is made at the loader position drum switch 146 (Fig. 29), segment 154 engaging finger 616. Current then flows from slip ring 144 to segment 154, finger 616, and wire 618 to contact 16 on the cycle shaft contact disc. This makes contact 16 alive while finger 616 remains on segment 154. Contacts 16, 17, 18 and 19 are connected together by jumper 614, so that the cycle shaft continues all the way to position 20. As the cycle shaft passes from position 19 to position 20 the return loader clutch is mechanically tripped, causing the loader to return to its middle position with the pillboard between the two presses. The slight delay provided by using the four contacts 16, 17, 18 and 19 connected together, instead of one contact, allows the loader to remain in advanced position for a sufficient period of time to insure sliding of the finished molded parts off of the catchboard, and dropping of the preforms into the mold cavities.

The cam shaft moves through the positions 16–19 continuously until it reaches position 20 on the cycle shaft contact disc 192. The loader is in central position but need not and does not stop there during its return movement. It will be noticed (at loader position switch 146) that segment 152 is extended in the direction of segment 154, that is, in moving from segment 154 which is in contact with finger 616, toward segment 152 which is to make contact with finger 594, contact will be made earlier than the exact stopping position of the loader, due to this lengthened segment 152. Finger 594 is connected through wire 596 to segment 20. The early contact between segment 152 and finger 594 causes the cycle shaft to step from position 20 to position 1 before the loader reaches the mid-position. This causes the cycle shaft to trip the loader return clutch just as the loader reaches the mid-position, therefore the loader does not stop at mid-position, but continues returning until it reaches its retracted or home position in the pill press.

In respect to the clock mechanism in Fig. 28, it will be understood that there are in effect three timing clocks, a clock for timing the low pressure period, a clock for timing the high pressure period, and a safety stop clock. It happens that in the present case all of the timing mechanisms are driven from a common shaft which is driven by a single synchronous motor or clock motor. The settings are all independent, and depend on the adjustment at each clock, which adjustment limits the reset distance of the cams when the clocks are reset. The shaft rotates continuously, but only that fraction of a rotation between the reset point and the run-out or tripping point is actually used at each clock. Of course, completely separate clock mechanisms may be used, each of which has its own clock motor, if desired.

*Wiring for the pill press*

In describing the operation so far, I did not include the pill press, this being omitted in order not to further complicate the description. Referring to Fig. 31, the pill press is controlled by a single main valve 646 and its ejection is controlled by a single main ejection valve 722. These are driven by motors 660 and 726 respectively, which are controlled by relays R—8 and R—9, respectively. The valves 646 and 722 are merely symbolized in Fig. 31, the valve being better shown, though only schematically, in Fig. 51, in which part 747 goes to the cylinder; part 749 to the pressure source; and part 751 to exhaust. The single valve member 753 connects part 747 to either part 749 or 751. It is moved by eccentric 755.

The detailed wiring may be traced as follows: When the cycle shaft reaches position 3, contact is made from segment 296 on drum 233 (Fig. 29) to finger 7 of group 236. Slip ring 290 is energized from line 2S. Current therefore flows through finger 7 and wire 622 to contact 1 of connector 176. This leads to cable A. Referring now to Fig. 28, wire 1 of cable A leads to terminal 1 of strip 178, which leads through wire 624 to switch blade 626. The current then flows through wire 628 to terminal 9 of strip 60, which is connected to wire 9 of cable B.

Referring now to Fig. 29, wire 9 of cable B runs to contact 9 of connector 120, which leads by means of wire 630 to terminal 9 of strip 160. This is connected to wire 7 of cable L. Referring now to Fig. 40, wire 7 of cable L leads to terminal 7 of strip 162, which is connected through wire 7 of cable AA, to the right-hand blade of switch 620, and back through wire 8 of cable AA to terminal 8 of strip 162. The latter is connected to wire 3 of cable P. Referring now to Fig. 31, wire 3 of cable P runs to terminal 3 of strip 576, which is connected by wire 632 to the magnet of relay R—8. The magnet circuit is completed by wire 634 to wire 636 which runs sidewardly and then upwardly to terminal 1 of strip 576. This is connected to wire 1 of cable P.

Referring now to Fig. 40, wire 1 of cable P leads to terminal L1 of strip 162, which is common return line 1. The resulting energization of the magnet relay R—8 (Fig. 31) shifts the center blade from the right-hand position shown, to the left-hand position.

Referring now to Fig. 40, line 2 current flows from terminal L2 of strip 162 to wire 2 of cable P. Referring to Fig. 31, wire 2 of cable P leads to terminal 2 of strip 576. This is connected by wire 638 to the center blade of relay R—8. In its normal position with the relay closed to the right, the current flows by way of conductor 640 to terminal 8 of connector 642. This leads through wire 8 of cable U to closed-limit switch 644 for the pill press valve 646.

This valve 646 is the pressure valve of the pill press. Closing and opening of the pill press requires only a single valve, the opening movement being obtained by constant low water pressure (ordinary city water supply) applied to the underneath side of the ram plunger. This acts as an hydraulic spring for ram return purposes. It may be mentioned that the main pressure used for closing the pill press is the same as the low pressure for the main press, no additional extra high pressure being needed.

Limit switch 644 is in down position, corresponding to closed condition of pill press valve 646, and current flows back through wire 10 of cable U to terminal 10 of connector 642, and thence through wire 648 to wire 8 of cable W, which is connected to green lamp 650. This indicates that the valve is closed. The return circuit for the lamp is by means of a common lamp return 652 which becomes wire 1 of cable W, and this is connected to terminal 1 of strip 576 which, as previously described, leads to common return line 1.

Now the energization of the magnet of relay R—8 shifts the movable contact from the right-hand position to the left-hand position, and consequently the green lamp is extinguished, and line 2 current flows from the movable blade of relay R—8 to the left-hand contact, and through wire 654 to terminal 11 of connector 642, from which it is led by means of wire 11 of cable U to the open-limit switch 656 of the pill press valve 646. The valve being closed, the open-limit switch 656 is closed downwardly, as shown, and the current flows through wire 658 to series-connected valve operating motor 660, the return from which is through wire 7 of cable U to contact 7 of connector 642. This is connected by means of wire 662 to wire 636 which, as previously described, returns to common return line 1 at terminal 1 of strip 576.

The resulting energization of valve motor 660 opens valve 646 until it reaches its open limit. As valve 646 opens, switch 644 shifts from its lower contact to its upper contact, and switch 656 shifts from its lower contact to its upper contact. The circuit to motor 660 through switch 656 is now interrupted. Instead, the current flows from the upper contact of switch 656 through wire 664, which becomes wire 9 of cable U, leading to contact 9 of connector 642, which is connected to wire 666, which becomes wire 7 of cable W, which leads to the red lamp 668, indicating that the valve has opened. The green lamp was already extinguished by the shift of relay 8 from right-hand position to left-hand position. The motor 660 is not a reversing motor, because the mechanism includes an eccentric which, on turning half a revolution, opens the valve, and on turning another half revolution, closes the valve. The pill press valve need not be a screw stem needle valve, such as is so desirable for the high pressure press.

The upward movement of closed-limit switch 644 does not at this time start motor 660, because the circuit leading to switch 644 is opened at relay R—8, which is not closed to the left. The movement of limit switch 644 at this time is merely preparatory to closing of valve 646 at a later time.

With pill press valve 646 open, the pill press begins to close under hydraulic power. As the pill press closes, rod 670 (Figs. 19 and 31) is pulled downward, thereby changing switch 582 from the upper position shown in Fig. 31 to its lower position. Also, on continued downward motion, cam 672 engages arm 674, thereby pushing in on the operating plunger of switch 676. Finally pawl 678 latches back of arm 674, holding switch 676 locked in its inward position, that is, closed to the right. Also, as the pill press closes, another cam rod 680 (Figs. 19 and 31) moves downward, bringing the reduced portion 682 in front of the operating pin of a third switch 684, allowing the switch to open to the left.

Cam 672 on rod 670 is so adjusted that arm 674 is latched by pawl 678 just as the pill press is fully closed to its normal pill pressing position. This location of the cam 672 on rod 670 will not allow the arm 674 to be latched by pawl 678 if the pills are only partially formed. When completely formed, the pills are thinner, and this allows the press to close far enough to latch arm 674 back of pawl 678. Cam 672 is accurately adjustable along rod 670 for this purpose.

The moving of switches 582, 676 and 684 at this time is preparatory to ejection of the finished pills. The latching is to insure ejection taking place. Referring to Fig. 29, and cycle drum 233, it is evident that as long as finger 7 (group 236) is on segment 296 the pill press valve 646 (Fig. 31) will remain open. However, on reaching position 12 of the cycle control shaft, this circuit is opened, allowing relay R—8 (Fig. 31) to return to its right-hand position, and causing valve 646 to be closed. It will be here noted that the pill press has no timing clocks of its own. The control of the pill press through the cycle drum 233 is entirely dependent on the timing and cycle of operation of the main molding press. This takes advantage of the maximum length of time which the pills can remain in the pill press, so that they will absorb as much heat as possible from the heated pill mold.

When cam shaft position 12 is reached, as previously explained, the main press starts to open and, at this time, the pill press also starts to open. However, an additional contact is closed at position 12, namely segment 244 (Fig. 29) on drum 232 engages finger 2 of group 236. Current then flows from finger 2 through wire 686 to terminal 8 of strip 160, which is connected to wire 8 of cable L. Referring now to Fig. 40, wire 8 of cable L becomes wire 4 of cable Q. Referring now to Fig. 31, wire 4 of cable Q runs to terminal 4 of strip 576, which is connected by means of wire 688 to contact 14 of connector 690. This leads to wire 14 of cable N which is connected at its upper end to switch 684.

Switch 684 is an ejection clearance switch, the purpose of which is to hold the pill press from ejecting the pills until the pill press plungers or force plugs have reached a position sufficiently high above the pillboard, to permit the ejection plungers to raise the pills fully into the pillboard without obstruction by the force plugs. Cam 680 is adjustably attached to the ram of the pill press, so that the cam portion where it narrows to part 682 can be moved up or down to suit the size of the pills being ejected.

It is assumed that at this time the pill press has raised cam 680 far enough to close switch 684, thereby closing the circuit. The circuit continues through switch 684 and wire 692 to interlock switch 676. At this time the interlock switch is held closed to the right because of pawl 678. Current flows through wire 694 to wire 15 of cable N, which leads to contacts 15 of connector 690, and this is connected by wire 696 and wire 698, to the magnet of relay R—9. The magnet circuit is completed by wire 700 connected to wire 636, which, as previously traced to the right, leads to terminal 1 on strip 576 and so to common return line 1.

The energization of relay R—9 changes the movable blades from the right-hand position shown in Fig. 31 to the left-hand position. When relay R—9 moves from the right-hand position to the left-hand position, it closes a holding contact 702. Current now flows from cable N and the previously energized wire 688, down wire 704, to switch blade 702, and then through wire 706 to terminal 3 of strip 708. This leads to wire 3 of cable V which extends upward and sideward to a pill grip switch 710. At this time the pill grip switch 710 is closed because the pillboard closer has not acted, and the circuit continues through the wire 4 of cable V to terminal 4 of strip 708, and then through wire 712 to the magnet of relay R—9. In this way contact 702 provides holding current for relay R—9, but through the pill grip switch 710.

Switch blade 710 of relay R—9 receives line 2 current from wire 638. It is normally closed to the right, as shown, in which case current flows through the right-hand contact and wire 730 to contact 8 of connector 718, which leads to wire 8 of cable T, and thence to closed limit switch 732 of the pill press ejection valve 722. This is a pressure valve which, when opened, causes the ejection cylinder of the pill press to raise the ejection plungers, and thereby eject the pills into the pillboard. The valve being closed, the switch 732 is closed in the down position shown, and current flows back through wire 10 of cable T to contact 10 of connector 718, and thence through wire 734 to wire 4 of cable W. Wire 4 of cable W leads to green lamp 736, indicating that ejection valve 722 is closed. The lamp circuit is completed by the common lamp return 652 and wire 1 of cable W to common return line 1.

The movement of blade 714 of relay R—9 from the right-hand position opens the circuit just described and extinguishes green lamp 736. The switch blade 714 is now in left-hand position, and feeds line 2 current through wire 716 to contact 11 of connector 718. This leads to wire 11 of cable T, which is connected to open-limit switch 720 of ejection valve 722. The valve is still closed, therefore the switch is closed in down position, and current flows through wire 724 to series-connected valve operating motor 726. The return from the motor is by means of wire 7 of cable T leading to contact 7 of connector 718, which leads through wire 728 to wire 636 and terminal 1 of strip 576, which is the common return line 1.

The operation of valve motor 726 runs the ejection valve 722 from closed position to open position, and causes ejection of the pills. At the end of this valve opening movement, switches 732 and 720 are shifted to their upper contacts. From switch 720, current flows through wire 738 to wire 9 of cable T, which leads to contact 9 of connector 718, and this runs by means of wire 740 to wire 3 of cable W. Wire 3 of cable W runs to red lamp 742, the lighting of which indicates that the ejection valve is open. The change in position of closed-limit switch 732 is preparatory to later operation of valve motor 726 for closing the valve. The motor is not energized upon the present upward movement of switch 732, because the circuit leading to switch 732 is itself open by reason of the change of relay R—9 from the right-hand position to the left-hand position. Motor 726, like motor 660, is a uni-directional motor which works the valve through an eccentric, the eccentric being moved a half revolution for either the opening or closing movement.

With the ejection valve 722 open, fluid is admitted to the ejection cylinder of the pill press, and ejection takes place. At the upper limit of the ejection stroke a pawl release rod 744 (Figs. 19 and 31) is pushed upward and causes pawl 678 to release arm 674, whereupon switch 676 moves to the left-hand position shown. Current then flows from switch 676 through wire 746 to wire 13 of cable N, which leads to contact 13 of connector 690. This is connected by means of wire 748 to terminal 2 of strip 708, which leads to wire 2 of cable V, which is connected through wire 750 to the magnet of relay R—10. The magnet circuit is completed by means of wire 752 leading to wire 1 of cable V, which leads to terminal 1 of strip 708, and then by way of wire 754 to wire 636 and running right on 636 to terminal 1 of strip 576, which is common return line 1.

When rod 744 and pawl 678 release switch 676, changing it from the right-hand to the left-hand side, the ejection relay R—9 is not yet released, it being held by its holding circuit through relay blade 702. This holding circuit, as previously traced, runs through pill grip switch 710. The purpose of this switch is to insure closing of the pill board before the ejection plungers return, for the pillboard should preferably do two things, first, dislodge the pills from the plungers, and second, grip the pills. Consequently, the ejection plungers remain in upward position awaiting the opening of pill grip switch 710, for this will de-energize relay R—9.

Now the movement of switch 676 to the left operates relay R—10, which causes closing of the pillboard, and that in turn opens switch 710. With switch 710 in the circuit the pillboard is insured of being completely closed before the ejection plungers drop away from underneath the pills. The structure of the pillboard preferably is such that to close the pillboard the lower lamination is moved, it stripping the pills off the ends of the plungers by sideways motion. Otherwise the pills may be pulled back out of the pillboard and back down into the pill cavities, because the pills tend to adhere by suction to the upper ends of the ejection plungers, until the vacuum therebetween is broken. The closing of the pill board also grips the pills.

Referring back to relay R—10, current flows from post 2 on strip 576 to the right through wire 756 to movable blade 758. The right-hand contact is connected through wire 760 to brush finger 762 which, at this time, is open. Upon energization of relay R—10 the movable blade 758 moves to the left and current flows through the left-hand contact and wire 764 to brush finger 766, which is in contact with an insulatedly mounted segment 768. Segment 768 is formed integrally with a slip ring 770 which is continuously engaged by brush finger 772. This leads through a speed-control resistor 774 to a pillboard closing motor 776. The motor return is through wire 752, to wire 1 of cable V, and thence to common return line 1, as previously traced.

This motor is geared to a crank disc 778 through appropriate reduction gearing. Crank disc 778 has its crank pin connected to a connecting rod 780 leading to a lever 782 pivoted at 784. Carried on lever 782 is a pawl 786 which is pivoted at 788, and the end of which engages square pin 790 on operating arm 792. The parts are shown in normal position preparatory to operation of arm 792, that is, the latch 786 engages pin 790 in such a manner that upward movement of lever 782 by crank disc 778 causes a counter-clockwise movement of arm 792, and this functions to shift the lower lamination of the pillboard in order to both detach the pills and to grip the same in the pillboard. The motion of arm 792 continues in a counter-clockwise direction, assisted by a spring 794, until pawl 786 strikes stop 796. Stop 796 depresses pawl 786 from the position shown on lever 782, thus raising the left end of pawl 786 out of contact with pin 790, so that it passes above the top of pin 790. Spring 798 returns arm 792 to the position shown, even though lever 782 is still in its upward position.

As lever 782 reaches its upward position, segment 768 moves out from under brush 766, thereby opening the circuit for motor 776 and stopping the motor. The segment 768 turns with crank disc 778, as is schematically indicated in the diagram by a connecting shaft. When it is disengaged from brush 766, it moves into engagement with brush 762, preparatory to continuing the operation of the crank, putting tension in spring 794 and returning the crank to the lower position shown. While the lever 782 is in its upward position the pill grip switch 710 moves to the right, which severs the holding circuit (through contacts 702) for relay R—9. This releases relay R—9 and allows it to return to the position shown.

Upon release of relay R—9 the movable blade 714 is closed to the right, and current flows through the right-hand contact and wire 730 to contact 8 of connector 718. This leads through wire 8 of cable T to the closed-limit switch 732 of valve 722, which is now in its upward position, so that current flows through wire 800 to the valve operating motor 726, which then closes the valve. The motor return circuit was already described. When the valve has moved to closed position, the closed-limit switch 732 is shifted from upward to downward position, thus breaking the motor circuit and re-establishing the circuit to the green light 736, as before described. At the same time the movement of the open-limit switch 720 from its upper to its lower position is preliminary to subsequent operation of the motor for again opening the valve during the next complete cycle.

As the pill press returns to its upward or open position it strikes its open-limit switch 582 (at the top of Fig. 31) and moves the blade to the upward position shown.

When the ejection platen moved upward, switch 588 (at the bottom of Fig. 31), which is the ejection down-limit switch, opened its contacts, and until the ejection platen returns to its lower limit after the closing of valve 722 these contacts remain open. The purpose of this is to insure the return of the ejection plungers to their bottom position and completely out of the path of the pillboard carriage, so that the pillboard can be moved out of the pill press without obstruction. As was previously explained, when the cam shaft was being moved from position 13 to position 14, the circuit ran through switches 582 and 588 in series with each other. With the press open, and the ejection plungers down, and the pills held in the now closed pillboard, the main molding cycle can now proceed.

This is the previous mentioned state of repose of the pill press. It will be seen that if the pill press starts its cycle, and latches its interlock switch at pawl 678, it must then completely fulfill its cycle, including pill forming, pill ejection into the pillboard, closing of the pillboard, and the returning of the platens to their rest position, before the state of repose again exists.

Referring to Fig. 29, segment 244 is in contact with finger 2 of group 236, from position 12 to position 14. The resulting circuit makes it possible for the interlocked group of switches in Fig. 31 to bring about the desired ejection control. The closing of segment 244 (Fig. 29) with finger 2 does not directly cause ejection, but only provides a necessary circuit. In position 14, the current flowing through finger 2 will, as previously traced, pass through relay R—10 (Fig. 31), to the left-hand contact of switch 676, and as relay R—10 is still held to the left, the crank disc 778 is still in its upward position.

This continues until the cycle shaft moves from position 14 to position 15, at which time the catch-board is already in the molding press and the pillboard has moved out of the pill press, so that no interference of any kind, or release of pills from the pillboard, can result if the pillboard closer resets itself. On reaching position 15 the circuit to the magnet of relay R—10 is opened, permitting it to return to the right-hand position, at which time current flows from blade 758 through wire 760 to brush finger 762, which at this time contacts the segment 768, thus closing a circuit through slip ring 770 and brush finger 772 to the pillboard closing motor 776. The motor operates to return the lever 782 to initial or reset position, as shown in the drawings, preparatory to the next pillboard closing operation. When lever 782 reaches the position shown, pawl 786 again drops back of square pin 790, and energy has been stored in spring 794, which energy is later used to assist the pillboard closing operation. This spring 794 loads the motor during return, and prevents coasting beyond the lower crank position. Power to the motor is preferably interrupted somewhat ahead of dead center. On the way up the action of spring 794 tends to carry the disc to and even beyond dead center, whereas on the way down spring 794 may be used to prevent the disc from reaching or passing dead center.

This completes the operation of the pill press. In Fig. 29 the only segments of cycle drums 232 and 233 which have to do with the pill press are segments 244 and 296. The effect of these has been described, thus covering the entire revolution of the cycle shaft insofar as it is directly related to the pill press.

*Wiring for the powder measurer*

The powder carrier and powder measurer are controlled locally by a sequence relay, which responds to and checks the accomplishment of certain preliminary steps, lest powder be delivered when it might cause harm. The wiring of the sequence relay is shown in Fig. 32. However, the primary control is through the regular cycle control shaft and its drum switch 232 (Fig. 29). At position 14 finger 1 of group 236 engages segment 246 of drum 232, and so feeds current into a circuit which causes powder to be placed in the pill press cavities.

This circuit is as follows: Starting at drum 232, current flows from slip ring 240 to segment 246, finger 1 of group 236, wire 802, terminal 7 of strip 160, and wire 5 of cable L. Referring now to Fig. 40, wire 5 of cable L leads to terminal 5 of strip 162, which is connected to wire 5 of cable AA, which runs to switch 804 and thence back through wire 6 of cable AA to terminal 6 of strip 162. This leads by way of cross-connection 806 to wire 806 in Fig. 31, which runs to terminal 5 of strip 808. This is connected to wire 5 of cable Z. Referring now to Fig. 32, wire 5 of cable Z runs to terminal 5 of strip 810 which becomes wire 5 of cable X. This leads to contact 5 of connector 812, which is connected by means of wire 814 to contacts 816, operated by a cam 817 on the sequence relay shaft. The sequence relay is driven by motor 896, and the relay shaft also carries a cam 939 and a contact arm 892. The mechanical construction is shown in detail in Figs. 25-27.

When the contacts 816 are closed, the circuit continues by means of wire 818 leading to contact 4 of connector 812 which leads to wire 4 of cable X, which runs to terminal 4 of strip 810, and then to wire 4 of cable Z. Referring now to Fig. 31, wire 4 of cable Z runs to terminal 4 of strip 808 and thence by means of wire 820 to terminal 6 of strip 576. This is connected to wire 5 of cable R. Referring now to Fig. 32, wire 5 of cable R runs to terminal 5 of strip 822, which is connected by wire 824 to the magnet of relay R—11. The magnet circuit is completed by means of wire 826 leading to terminal strip 822 and to wire 1 of cable R. Returning now to Fig. 31, wire 1 of cable R leads to terminal 1 of strip 576, which goes to the common return line 1, as was previously shown.

When relay R—11 (Fig. 32) is energized, the movable contacts 828 and 830 are moved toward the right. This energizes powder carrier motor 832, which runs in the proper direction to advance the powder carrier into the pill press to deposit powder in the pill cavities. Motor 832 is a reversing motor, and relay R—11 is its reversing swtch. Power for the motor is supplied by a circuit which may be traced beginning with L2 current taken at terminal 2 of strip 576 (Fig. 31) and running through wire 2 of cable R. In Fig. 32 wire 2 of cable R leads through terminal strip 822 to movable contact 828 of relay R—11. Relay R—11 is normally closed to the left, and current continues through wire 834 to limit switch 836, which is on the lower contact 838. (This and associated limit switch 850 are shown in detail in Figs. 13-17 of the drawing.) The circuit continues through wire 840 to terminal strip 822 and wire 4 of cable R. Referring to Fig. 31, wire 4 of cable R leads to terminal 8 of strip 576 which is connected by wire 842 to wire 844 running upwardly to wire 6 of cable W. This goes to green lamp 846 and indicates that the powder carrier is in its retracted position out of the pill press. The lamp circuit is completed by the common return 652 previously described.

When relay R—11 is energized and contact 828 moves to the right, the L2 current thereon flows through the right-hand wire 848 to limit switch 850, which at this time is on the upper contact 852. Current then flows through wires 854 and 856 to the series field 858 of motor 832. The current continues on wires 886 and 860 to movable blade 830, which at this time is in its right-hand position, and then from blade 830 through wire 862 to the motor armature 864. The return from armature 864 is through wires 866 and 826, terminal strip 22, and wire 1 of cable R, which as before traced, goes to common return L1. This causes the motor to operate in proper direction to advance the powder carrier into the pill press.

Just before the powder carrier reaches its final position in the pill press, the limit switch arm 850 moves to contact 868, thus putting resistors 870 and 872 in series with the motor and so reducing its speed. This decelerates the powder carrier preparatory to stopping it at its final position.

When the powder carrier reaches its final position, the limit switch 850 moves still further to the bottom contact 874. This opens the motor circuit and the powder carrier stops, the final position being accurately determined by mechanical stop means described elsewhere in this specification. When limit switch 850 engages contact 874, current flows through wire 876, to terminal strip 822 and wire 3 of cable R. Referring now to Fig. 31, wire 3 of cable R goes to terminal 7 of strip 576, which connects through wire 878 to upwardly running wire 880, and to wire 5 of cable W. This in leads to red lamp 882, thus lighting the red lamp, which indicates that the powder carrier is in the pill press.

It may be pointed out that movement of relay R—11 from the left-hand position shown in Fig. 32, to the right-hand position, extinguished the green lamp 846, thus indicating departure of the powder carrier from the powder measuring station. The subsequent lighting of the red lamp indicates arrival of the powder carrier in the pill press. When the powder carrier reaches the pill press, switch 836 moves from the lower position shown, to the upper position, contacting upper contact 884 preparatory to returning the powder carrier to the powder measuring station upon de-energization of the relay R—11. The powder is discharged from the powder carrier into the pill press cavities by mechanical means which is automatically operated as the powder carrier moves into the pill press. (See Fig. 49.)

After the powder carrier has had enough time to discharge the powder into the pill cavities, the powder carrier is returned from the pill press to the powder measurer. This must be done before the pillboard is returned to the pill press, lest they collide. When cycle control drum switch 232 (Fig. 29) progresses to position 19, the circuit from segment 246 to finger 1 of group 236 is opened, thereby de-energizing relay R—11. It may be noted at this point that the powder carrier advances at position 14, which is the position in which the pillboard moves between the two presses. The powder carrier cannot move into the pill press until after the pillboard has moved out of the pill press, because the stepping of the cycle shaft from position 13 to 14 does not occur until the pillboard has reached its position between the two presses.

After the pillboard moves into the main press, energy is supplied to contacts 16, 17, 18 and 19, on the cycle shaft contact disc 192, causing the cycle shaft to move through these positions in rapid succession, but the extra time necessary for the cycle shaft to pass these positions insures complete discharge of the powder from the powder pockets into the pill cavities. Then as the cycle shaft moves from position 18 to position 19, the powder carrier relay R—11 is deenergized (segment 246 moves off finger 1) and the powder carrier returns to the powder measurer before the pillboard arrives in the pill press. The first mechanical tripping of the sprocket shaft return clutch (moving the pillboard out of the main press) occurs on position 19 of the cycle shaft, and additional mechanical tripping of the return clutch occurs on position 20 (moving the pillboard into the pill press).

It was stated above that when relay R—11 (Fig. 32) is energized, red lamp 882 (Fig. 31) is lighted through arm 850 (Fig. 32) reaching contact 874. Therefore, upon relay R—11 being now deenergized, contact arm 850 is also deenergized, and the red light 882 (Fig. 31) is extinguished, indicating that the powder carrier has left the pill press. The bank of lamps works as follows. Red lamp 668 indicates closing and green lamp 650 indicates opening of the pill press; red lamp 742 indicates raising and green lamp 736 indicates lowering of the ejection plungers; red lamp 882 indicates advance of the powder carrier into the pill press and green lamp 846 indicates return of the powder carrier from the pill press.

When movable contact 828 of relay R—11 (Fig. 32) moves back to its left-hand position (the relay being de-energized by movement of finger 1 from segment 246 on drum 232 in Fig. 29), L2 current flows from blade 828 through wire 834, arm 836, contact 884, and wire 886, to motor field 858. The current now flows through the field from left to right instead of from right to left as before, so that the direction of operation of the motor 832 is reversed. The field current continues through wire 856, contact 830, and wire 862 to armature 864. The return from armature 864 is, as before, through wires 866 and 826, to wire 1 of cable R and so to common return L1. The motor operates in such a direction as to move powder carrier from the pill press to the powder measuring device.

As the powder carrier approaches its home position, the limit switch 836 reaches center contact 888, and interposes resistor 890 in series with the motor 832, thereby decelerating the carrier. In the return direction only one resistor is provided, while in the forward direction resistors 870 and 872 are provided. The purpose of the adjustable resistor 870 is to accurately control the powder carrier deceleration as it reaches the pill press, so that the velocity will not be great enough to cause the powder to spill around the pill cavities. When the powder carrier is returned, this accurate control of the deceleration is not necessary, because the carrier is empty. As the carrier reaches its final position under the powder measurer, the limit switch 836 reaches the bottom contact 838, thus de-energizing the motor and stopping the carrier. Current is now applied to contact 838 to light green light 846 (Fig. 31), as previously described.

The operation of the powder carrier into and out of the pill press has been described considering contacts 816 of the sequence relay (Fig. 32) as being closed. However, contacts 816 are under the control of cam 817 on the sequence relay shaft, and a certain predetermined position of the relay shaft must be reached before powder can be fed into the pill press. In other words, the sequence relay is placed in the powder carrier circuit to make it necessary that a certain sequence of operations be gone through and be recognized by the sequence relay before the powder carrier circuit can be made effective by cam 817 acting on contacts 816. If the predetermined sequence is not completed and responded to by the sequence relay, contacts 816 will not be closed when segment 246 of cycle drum 232 (Fig. 29) reaches finger 1 (of group 236). If contacts 816 are open, no powder will be fed into the pill press even though contact is made on cycle drum 232. The contact on the main but remote cycle drum 232 is for the purpose of timing the powder carrier in its relation to the complete apparatus and particularly the presses. However, the control of the powder carrier is also subject to the more localized sequence of operations manifested at the local sequence relay. Normally the cam 817 is in position to close contacts 816 when position 14 of the cycle shaft is reached. In other words, in normal operation the sequence relay responds to a sequence of operations which occur while the cycle shaft is moving from position 1 to position 14. Upon arrival of the cycle control at position 14, the local sequence relay is in proper position, unless some unusual occurrence or failure spoils the sequence, such as failure to press the pills, failure to eject the pills, and so on, as will hereafter be explained.

As previously described, the cycle control shaft (Fig. 29) is caused to step from one contact to the next by the energization of the contact then underneath the contact arm. A similar construction is used for the sequence relay, there being a contact arm 892 (Fig. 32) which sweeps over a slip ring 894 and a series of segments 1 through 10. Each time the segment under arm 892 is energized, a motor 896 causes the arm to step to the next segment. The mechanical structure for this purpose is shown and described in connection with Figs. 25-27. All current supply to segments 1 through 10 is made from L2, and the return is always through slip ring 894 leading through solenoid 900 to L1 common return.

Starting at the collector ring 894 (Fig. 32) and considering this to be energized with L2 current, the circuit from here continues through wire 898 to solenoid 900, wire 902, to contact 1 of connector 812, and thence through wire 1 of cable X. This leads to terminal 1 of strip 810 and wire 1 of cable Z. Referring now to Fig. 31, wire 1 of cable Z leads through strip 808 to a junction with wire 636, which (going right) leads to terminal 1 of strip 576, which goes to common return L1. Energizing solenoid 900 (Fig. 32) releases lock 904 and closes motor controlling contacts 906. When contacts 906 are closed, motor 896 is energized and steps contact arm 892 one step ahead, and arm 892 is again locked by lock 904, and contacts 906 are opened deenergizing the motor.

To accomplish this, L2 current is picked up at terminal 2 of strip 576 (Fig. 31), and flows through wire 638, and down on wire 908 to terminal 2 of strip 808, and so to wire 2 of cable Z. Referring now to Fig. 32, wire 2 of cable Z leads to terminal 2 of strip 810 and thence to wire 2 of cable X, which leads to contact 2 of connector 812. This is connected by wire 910 running sideward and then downward to horizontal contacts 906, and from these through wire 912 to sequence relay motor 896. The motor return is by conductors 914 and 902 to contact 1 of connector 812, which goes to common return L1.

The energization of the various segments 1 through 10 of the sequence relay is as follows: Starting with segment 1, L2 current is taken at terminal 2 of strip 576 (Fig. 31) and flows upwardly through conductor 578 to contact 14 of connector 580. This in turn leads through wire 14 of cable O, to the open-limit switch 582 of the pill press. When the pill press is closed, switch 582 is in its lower position, and current continues through wire 13 of cable O, to contact 13 of connector 580, and thence through wire 916 to terminal 6 of strip 808, to which is connected wire 6 of cable Z. Referring now to Fig. 32, wire 6 of cable Z leads to terminal 6 of strip 810 and wire 6 of cable X. This runs to contact 6 of connector 812 which is connected by wire 818 to segment 1 of the sequence relay.

As previously mentioned, energization of one of these segments causes the relay to step off that segment to the next one. For the sequence relay to step from segment 1 to segment 2 it is necessary that the pill press begin to close from full open position. The general purpose of the sequence relay is to prevent powder being placed in the pill press when it will cause trouble. If the pill press already has powder in it, and the pill press does not close, the sequence relay will not allow another charge of powder to be added. It has several steps to insure adequate pressing and ejection of the powder previously placed in the pill press, and the first step is the initial closing of the pill press from full open position, which is indicated by relay movement from segment 1 to segment 2.

The relay next checks whether the pills are adequately compressed to proper size. This requires that cam 672 (Fig. 31) move arm 674 and so move switch 676 to the right. Current then flows through wire 694 to wire 15 in cable N to contact 15 of connector 690, wire 696, down wire 698, across wire 712, to terminal 4 of strip 708, and down wire 920 to terminal 7 of strip 808, which is connected to wire 7 of cable Z. Referring now to Fig. 32, wire 7 of cable Z leads to terminal 7 of strip 810, and wire 7 of cable X, which goes to contact 7 of connector 812, which is connected to segment 2 by wire 922. This energizes segment 2, causing the sequence relay to step from segment 2 to segment 3.

The energization of segment 2 is caused by latching the interlock switch 676 (Fig. 31). This is in response to complete closing of the pill press to the point where the pills are of proper size. If excess powder is placed in the pill press, the adjustment of collar or cam 672 (Fig. 31) on rod 670 is such that arm 674 will not be latched by pawl 678, and switch 676 will not be closed, therefore the sequence relay will not step ahead. Another reason for sequence step 2 is to make sure the pills are adequately pressed, because reduction of hydraulic pressure at the pill press might leave pills too thick to fit properly in molding press. Moreover, failure of pressure might allow the press platen to sag down a small distance sufficient to operate limit-switch 582, but not sufficient to make solid pills capable of being safely handled by the pillboard.

It may seem that segment 1 is unnecessary in view of segment 2. However, if segment 2 alone is relied upon to control the sequence relay, it might be possible, due to a momentary failure of pressure at the time of ejection, for ejection not to have taken place. Its limit switch would be closed, and consequently switch 676 (Fig. 31) might remain closed throughout the cycle, and the sequence relay might step beyond this point, and more powder be put in the pill press on top of the non-ejected pills. Thus segment 1 serves more importantly to insure that the press has gone all the way up before it begins to come down again, than to merely insure a lowered position of the press.

The third step checked by the sequence relay is upward movement of the ejection plungers. The energization of segment 3 starts from the release of switch 676 (Fig. 31), which moves to the left, whereupon current flows through wire 746, wire 13 of cable N, contact 13 of connector 690, wire 924 to terminal 8 of strip 808, and wire 8 of cable Z. Referring now to Fig. 32, wire 8 of cable Z leads to terminal 8 of strip 810 and wire 8 of cable X, going to contact 8 of connector 812, which is connected by wire 926 to segment 3 of the sequence relay, causing the relay to step ahead to segment 4. This stepping from segment 3 to segment 4 indicates ejection, because switch 676 (Fig. 31) cannot be released unless the ejection cylinder raises rod 744 against lever 678 to unlatch arm 674.

It may be noted at this point that the stepping of the sequence relay from 2 to 3 and from 3 to 4 cannot take place until cam bar 680 (Fig. 31) is moved up by opening or elevation of the pill press, which normally takes place before ejection. The upward position of the cam bar closes switch 684, and inasmuch as the supply of current to switch 676 is through switch 684 (connected by wire 692), there is an additional check on the opening of the pill press.

The next step checked by the sequence relay is return of the ejection plungers to down position. When ejection takes place switch 676 is released, but the ejection relay R—9 (Fig. 31) remains energized until switch 710 on the pillboard closer opens the holding circuit to relay R—9, all as was previously explained. When relay R—9 returns to its right-hand position, the ejection valve (symbolized at 722) is closed, and the ejection plungers return, thereby closing the ejection limit switch 588 (Fig. 31). Closing of this switch energizes contact 10 (Fig. 31) of connector 586, as previously explained. From this energized contact, current flows through adjacent terminal 9 of strip 808, which connects to wire 9 in cable Z. Referring now to Fig. 32, wire 9 of cable Z runs to terminal 9 of strip 810 and wire 9 of cable X which leads to contact 9 of connector 812, and this is connected by wire 928 to segment 4 of the sequence relay. Energization of segment 4 causes the sequence relay to step ahead to segment 5.

The significance of this movement is that the ejection platen has returned to bottom position, and the ejection plungers are down in the pill cavities, so that the cavities are ready to receive powder from the powder carrier. When segment 5 is reached, cam 817 (Fig. 32) closes contacts 816, which prepares the powder carrier circuit for feeding the powder into the pill press at such time as finger 1 of group 236 (Fig. 29) is reached by segment 246 of drum 232. It is not possible to feed powder until segment 5 of the sequence relay is reached, and the attendant operations performed. Movement of the cycle shaft (Fig. 29) from position 13 to position 14 moved the pillboard out of the pill press, so that when finger 1 of group 236 is energized the powder carrier is free to move into the pill press. As the movement of the cycle shaft from position 13 to 14 is under the control of the ejection down-limit switch 588 (Fig. 31), the stepping of the cycle shaft (Fig.

29) and the sequence relay (Fig. 32) is simultaneous at this point, both actions taking place on closing of switch 588.

The sequence relay is now on segment 5, and cam 817 has closed contacts 816. The powder carrier was advanced to the pill pres by closing relay R—11 (Fig. 32). As the powder carrier reached its limit position in the pill press, contact arm 850 reached contact 874, and lighted red lamp 882 (Fig. 31). It also steps the sequence relay ahead, as follows. The red light circuit is alive at terminal 7 of strip 576 (Fig. 31). Current flows through wire 878, and thence downwardly through wire 930, to terminal 10 of strip 808, which is connected to wire 10 of cable Z. Referring now to Fig. 32, wire 10 of cable Z leads to terminal 10 of strip 810, and to wire 10 of cable X, which runs to contact 10 of connector 812, which is connected by wire 932 to segment 5, thus stepping the sequence relay ahead to segment 6.

In this way the sequence relay takes recognition of the fact that the powder carrier has moved fully into the pill press, that is, sufficiently to dump the powder and to light the red indicator lamp. When the sequence relay steps from segment 5 to 6 its cam 817 still keeps contacts 816 closed. If cam 817 allowed contacts 816 to open at this point, the powder carrier would immediately return, and the time allowed might be insufficient for the powder to dump fully out of the powder carrier. The powder carrier remains in the pill press until finger 1 of group 236 of Fig. 29 is de-energized. When this finger is de-energized and the relay R—11 (Fig. 32) is released, the powder carrier runs back to its home position underneath the powder measurer. Green light 846 (Fig. 31) is then lighted through the back limit switch arm 836 and contact 838, and the sequence relay is stepped ahead to segment 7.

Energy for this is picked up from the green lamp circuit at terminal 8 on strip 576 (Fig. 31), and runs through wire 842 and downwardly on wire 934 to terminal 11 of strip 808 and so to wire 11 of cable Z. Referring now to Fig. 32, wire 11 of cable Z leads to terminal 11 of strip 810, and so to wire 11 of cable X, which goes to contact 11 of connector 812, and this is connected by wire 936 to segment 6 of the sequence relay. Energization of segment 6 steps the relay to segment 7. The significance of this movement is to recognize that the powder carrier has returned to its home position underneath the powder measurer, where it is ready to receive powder. Cam 817 has now opened contacts 816, and any further connection to finger 1 of group 236 (Fig. 29) cannot cause the powder carrier to again advance until the sequence relay makes a complete cycle, returning again to segment 5.

When segment 7 is reached, another pair of contacts 938 is closed by another cam 939. Contacts 938 cause the powder measurer to go through its cycle. This cycle includes dumping the previously measured powder into the powder carrier, and measuring a new charge of powder. As previously explained, contact 2 of connector 812 (Fig. 32) is connected to L2, and current now flows through wire 910, contacts 938, and wire 940, to terminal 3 of connector 812. This leads through wire 3 of cable X, terminal 3 of strip 810, and wire 942, to the magnet of a relay R—12. The relay magnet circuit is completed by wire 944 running to terminal 1 of strip 810, which, as was already traced, goes to common return L1.

This relay R—12 controls the motor of the powder measurer. It seeks to start the motor whether closed to one side or the other, but the motor circuit also goes through a drum switch 954 rotated by the powder measurer (see also Figs. 7 and 8).

The energization of relay R—12 shifts the movable contact 946 from the right-hand position shown, to the left-hand position. Thereafter, L2 current flows from terminal 2 of strip 810 through wire 948 to movable contact 946, and through the left-hand contact to wire 2 of cable Y, which leads to contact 2 of connector 950. This is connected by wire 952 to contact finger 2 of drum 954. At this time finger 2 engages segment 956, and the circuit is completed by slip ring 958, finger 1, and wire 960, to contact 1 of connector 950. This goes to wire 1 of cable Y, which connects to wire 962 leading to powder measurer driving motor 964. The motor return is by wire 966, speed adjusting resistance 968, wire 970, and downwardly on wire 944 to terminal 1 of strip 810, which goes to the common return L1.

Motor 964 operates the powder measure and simultaneously moves the drum 954, as is described in greater detail in connection with Figs. 6 and 7 showing the powder measure. This drum rotates until segment 956 leaves finger 2, thereby opening the circuit to motor 964, and stopping the measurer and the drum 954. However, just before the drum stops, current flows from finger 2 and segment 956 to segment 972 and finger 4. This current flows through wire 974 to contact 4 of connector 950, wire 4 of cable Y, wire 976, terminal 12 of strip 810, and wire 12 of cable X, to contact 12 of connector 812. This is connected by wire 978 to segment 7 of the sequence relay, and causes the relay to step ahead to contact 8.

In this way a half operation of the powder measurer is recognized by the sequence relay. During this half operation the filling valves of the measuring cups are closed, and the discharge valves are opened, discharging their powder into the pockets of the powder carrier. Sufficient time must be provided at this point to allow the powder to completely run out of the measuring cups. This time is provided by cam 939 which closes contacts 938, and so hold relay R—12 energized, for the cam is given sufficient length to keep contacts 938 closed until just before the sequence relay stops at segment 1.

Segments 8, 9 and 10 are connected together and constantly energized through wire 980 connected to wire 910 and contact 2 of connector 812 and so to the L2 supply circuit. This causes the sequence relay to step ahead to segment 1, at which time cam 939 opens contacts 938, de-energizing relay R—12, so that contact blade 946 moves to the right. Current now flows from movable contact 946 through the right-hand contact to wire 3 of cable Y, to contact 3 of connector 950, through wire 982 to finger 3 of drum 954, which is now in contact with segment 984. The circuit returns by way of slip ring 958, finger 1, wire 960, contact 1 of connector 850, and wire 1 of cable Y, leading to wire 962 and motor 964. The motor circuit is completed by wire 966, speed adjusting resistance 968, wire 970, and wire 944 to terminal 1 of strip 810, which goes to common return L1. Motor 964 now drives the powder measurer through its second half operation, and at the same time moves drum 954 so that segment 984 leaves finger 3, thereby stopping the motor 964. During this second half operation, the discharge valves of the measuring cups in the powder measurer are closed, and the filling valves are opened, permitting powder to again fill the measuring cups. The sequence relay has now passed through its entire cycle and is back at segment 1.

In respect to drum 954, it may be noted that finger 3 comes on segment 984 at the same time that finger 2 leaves segment 956, this being preparatory to the operation above described, but at this time finger 3 is dead and remains so until the sequence relay steps ahead from segment 8 to segment 1, at which time finger 3 is made alive, and initiates the operation above described.

To recapitulate, the measurement of powder is divided into two stages; first, the discharge of powder from the measuring cups (after closing the cups at the top); and second, the refilling of the cups with a new charge of powder (after closing the cups at the bottom). The sequence relay responds to the discharge of powder by stepping from segment 7 to segment 8, and in then moving through connected contacts 8, 9 and 10 there is a delay which provides sufficient time for the powder to be discharged from the cups. Meanwhile the motor circuit is opened at the drum 954. Upon the sequence relay reaching its No. 1 segment, the motor circuit is again closed by relay R—12, and the powder measuring device continues through the second stage of its cycle. The two stages of the powder measuring operation are connected into the sequence relay not so much to insure sequence, because that is inevitable in the mechanical structure of the powder measurer, but rather to provide a delay between the two stages of the powder measuring operation. It may be noted that in the mechanical structure of the sequence relay, reduction gears are provided between the motor and the relay, so that sufficient time will elapse between segment 7 and segment 1 to completely discharge the powder.

To further insure emptying of the powder measuring cups when the discharge valves are open, and filling of the cups when the filling valves are open, a vibrator motor and associated circuits are provided. This motor with its eccentric weights is indicated at 1002 in Fig. 32 (and also in Figs. 6 and 7).

Vibrator motor 1002 is controlled as follows. The discharge of the powder from the powder measuring cups is brought about through a set of toggle links 985 (Figs. 6 and 32). A switch 986 is operated by toggle 985 in such a way that when toggle 985 is straightened, switch 986 closes to the right. Current now flows from terminal 2 on strip 810, upwardly through wire 988, to switch 986, and then through wire 990 to the magnet of relay R—14. The magnet circuit returns through wire 992 to terminal 1 of strip 810 which goes to common return L1. The energization of relay R—14 shifts the movable contacts 994 and 996 to the right. Current now flows from the upper terminal of switch 986 through wire 998, contact 996, and wire 1000, to vibrator motor 1002. The motor current returns on wire 992 previously referred to.

This operation of motor 1002 continues while switch 986 is closed to the right, in order to aid powder discharge, and continues thereafter in order to aid the filling of the measuring cups. The extra time is provided by a thermostatic time delay relay. When switch 986 opens to the left, current continues to flow through wire 998, to contact 994 now moved to the right, and so to contact 1004, thermostat blade 1006, heater coil 1008, and wire 1010, to the magnet of relay R—14, and thence through wire 992, as previously explained, to the common return L1. The resistance of the heater coil 1008 is low enough so that relay R—14 remains closed despite the resistance inserted in series with it. Heater coil 1008 heats thermostat element 1006, and after a predetermined desired time, sufficient heat is applied to element 1006 to open its contact with blade 1004. This interrupts the circuit through the magnet of relay R—14, and so stops the vibrator motor.

*Miscellaneous wiring*

Powder is supplied to the powder measuring device through a powder conveyor 1012 and a hopper 1014 (Figs. 1 and 32). The hopper 1014 is supported by springs (shown at 1015 in Fig. 6), and has associated with it a control switch 1016 (Fig. 32). The purpose of this switch is to shut off the powder conveyor motor 1022 when there is sufficient powder in hopper 1014. L2 current is picked up at terminal 2 on strip 810, and goes to the left and down through wire 1018 and any suitable connector to two-wire cable 1020 leading to motor 1022. The return from motor 1022 is through cable 1020 to manual control switch 1024, wire 1026, wire 6 of cable Y, contact 6 of connector 950, and wire 1028 to weight control switch 1016. When there is adequate powder in the box, the switch is opened, but when enough powder has been used from the box to bring this weight below the desired point, the box rises, and switch 1016 is closed. Current then flows on wire 1030 to contact 5 of connector 950, and thence through wire 5 of cable Y and down wire 944 to terminal 1 of strip 810, which is connected to the common return L1. In this way the conveying of powder from the barrel to the hopper 1014 is automatically regulated.

When the powder is discharged from conveyor 1012 into hopper 1014, there is a tendency for the heavy and fine particles of powder to separate from each other. To prevent this, the powder in hopper 1014 is continuously stirred by a stirrer 1032 which is rotated by a stirring motor 1034. This motor operates continuously and requires no switch other than the main line switch. It is energized by current taken at terminal 2 of strip 810, and fed through wire 988 and wire 1036, while the return circuit is by way of wire 1038 leading to wire 992 and terminal 1 of strip 810.

In Fig. 29, it will be noted that an extra contact disc 234 is provided. This disc helps indicate the position of the cycle control shaft. The indication is on low voltage lamps, ten in number, which are shown in Fig. 39. They are operated through a step down transformer as follows. Referring to Fig. 29, current from terminal 2 on connector 120 flows through wire 1040 to transformer 1042, and back on wire 1044 to terminal 1 on connector 120. Transformer 1042 is thus connected across the line at all times. The secondary of transformer 1042 has one end grounded to the frame of the machine, and the other end is connected through wire 1046 to collector ring 1048 of contact disc 234, and through the arm 1050 to one of the successive contacts 1 to 20 corresponding to the twenty cycle shaft positions. Some of these contacts are connected together, there being only ten significant indicating points. Thus contacts 4 through 10 and contacts 16 through 19 are connected together, as these require only one lamp each, because the cycle shaft does not stop at any intermediate point between these points. The ten points are connected to a connector 1052 to a ten-wire cable M. Referring now to Fig. 39, cable M leads to a connector 1054, the ten contacts of which lead respectively to the ten signal lamps, the return circuits of which are grounded in common. On position 1, there is no connection, and all lights are out, but movement from position 1 to 2 causes the first lamp to be lighted. The lamps light progressively, the tenth lamp being lighted on the twentieth contact, and being extinguished when moving from the twentieth contact to the first contact. These indicator lights are a refinement which help during adjustment or servicing of the apparatus, but they are not at all essential. Moreover, a simple mechanical pointer may be connected to the cycle shaft for the same purpose, instead of lights.

A safety stop clock is provided in the circuit so that if the molding cycle extends over an abnormally long period, the clock acts to completely shut down the press. Referring to Fig. 28 it was previously explained that contacts $h$ on the high pressure clock act at the end of the high pressure time period to release solenoid 532 of the safety stop clock, allowing the clock to reset. At the expiration of the high pressure time, the safety stop clock again starts to measure its time period. If it is not reset in due time its cam 548 closes contacts $b$. Current then flows from the main L2 connection on magnetic switch R—7 through wires 1056 and 1058, terminal 9 of strip 24, wire 1060, terminal 5 of strip 28, wire 1062, contacts $b$, terminal 6 of strip 28, wire 1064, terminal 10 of strip 24, wire 1066, normally closed push button switch 1068, and wire 1070 to the magnet of relay R—6. The magnet circuit is completed by wire 1072 running to L1 of main switch R—7.

Energizing the magnet of relay R—6 causes its contacts to move to the right. This opens contacts 254, and as was previously explained, this opens the L2S or L2 safety circuit by releasing the holding contacts on relay R—5 (Fig. 29). The action of relay R—6 (Fig. 28) also closes contacts 1074 and 1080. Contacts 1074 are holding contacts. Current now flows from L2 at main switch R—7 through wire 1056 and left on wire 1076, contacts 1074, wires 1078 and 1066, through normally closed switch 1068, and wire 1070, to the magnet of relay R—6. Contacts 1074 thus act as holding contacts for relay R—6. Contacts 1080 are provided to actuate an alarm. They close the circuit of an alarm lamp or alarm bell 1082 which signals that the safety stop clock has operated relay R—6 and is stopping the machine. With the opening of the L2S or safety circuit, the pressure valve runs closed, the release valve runs open, and the main press opens. The pill press also opens.

A few seconds after the closing of contacts $b$ by cam 548 on the safety stop clock, cam 546 opens contacts $a$. As was previously explained, the holding circuit for the main switch R—7 is carried through contacts $a$, and when cam 546 opens the contacts, switch R—7 opens, shutting off the main power supply to the machine. However, once relay R—6 is closed, its holding contacts 1074 keep it closed because the current supply to relay R—6 is taken from the live side of switch R—7. Relay R—6 is closed until manual release switch button 1068 is pressed. It is evident that the machine cannot be placed in operation again after the safety stop clock has acted, unless the release push button 1068 is pressed to release relay R—6, and unless the start button 14 is pressed to reset main switch R—7. In the meantime the source of trouble may be investigated.

In Fig. 28, a bank of indicator lamps 1086 is indicated, the four individual lamps being called M, A, L, H. M indicates that the machine is set up through the manual-automatic switch for manual operation. A indicates that the machine is set up for automatic operation. L indicates that the low pressure valve is open, and H indicates that the high pressure valve is open. Lamps M and A, besides indicating the position of the manual-automatic switch, also indicate that current is on the machine, that is, whether main switch R—7 is closed.

As so far described, the operation is truly automatic. It is also possible to run the machine under manual control through appropriate switches controlling the various functions of the presses necessary for setting up or mounting the molds. The switches for manual control of the main press are shown in Fig. 34, while those for the pill press are shown at 1088 and 1090 in Fig. 31. In operating under manual control, the manual-automatic switch (Fig. 28) which so far has been in the right-hand position, is now thrown to the left-hand position, all three switches 40, 360 and 626 operating in unison. It being assumed that the pillboard is in the pill press, button 270 (Fig. 29) when pressed will energize the L2S or safety circuit relay R—5, and with the energization of relay R—5 the indicator lamp 1092 (Fig. 34) will be lighted, showing that the manual switches thereneath are operative. Current comes from the left-hand contact of blade 338 (Fig. 28) of the manual-automatic switch, this being L2 safety current, and flows through wire 1110 to terminal 2 of connector 1112. This goes to wire 2 of cable D. Referring now to Fig. 34, wire 2 of cable D is common to the indicator lamp and the three switches designated High, Low, and Release. These are in turn connected to the relays of the high pressure, low pressure and release valves of the main press, the connections going through the left-hand contacts of the manual-automatic switch. Operating any of these switches connects the L2 safety circuit with the respective valve relays. The valves are then operated by their respective reversing motors, all as previously explained.

Referring to Fig. 31, the operation of the pill press platen is controlled by switch 1088, and the ejection platen is controlled by switch 1090. L2 current coming from main switch R—7 (Fig. 28) flows through wire 38 to switch blade 40, and this now being thrown to the left, current continues through wire 1094 to terminal 10 of strip 60, which connects to wire 10 of cable B. Referring now to Fig. 29, wire 10 of cable B goes to contact 10 of connector 120, which is connected by wire 1096 to terminal 10 of strip 160, which is connected to wire 9 of cable L. Referring now to Fig. 40, wire 9 of cable L becomes wire 5 of cable Q. Referring now to Fig. 31, wire 5 of cable Q leads to terminal 5 of strip 576, which is connected to wire 9 of cable W. Wire 9 of cable W runs to the switches 1088 and 1090. The normal position of these switches is upwardly, as shown. When the switch 1088 is thrown to the down position, its circuit is made to the lower left-hand contact through wire 1098 to the upper right-hand contact of switch 1090, and thence through the right-hand switch blade to wire 2 of cable W. Wire 2 of cable W is connected to wire 632 leading to the magnet of relay R—8.

As previously explained, relay R—8 causes the pill press valve to open, therefore throwing switch 1088 to the down position causes the pill press valve to run from release to pressure, and so closes the pill press. Throwing the switch 1088 upward opens the pill press. The circuit for the pill press is carried through the right-hand upper contacts of the ejection switch 1090, and if the ejection switch is thrown to its downward position, the pill press relay circuit cannot be completed. This constitutes an electrical interlock between the ejection platen and the pill press platen, so that the force plugs cannot be lowered while the ejection plungers are raised.

With the pill press switch 1088 in upper position, and the ejection switch 1090 in downward position, current will flow through the left-hand blade of switch 1090 downwardly to the lower left-hand contact, and thence through wire 1100 to the upper right-hand contact of switch 1088. The circuit continues through the right-hand blade of switch 1088 to wire 10 of cable W. This leads through wire 696 and wire 698, to the magnet of relay R—9. As before explained, energization of this relay causes the ejection valve to run from release to pressure, so that throwing switch 1090 to its downward position causes the ejection platen to rise. Throwing switch 1090 to its upward position again opens relay R—9 and causes the ejection platen to fall. The circuit of switch 1090 runs through the upper right-hand contacts of switch 1088, thus providing an electrical interlock such that the ejection plugs cannot be raised unless the press has been opened.

The above switches are for manual control. There are further switches which may be operated manually even when the manual-automatic switch is in automatic position. In other words, these switches may be used during automatic operation, and are in the nature of emergency switches.

During normal operation, the automatic cycle switch (172 in Fig. 40), the pill press switch (620 in Fig. 40), and the powder feed switch (804 in Fig. 40) are all closed. Opening of the automatic cycle switch 172 will stop the apparatus, but not immediately. Instead, the apparatus stops at the end of a cycle. Opening of the pill press switch 620 will stop the pill press and immediately run it to open condition, at any point in the cycle. Opening of the powder feed switch 804 will immediately retract the powder carrier, even after it has started part-way toward the pill press.

If it is desired to stop the entire apparatus instantly, even including the molding press, a stop button 16 (disposed near starting button 14 in Fig. 28) may be depressed.

There are some additional controls which are also of value during servicing of the apparatus.

Depression of button 224 (Fig. 29) advances the cycle control shaft one step at a time for each depression of the button. Switch button 264 (Fig. 40) runs the presses to open position by opening the relay R—5 which opens the L2 safety current supply. Operation of button 270 (Fig. 29) re-establishes the L2S circuit, and makes it possible to again operate the presses by means of the control switches for the valves, as above described.

A motor switch 128 (Fig. 29) controls the power-unit motor 132. By shutting off motor switch 128, the mechanical movement of the loader may be arrested at any point.

*Summary of operation centering about the cycle control means*

The machine is at rest on position 1 of the cycle control shaft operating contact disc 192 and drum 232, 233 (Fig. 29). The loader is in retracted position with the pillboard in the pill press. L2 current flows from the loader position switch (146 in Fig. 29) through the rail switch (162 in Fig. 40) to 1 contact on the cycle shaft contact disc (192 in Fig. 29). The cycle shaft trip solenoid (228 in Fig. 29) is thus energized and the cycle shaft runs from position 1 to position 2. While running from position 1 to 2, momentary contact is made at drum 232 (segment 242) to finger 3 which closes safety relay R—5 (Fig. 29). Relay R—5 locks in with its own holding contacts through the holding contacts on relay R—6 (Fig. 28).

Relay R—5 supplies L2 current to the L2 safety circuit L2S on the drum 233, and as the cycle shaft reaches position 2, connection is made from L2S to finger 5 through the automatic-manual switch to relay R—3 on the release valve. The release valve runs closed and makes connection through its transfer switch to contact 2 on the cycle shaft contact disc. This causes the cycle shaft to run to position 3, closing L2S to fingers 6 and 7 on the drum switch 233. Finger 6 is connected to relay R—1 on the low pressure valve, causing the low pressure valve to run open. Finger 7 is connected to the pill press valve through its relay R—8, and it runs from release to pressure. Thus both presses close, the main press to mold the pills, and the pill press to make pills.

The cycle shaft remains on position 3 until the main press has closed, and contact is then made through its closed-limit switch (Fig. 35) to contact 3, causing the cycle shaft to run to position 4, and also to the low pressure time clock, starting the low pressure time period. At this point the contact to finger 6 (for relay R—1) is opened, it being no longer needed. Each valve for both presses has its own limit switches for stopping the valve motor when the valve position is changed.

When the low pressure time period has elapsed, contact is made in the low pressure clock to start the high pressure time clock and also to energize contact 4 on the cycle shaft contact disc, causing the cycle shaft to run from position 4 to 11, where it stops. The contacts in the low pressure clock which energized relay R—1 during the low pressure time period open, and the low pressure valve runs closed. When the high pressure clock comes in it closes contacts to relay R—2 on the high pressure valve motor, and the high pressure valve runs open. The molding press is now subjected to extra high pressure, while the pill press continues under its regular pressure.

When the high pressure time period has elapsed, the circuit to relay R—2 is opened and the high pressure valve runs closed. The high pressure valve transfer switch then closes the circuit to contact 11 on the cycle shaft contact disc and the cycle shaft runs to position 12. At this point the L2S circuit to finger 5 and to relay R—3 is opened, causing the release valve to run open; also the L2S supply to finger 7, controlling relay R—8, is opened, and the pill press valve runs to release position. Thus both presses begin to open. On position 12 contact is also made to finger 2 by the cycle shaft drum switch, allowing the pill press ejection valve to open through its relay R—9 (Fig. 31) as soon as the press has raised clear and closed the ejector control switch.

With relay R—3 open the main press opens, and when it reaches its half-open position, contact is made through the half-open switch (564 in Fig. 35) to contact 12 on the cycle shaft contact disc. The cycle shaft now runs to position 13, again energizing relay R—3 to close the release valve and stop the main press at this half-open point. Relay R—3 receives its current directly from the L2 line and not from the L2S line as before; therefore the safety relay R—5 can now be opened.

When the ejection of the pills into the pill board has been completed, and when both the pill press and ejection platen have returned to their released positions, contact is made through their limit switches to contact 13 and the cycle shaft runs to position 14, at the same time tripping the loader clutch (mechanically by means of the cam on the cycle shaft) to run the loader from retracted position to the middle position, with the catchboard in the main press. At position 14 drum 232 contacts finger 1, and energizes relay R—11 (Fig. 32) and so starts the powder carrier motor to move the powder carrier to the pill press. The powder is discharged by mechanical means. The powder measurer is controlled through the local sequence relay (Fig. 32).

When the loader reaches middle position, contact is made through the loader position switch (146 in Fig. 29) to contact 14 on the cycle shaft contact disc, and the cycle shaft runs to position 15. Contact to ejection switch finger 2 is now open, it being no longer needed as the ejection has been completed.

On position 15 the circuit to finger 5 controlling relay R—3 on the cycle shaft drum switch is again opened, causing the release valve to reopen and the main press opens further to strip the molded product from the mold. The stripped product falls onto the catchboard.

When the main press reaches its open limit, contact is made through its open limit switch (Fig. 35) and through, assuming successful stripping, the stripper safety switches (Fig. 38) to contact 15 on the cycle shaft contact disc. The cycle shaft now moves to position 16, at the same time tripping the loader clutch (by mechanical action) to move the loader to its advanced position, where the molded product is dumped from the catchboard, and pills are dropped from the pill board into the mold. At this point contact is made through the loader position switch to contact 16, and the cycle shaft runs to position 20. As the cycle shaft reaches position 19 the contact to finger 1 is broken, thus deenergizing relay R—11 (Fig. 32), and the powder carrier returns from the pill press to the powder measurer. As the cycle shaft passes from position 19 to 20, it trips the loader return clutch (by mechanical cam action) and the loader returns toward its middle position.

The switch segment (152 in Fig. 29) on the Loader position switch is extended in the return direction, causing it to make early contact as the loader returns toward the middle position. This causes contact 20 on the cycle shaft contact disc to be energized at such a point that the cycle shaft moves to again mechanically trip the loader return clutch just as the loader reaches the middle position, and the loader therefore does not stop at the middle position but continues on to its retracted position. The cycle shaft runs to position 1 and stops.

When the loader reaches its retracted position in the pill press, and if the pill board is in its open position, thus closing the rail switch (162 in Fig. 40), contact 1 of the cycle control is again energized, and the cycle repeats itself, over and over again.

*Access for servicing*

Referring to Fig. 1, the molding press 47 is accessible on all sides, and is nearly as open as when used under manual control, the sole difference being the guide rails 69 at the sides of the press. It is therefore an easy matter to change the mold. With any reasonable change in dimension, the center to center location or spacing of the cavities may be kept the same. In such case there is no need to change the pill mold, and it is enough to change the dimension or adjustment of the powder measuring cups in the powder measurer 43. The resulting difference in the size of the pill will show up as a difference in thickness.

When, however, the difference in size is extremely great, as for example, when making a very much smaller product, the pills may become too thin if compressed in the same pill cavities. Furthermore a smaller center to center spacing would ordinarily be used, with a larger number of cavities in the mold, in order to increase the output. In such case, the pill mold must be changed. This is done by substituting a new cavity plate together with a new set of force plugs for the movable platen 57, and a new set of ejector plugs for the ejector mechanism. The bottom of powder box 115 with its array of measuring cups is also changed, and of course, the powder carrier and pillboard must be changed to fit the new cavity layout.

For convenient access during a change of this character, the powder measurer 43, the power unit 85, and the support 87 for the powder barrel 41, are all mounted on a sub-frame 741 which is normally held rigidly in desired location by bolting the same to the foundation 407 at 743, and to the guide rails at 745. The sub-frame 741 is mounted on wheels 747 so that it may be backed away from the pill press when the connections at 743 and 745 are released. The chain 73 is removed from the sprocket wheels 81, or the latter removed from the shaft 83.

With this separation at the middle of the apparatus, the pill press 45 is exposed on all sides to facilitate change of the pill mold, and the powder measurer 43 is also made fully accessible for the changes to be made therein.

*Advantages*

It is believed that the construction and operation, as well as the many advantages of my improved fully automatic molding apparatus, will be apparent from the foregoing detailed description thereof. The apparatus may be supplied with a container or barrel of molding powder at one end, and delivers finished molded pieces at the other end, all without manual intervention of any kind. In this respect the apparatus revolutionizes molding practice. However, the apparatus retains some detailed features of current molding practice which have been found desirable over many years of experience, and there is no attempt to revolutionize those details of molding technique which have been found good. Instead they are utilized and improved upon.

For example, the molding press is preferably a hydraulic press of standard design, and the same applies to the molds and stripping mechanisms. The control valves may be conventional screw stem valves, which are best for tightness, wear, and maintenance. The curing time is accurately clocked both for the low pressure treatment and the high pressure treatment, and these times are each readily independently adjustable at the clocks. The adjustment is in terms of actual time units, such as minutes and seconds. There is no need for the attendant to change his thinking in this respect. There is no need to change the size or relative positions of cams on a cam shaft in order to change the timing of the apparatus. The timing is so readily and so accurately changeable as to take care of even those day-to-day variations in weather conditions which may affect the molding powder.

The molding process used in this apparatus is preferably a two-stage process in which the powder is treated under heat, as well as pressure, when being made into pills. The relative mass or weight of the individual pills may be independently adjusted, and each pill is invariably delivered to a single related part of the mold. Flash and waste may be brought down to a minimum and, for practical purposes, eliminated. The heating of the pills may be carried quite far because the time which elapses for delivery of the pills to the molding press is substantially constant, hence there is no fear of over-cure resulting from delay in reaching the molding press.

Pre-heating reduces the necessary curing time in the molding press, which in turn speeds up the output of the machine. The finished product is of best quality and strength, and is absolutely uniform. Pieces of complex shape may be made because of the heated condition of the pill, and for the same reason it is also possible to make a product requiring the forcing of a slender or delicate insert into the pill as it is being molded. The gas generated during heating of the pills is freely and thoroughly vented from the exposed pills during their transfer to the molding press, and there is no need for "bumping" or venting at the molding press.

The automatic molding apparatus minimizes the number of defective or rejected pieces which result when the molding material is under-weight or over-weight for the mold cavity, or when the curing time is improper. For example, excess curing time may produce cracking of the molded piece, and under-curing may produce blistering. Even a departure from correct timing which is too slight to produce a visible effect, nevertheless greatly reduces the strength of the finished piece. Defective pieces may also result from improper cleaning of the mold to get rid of flash. With manual operation the mold must be cleaned every few minutes, whereas the present machine may be run for twelve hours before stopping the apparatus to clean the mold.

The operation of the parts of the apparatus is controlled by a main cycle control shaft, but the timing of the cure in the molding press is actually clocked and is not dependent upon the movement of the cycle control shaft. These two separate control means are suitably interrelated so that the clocks take charge when the molding press is closed. the cycle shaft remaining stationary until the treatment in the molding press is completed, whereupon the control goes back to the cycle shaft. Appropriate limit switches are provided on the presses and on the various valves so that each step in the operation is determined by completion of a preceding step, and there is no possibility of conflict. If something goes wrong such that the molding cycle is abnormally extended, the apparatus is shut down by means of a safety stop clock.

The loader is moved by equal steps and is locked in each of its three positions. These positions are so arranged that the pillboard remains in the pill press during the molding operation, thus saving the time which otherwise would be needed to move the pillboard into the pill press after opening of the pill press, and also saving floor space because the separation between the molding press and the pill press is minimized to the width of one board, instead of two boards.

Various operations of the parts of the apparatus are interlocked to protect the same against damage in the event of improper operation. For example, the pills are not ejected unless they have first been adequately pressed to desired small dimension. They are not ejected unless the pill press is first opened. The pillboard cannot move out of the pill press until after the pill press is opened, and also until after the ejection plugs have been raised and again lowered out of the way of the pillboard. When the ejection plugs have been raised, they cannot be lowered until after the pillboard has been closed to dislodge the pills from the ends of the ejection plugs and to grip the pills. The apparatus will not continue operation if the stripper means does not function successfully at the molding press. The apparatus is also shut down if the heating means for the mold fails and permits the mold to chill, and in such case, the shut-down is so arranged as to take place between molding cycles. The apparatus is also shut down if the loader is not retracted fully, for otherwise the pill press may smash the pillboard or/and the main press may smash the catchboard. The safety features go even further in that the pillboard must not only be retracted, but must also be in open condition to permit the pill press cycle to proceed.

The powder measurer makes it possible to use deep pill cavities, so that the powder level comes below the top of the cavity. The conveyor which delivers powder to the hopper is automatically controlled to keep the amount of powder in the hopper between desired limits. The powder in the hopper is continuously stirred to prevent any discrimination between fine and coarse particles going to any particular measuring cup. The measuring cups are vibrated during filling and emptying of the same, so as to insure accurate measurement. The vibrator is stopped when not needed as, for example, during the molding of the material in the presses. Although the apparatus is used with a standard press, it is so arranged that its dimensions may be readily varied to adapt the apparatus to different sizes of press.

The use of heat, as well as pressure, in the pill press is very important. Heretofore, it was taught that pilling requires a pressure of from 2½ to 3½ tons per square inch. My apparatus uses a pressure of only 700 pounds per square inch. This is very helpful in the present apparatus, which makes a large number of pills simultaneously. For example, with a 200-ton molding press, cold pilling would necessitate at least a 500-ton pill press, whereas my heated pill press is operated at less than 40 tons. This is made possible by proper interrelation of temperature treatment with pressure, for the pill is much more readily made if subjected to heat.

The pill if heated is compressed to small dimension. It then fits well within the main mold cavity, and there is no escape of molding material as the mold closes. Hence little or no cleaning of the mold is required.

With one particular molding material the temperature in the pill press is maintained substantially at 215° F.; the hot pills are transferred in approximately three seconds to the molding press; the latter press is closed in approximately nine seconds; whereupon the pills are subjected to increased pressure and temperature. The molding temperature depends somewhat on the cross-section of the material, for thin sections can be subjected to a higher temperature for a shorter time, while heavy sections require a lower temperature for a longer time in order to allow the heat to soak through the material. The molding temperature for the same material may be between 290° and 360° F., and is approximately 325° F. for the specific case of bottle caps mentioned above. This is substantially higher than the pilling temperature. The pills may be heated electrically, as shown. The main mold may be heated by steam, if that is the regular practice in the particular molding plant where the apparatus is installed. Either type of heat may be used for either press. The specific values are intended as an example and not in limitation of the invention.

Heating pills in the pill press while subjecting them to pressure is entirely different from heating cold pills in an oven, because the pressure on the powder quickly produces thorough soaking of the heat throughout the pill. The heating of the pills is valuable, not only to reduce the pilling pressure and to increase the curing speed, etc., but also because a better product with a denser structure is obtained. With bottle caps, for example, an increase in strength of twenty-five per cent is common, and all of the molding material is compacted into the cap without any waste or flash.

The movement of the powder carrier by mechanism separate from the chain which moves the pillboard and catchboard, is desirable so that the feed of powder may be interrupted to prevent accumulation of more than one charge of powder, in the event something goes wrong, without, however, interrupting the operation of the remainder of the apparatus so that the latter may treat and dispose of the previously delivered powder. The use of a sequence relay separate from and independent of the main cycle shaft also makes this possible. If the sequence relay steps were built into the cycle shaft so as to stop the latter on failure of a preceding step, then not only the feed of powder would be stopped, but also the entire apparatus, and this would raise many difficulties because of the thermosetting nature of the molding material.

The sprocket chain moves in two stages, and if the powder carrier were moved by the chain, one would have to provide lost motion, or use floor space in order to dispose the powder measurer further from the pill press. Moreover, the chain drive is through clutches causing full speed movement and abrupt stops, whereas the powder carrier is gradually decelerated to prevent spilling the powder outside the pill cavities.

It will be understood that although I have illustrated the use of a multiple cavity mold, the apparatus may also be used with a mold having a single large cavity as, for example, when making a wall type towel cabinet. In such case a plurality of pills may be made of appropriate shape and relative location and weight to advantageously place the molding material in best distribution about the large mold cavity. For this purpose the various pills may differ from one another in shape and size, as well as location, depending on the needs of the particular product being molded.

It will also be understood that many features of the present invention may be used even if preliminary molding of preforms is not wanted. In such case the powder measurer and powder carrier may be combined with a molding press for direct delivery of the powder to the mold cavity or cavities. The pill press is eliminated. The amount and distribution of the powder is determined by the powder measurer and powder carrier.

These and numerous other changes may be made, and it will therefore be apparent that while I have shown and described my invention in a preferred form, many modifications may be made in the structure disclosed without departing from the spirit of the invention, as sought to be defined in the following claims.

I claim:

1. In combination, a molding press, a pill press having a cavity plate with a plurality of cavities, force plugs movable into or out of the pill cavities by the pill press, a pillboard having openings therethrough larger than the pills and having releasable means to hold the pills, the openings in the pillboard being registerable with the pill cavities, means to move the pillboard into the pill press, means to close the pill press to move the force plugs through the pillboard into the pill cavities in order to make pills, ejector plugs to eject the pills from the pill cavities into the pillboard, means to operate the ejector plugs while the pillboard is in the pill press, means to move the pillboard to the molding press in order to transfer the pills thereto, and cycle control means to automatically produce the aforesaid operations in proper sequence.

2. In combination, a molding press carrying a multiple cavity mold, a pill press having a cavity plate with a plurality of cavities so relatively located as to correspond to the mold cavities of the mold, means to heat the cavity plate, force plugs movable into or out of the pill cavities by the pill press, a pillboard having openings therethrough larger than the pills and having releasable means to hold the pills, the openings in the pillboard being registerable with the pill cavities and mold cavities, means to move the pillboard into the pill press, means to close the pill press to move the force plugs through the pillboard into the pill cavities in order to make pills, ejector plugs to eject the pills from the pill cavities into the pillboard, means to operate the ejector plugs while the pillboard is in the pill press, means to move the pillboard to the molding press in order to transfer the pills bodily to their respective mold cavities, and cycle control means to automatically produce the aforesaid operations in proper sequence.

3. In combination, a molding press having a multiple cavity mold, a pill press having a cavity plate with a plurality of cavities so relatively located as to correspond to the mold cavities of the mold, force plugs movable into or out of the pill cavities by the pill press, a pillboard having openings therethrough larger than the pills and having releasable means to hold the pills, the openings in the pillboard being registerable with the pill cavities and mold cavities, means to move the pillboard into the pill press, means to close the pill press to move the force plugs through the pillboard into the pill cavities in order to make pills, ejector plugs to eject the pills from the pill cavities into the pillboard, means to operate the ejector plugs while the pillboard is in the pill press, means to move the pillboard to the molding press in order to transfer the pills bodily to the mold cavities, whereby the pill formed in any particular pill cavity is invariably transferred to a single corresponding mold cavity, and means to independently adjust the relative mass of the pills in order to thereby compensate for variations in the relative size of the mold cavities.

4. Automatic molding apparatus including a molding press, valves to operate said molding press, a master cycle control means for said apparatus including an element mechanically moved through successive positions, a motor independent of said press to move said element of the cycle control means, means controlled by the position of the movable element of said cycle control means for initiating the operation of the valves, and additional clock means for timing the duration of opening of the valves independently of the master cycle control means.

5. Automatic molding apparatus including a molding press, valves to operate said molding press, clock means to automatically time the duration of operation of the valves, a master cycle control shaft for said apparatus, means to rotate the same step by step, and means controlled by the position of the cycle control shaft for initiating the timing operation of the valves by the clock means.

6. Automatic molding apparatus including a master cam shaft or cycle control shaft, means to rotate the same with an intermittent step by step movement, in which each step of movement is only a small fraction of one revolution of the said shaft, each step corresponding to one part of the operating cycle of the apparatus, and safety means to prevent the shaft from being rotated to a certain succeeding step until the cycle part corresponding to the preceding step has been successfully completed.

7. Automatic molding apparatus comprising means to intermittently move a driven shaft in either direction and to lock the same in its dwell position, said means comprising a countershaft, a driving motor unidirectionally driving the countershaft, a pair of single-revolution clutches on said countershaft, locking means for locking each of said clutches against rotation, differential gearing including forward and backward differential gears and one or more pinions meshing therewith, the differential pinions being secured to said driven shaft, the forward and backward differential gears being loosely rotatable on said driven shaft, means gearing one of the aforesaid clutches to one of said differential gears for rotation in one direction, and means gearing the other clutch to the other differential gear for rotation in the opposite direction.

8. Automatic molding apparatus comprising a plurality of units, a carrier movable between said units, a sprocket chain for moving said carrier, a sprocket shaft for moving said chain, and means to intermittently move said sprocket shaft in either direction and to lock the same in its dwell positions, said means comprising a countershaft, a driving motor unidirectionally driving the countershaft, a pair of single-revolution clutches on said countershaft, locking means for locking each of said clutches against rotation, differential gearing including forward and backward differential gears and one or more pinions meshing therewith, the differential pinions being secured to said sprocket shaft, the forward and backward differential gears being loosely rotatable on said sprocket shaft, means gearing one of the aforesaid clutches to one of said differential gears for rotation in one direction, and means gearing the other clutch to the other differential gear for rotation in the opposite direction.

9. Automatic molding apparatus comprising a plurality of presses, a catchboard and a pillboard movable through said presses, a sprocket chain for moving said boards, a sprocket shaft for moving said chain, and means to intermittently move said sprocket shaft in either direction and to lock the same in its dwell position, said means comprising a driving motor, a pair of single-revolution clutches driven by the motors, locking means for locking each of said clutches against rotation, and forward and backward running gears between said clutches and said sprocket shaft.

10. In combination, a molding press, a pill press having multiple pill cavities, means to heat the cavities, force plugs movable downwardly into said cavities to make the pills, ejection plugs closing the bottom of said cavities and movable upwardly through said cavities, guides extending between said presses, a pillboard movable along said guides and having a part having multiple pill openings registerable with said pill cavities, means to move the pillboard along said guides between said presses, and additional means to abruptly jar the pill-opening part of the pillboard when the pillboard is in the pill press, in order to dislodge the formed pills from the upper ends of the ejection plugs when the pills have been ejected into the pillboard.

11. In combination, a pill press having multiple pill cavities, ejection plugs closing the bottom of said cavities and movable upwardly through said cavities, a pillboard having multiple pill openings registering with said pill cavities, said pillboard comprising upper and lower laminations, springs carried on said upper lamination and extending downwardly into the openings of the lower lamination to hold the pills in the lower lamination, and means to move the lower lamination relative to the upper lamination, said means being sufficiently powerful to dislodge the pills from the upper ends of the ejection plugs when the pills have been ejected into the pillboard.

12. In combination, a molding press having a multiple cavity mold, a pill press having multiple pill cavities, force plugs movable downwardly into said cavities, ejection plugs closing the bottom of said cavities and movable upwardly through said cavities, guides extending between said presses, a pillboard movable along said guides and having multiple pill openings registerable with said pill cavities and mold cavities, said pillboard comprising upper and lower laminations, springs carried on said upper lamination and extending downwardly into the openings of the lower lamination to hold the pills in the lower lamination, means to move the pillboard along said guides between said presses, said means being secured to the upper lamination, and additional means to move the lower lamination relative to the upper lamination, said means being sufficiently powerful to dislodge the pills from the upper ends of the ejection plugs when the pills have been ejected into the pillboard.

13. Automatic molding apparatus comprising a molding press, a pill press, guides extending through said presses, pill transfer means movable along said guides, means for moving the pill press through a pill-making cycle, means for moving the molding press through a molding cycle, means interrelating the aforesaid cycles for transfer of the pills from the pill press to the molding press, and safety interlock means for interrupting the molding cycle if the pill press cycle is started but not completed.

14. Automatic molding apparatus comprising a molding press having a multiple cavity mold, a pill press having multiple pill cavities, guides extending through said presses, a pillboard movable along said guides, said pillboard having pill pockets registering with the aforesaid mold cavities and pill cavities, means for moving the pill press through a pill-making cycle, means for moving the molding press through a molding cycle, means interrelating the aforesaid cycles for transfer of the pills by means of the pillboard to the molding press, and safety interlock means for interrupting the molding cycle if the pill press cycle is started but not completed, said means being so arranged as not to interrupt the molding cycle if the pill press cycle is not started at all.

15. Automatic molding apparatus comprising a pill press having multiple pill cavities, force plugs movable into said cavities to form the pills, a powder carrier for delivering powder to the pill cavities, means to open said pill press, means to eject the pills from the pill cavities, and safety interlock sequence controlling means to prevent the ejection of the powder from the pill cavities unless it has first been compressed by the force plugs to form the same into pills.

16. Automatic molding apparatus comprising a pill press having multiple pill cavities, force plugs movable into said pill cavities, a pillboard having pill pockets registerable with the aforesaid pill cavities, means to open said pill press, means to eject pills upwardly from the pill cavities into the pillboard, and safety interlock sequence controlling means to prevent the ejection of pills from the pill cavities before the pill press has been opened to raise the force plugs out of the pill cavities.

17. Automatic molding apparatus comprising a molding press, a pill press having multiple pill cavities, guides extending through said presses, a pillboard movable along said guides, said pillboard having pill pockets registerable with the aforesaid pill cavities, means to eject pills upwardly from the pill cavities into the pillboard, means to move the pillboard out of the pill press, and safety interlock sequence controlling means to prevent the pillboard from being moved away from the pill press while the ejection means are still raised.

18. Automatic molding apparatus comprising a molding press, a pill press having multiple pill cavities, guides extending through said presses, a pillboard movable along said guides, said pillboard having pill pockets registerable with the aforesaid pill cavities, ejection plungers to eject the pills upwardly from the pill cavities into the pillboard, means to move the pillboard out of the pill press, and safety interlock sequence controlling means to prevent return of the ejection plungers until the pillboard has been so manipulated as to dislodge the pills from the plungers and to grip the same.

19. Automatic molding apparatus comprising a molding press, a pill press having multiple pill cavities, force plugs movable into said cavities when the press is closed, guides extending through said presses, a pillboard and powder carrier movable along said guides, said pillboard having pill pockets registerable with the aforesaid pill cavities, means to open said pill press, ejection plungers to eject pills upwardly from the pill cavities into the pillboard, means to move the pillboard out of the pill press, safety interlock sequence controlling means to prevent ejection of the powder unless it has first been compressed by the force plugs to form the same into pills, safety interlock sequence controlling means to prevent the ejection of pills from the pill cavities before the pill press has been opened to raise the force plugs out of the pill cavities, safety interlock sequence controlling means to prevent the pillboard from being moved away from the pill press while the ejection plungers are still raised, and safety interlock sequence controlling means to prevent return of the ejection plungers until the pillboard has been so manipulated as to dislodge the pills from the plungers.

20. Automatic molding apparatus comprising a molding press, means to heat the mold, means for moving the apparatus through repeated molding cycles, and means responsive to cooling of the mold to shut down the apparatus at a point between complete cycles of the apparatus.

21. Automatic molding apparatus comprising a molding press, a pill press having multiple pill cavities, guides extending through said presses, a pillboard movable along said guides, said pillboard having pill pockets registerable with the aforesaid pill cavities, means to open said presses, means to eject pills upwardly from the pill cavities into the pillboard, means to move the pillboard from the pill press to the molding press and back again, and safety interlock sequence controlling means responsive to return of the pillboard into the pill press, said means stopping the apparatus upon failure of the pillboard to return fully into the press.

22. Automatic molding apparatus comprising a molding press, a pill press having multiple pill cavities, guides extending through said presses, a pillboard movable along said guides, said pillboard having openable pill pockets registerable with the aforesaid pill cavities, means to open said presses, means to eject pills upwardly from the pill cavities into the pillboard, means to move the pillboard from the pill press to the molding press and back again, and safety interlock sequence controlling means responsive to opening of the pillboard, said means stopping the cycle from proceeding upon failure of the pillboard to be open when the pillboard returns to the pill press.

23. Automatic molding apparatus comprising a molding press, valves controlling the operation of the molding press, motor means for operating said valves, a main cycle control shaft for controlling the operating cycle of the apparatus, means for intermittently moving the same with a step by step movement, and transfer switches associated with and actuated by said valves for controlling at least some of the step by step movements of the cycle control shaft, said transfer switches being responsive to completion of the valve movements.

24. Automatic molding apparatus comprising a molding press, a pill press, guides extending through said presses, a catchboard and pillboard and powder carrier movable along said guides, valves controlling the operation of the molding press, motor means for operating said valves, a main cycle control shaft for controlling the operating cycle of the various parts of the apparatus, means for intermittently moving the same with a step by step movement, and transfer switches associated with and actuated by movement of said valves for controlling at least some of the step by step movements of the cycle control shaft, said transfer switches being responsive to completion of the valve movements.

25. A molding apparatus including means to automatically repeatedly operate the apparatus, a safety stop clock set to measure a time somewhat greater than the normal time required for the operating cycle of the apparatus, and means actuated by said safety stop clock to shut down the apparatus if an operating cycle exceeds the time period set on the safety stop clock.

26. A molding apparatus comprising a pill press, a molding press, means to convey powder to the pill press, means to convey pills from the pill press to the molding press, means including a cycle control shaft and clock mechanism for timing and properly interrelating the operation of the parts of the apparatus, a safety stop clock set to measure a time somewhat greater than the normal time required for the operating cycle of the apparatus, means to reset the safety stop clock at the end of each normal cycle of operation, and means actuated by said safety stop clock to shut down the apparatus if the time period of the safety stop clock runs out before it is reset.

27. Automatic molding apparatus comprising a powder measurer including a plurality of volumetric measuring cups, a powder box above the measuring cups for gravitationally supplying molding powder to all of the cups simultaneously, a main source of molding powder, a motor driven conveyor for feeding the molding powder from the main source to the powder box, and means responsive to changes in weight of the powder box for controlling the duration of operation of the conveyor motor, whereby the quantity of powder in the powder box may be kept between desired maximum and minimum limits, said minimum limit being adequate to insure continued supply of powder to the cups.

28. Automatic molding apparatus comprising a powder measurer including a plurality of measuring cups, a powder box above the measuring cups for gravitationally supplying molding powder to the cups, and a high-speed vibrator secured to the measurer at the measuring cups in order to impart thereto a high-speed vibration of substantially imperceptible amplitude, thereby insuring complete filling and complete emptying thereof.

29. Automatic molding apparatus comprising a molding press, a pill press, means for conveying the pills from the pill press to the molding press, a powder measurer including a plurality of measuring cups, means to transfer the measured powder from the cups to the pill press, a powder box above the measuring cups for gravitationally supplying molding powder to the cups, means to operate the aforesaid apparatus through automatically repeated molding cycles, a vibrator secured to the measurer in order to insure complete filling and complete emptying thereof, and means to start the vibrator upon operation of the powder measurer, and to stop it thereafter, during each molding cycle of the complete apparatus.

30. Automatic molding apparatus comprising a molding press, a pill press spaced therefrom, guides extending through said presses and beyond said molding press, a catchboard and a pillboard connected for simultaneous movement along said guides, the spacing of said boards and the spacing between the presses being so related that said boards may be moved along the guides by equal steps to assume any of three positions, there being a first position with the pillboard in the pill press and the catchboard between the presses, a second position with the catchboard in the molding press and the pillboard between the presses, and a third position with the pillboard in the molding press and the catchboard beyond the molding press.

31. Automatic molding apparatus comprising a molding press, a pill press spaced from the molding press, guides extending through said presses and having downwardly inclined ends beyond the molding press, a catchboard and a pillboard pivotally connected for simultaneous movement along said guides, the width of said boards being substantially equal to the width of said presses and the spacing between the presses being substantially equal to the width of a board, whereby said boards may be moved along the guides by equal steps to assume any of three positions, there being a first position with the pillboard in the pill press and the catchboard between the presses, a second position with the catchboard in the molding press and the pillboard between the presses, and a third position with the pillboard in the molding press and the catchboard on the inclined guide ends, and motor driven means to intermittently move the boards one step at a time.

32. Automatic molding apparatus comprising a molding press, a pill press, guides extending through said presses and beyond said molding press, a catchboard and a pillboard pivotally connected for simultaneous movement along said guides, the spacing of said boards and the spacing between the presses being so related that said boards may be moved along the guides by equal steps to assume any of three positions, there being a first position with the pillboard in the pill press and the catchboard between the presses, a second position with the catchboard in the molding press and the pillboard between the presses, and a third position with the pillboard in the molding press and the catchboard beyond the molding press, a sprocket chain for moving said boards, a sprocket shaft carrying a sprocket for moving said chain, said sprocket having a periphery equal to one step of movement of the boards, and motor driven means to intermittently move the sprocket shaft one revolution at a time.

33. Automatic molding apparatus comprising a molding press, a pill press spaced from the molding press, guides extending through said presses and having downwardly inclined ends beyond the molding press, a catchboard and a pillboard pivotally connected for simultaneous movement along said guides, the width of said boards being substantially equal to the width of said presses and the spacing between the presses being substantially equal to the width of a board, whereby said boards may be moved along the guides by equal steps to assume any of three positions, there being a first position with the pillboard in the pill press and the catchboard between the presses, a second position with the catchboard in the molding press and the pillboard between the presses, and a third position with the pillboard in the molding press and the catchboard on the inclined guide ends, a sprocket chain for moving said boards, a sprocket shaft carrying a sprocket for moving said chain, said sprocket having a periphery equal to one step of movement of the boards, motor driven means to intermittently move the sprocket shaft one revolution at a time, motor driven valves for controlling the molding press, motor driven valves for controlling the pill press, and cycle control means for automatically interrelating the operation of all of the aforesaid motor driven means in proper sequence for completely automatic operation of the apparatus.

34. Automatic molding apparatus comprising a molding press, a pill press, guides extending through said presses and having downwardly inclined ends beyond the molding press, a catchboard and a pillboard pivotally connected for simultaneous movement along said guides, the spacing of said boards and the spacing between the presses being so related that said boards may be moved along the guides by equal steps to assume any of three positions, there being a first position with the pillboard in the pill press and the catchboard between the presses, a second position with the catchboard in the molding press and the pillboard between the presses, and a third position with the pillboard in the molding press and the catchboard on the inclined guide ends, a sprocket chain for moving said boards, a sprocket shaft carrying a sprocket for moving said chain, said sprocket having a periphery equal to one step of movement of the boards, and means including a self-locking single revolution clutch to intermittently move the sprocket shaft one revolution at a time and to lock the same in its dwell position.

35. Automatic molding apparatus comprising a molding press, a pill press spaced from the molding press, guides extending through said presses, a catchboard and a pillboard pivotally connected for simultaneous movement along said guides, the width of said boards being substantially equal to the width of said presses and the spacing between the presses being substantially equal to the width of a board, whereby said boards may be moved by equal steps to assume any of three positions, there being a first position with the pillboard in the pill press and the catchboard between the presses, a second position with the catchboard in the molding press and the pillboard between the presses, and a third position with the pillboard in the molding press and the catchboard beyond the molding press, a sprocket chain for moving said boards, a sprocket shaft carrying a sprocket for moving said chain, said sprocket having a periphery equal to one step of movement of the boards, and means to intermittently move the sprocket shaft one revolution at a time and to lock the same in its dwell position, said means comprising a driving motor driving a countershaft, a pair of self-locking single revolution clutches on said countershaft, differential gearing having the differential pinions thereof secured to said sprocket shaft and meshing with forward and backward differential gears loosely rotatable on said sprocket shaft, means gearing one of the aforesaid clutches to one of said differential gears for rotation in one direction, and means gearing the other clutch to the other differential gear for rotation in the opposite direction.

36. Means for controlling automatic apparatus, said means comprising a control shaft, appropriate means on said shaft for controlling parts of the apparatus, and electrically operated means for giving said shaft a step by step movement for a fraction of a revolution under the influence of outside control circuits, said means including a motor, reduction gearing between said motor and said shaft, stop means for stopping a part of said gear train at a point corresponding to the movement of the control shaft by one step, a series of contacts about said control shaft corresponding to the desired step by step movement, outside control circuits connected to said contacts, a contact arm on said control shaft engaging said contacts, and means to operate the aforesaid stop means including a circuit running through said contacts and contact arm, the arrangement being such that energization of a contact on which the contact arm is seated advances the control shaft to the next contact which is de-energized.

37. Means for controlling automatic molding apparatus, said means comprising a control shaft, appropriate switch means and cam means on said shaft for controlling parts of the apparatus, and electrically operated means for giving said shaft a step by step movement for a fraction of a revolution under the influence of outside control circuits, said means including a motor, reduction gearing between said motor and said shaft, a single revolution clutch located in said gear train at a point where a single revolution corresponds to the movement of the control shaft by one step, a series of contacts about said control shaft corresponding to the desired step by step movement outside control circuits connected to said contacts, a contact arm on said control shaft engaging said contacts, and means to operate the aforesaid clutch including a circuit running through said contacts and contact arm, the arrangement being such that energization of a contact on which the contact arm is resting advances the control shaft to the next contact which is de-energized.

38. Means for controlling automatic apparatus, said means comprising a control shaft, appropriate switch means on said shaft for controlling parts of the apparatus, and means for giving said shaft a step by step movement for a fraction of a revolution under the influence of outside control circuits, said means including a motor, a motor switch, reduction gearing between said motor and said shaft, means for including a dog and notched disc, for locking a part of said gear train at a point corresponding to the movement of the control shaft by one step, a series of contacts about said control shaft corresponding to the desired step by step movement outside control circuits connected to said contacts, a contact arm on said control shaft engaging said contacts, a solenoid for releasing the dog and for closing the motor switch, and means to operate the aforesaid solenoid including circuits running through said contacts and contact arm, the arrangement being such that energization of a contact on which the contact arm is seated advances the control shaft to the next contact which is de-energized.

39. Automatic molding apparatus comprising a molding press, a pill press having multiple pill cavities, guides extending through said presses, a pillboard and powder carrier movable along said guides, said pillboard having pill pockets registerable with the pill cavities, means to open said presses, means to eject pills upwardly from the pill cavities into the pillboard, means to move the pillboard out of the pill press into the molding press, and to move the powder carrier into the pill press, means to discharge the pills from the pillboard into the mold, means to discharge the powder from the powder carrier into the pill cavities, means to return the powder carrier, means to return the pillboard to the pill press, means to close the presses, and cycle control means for automatically producing the aforesaid operations in proper sequence.

40. Automatic molding apparatus comprising a molding press, a pill press having multiple pill cavities, guides extending through said presses and having downwardly inclined ends beyond said molding press, a catchboard and pillboard and powder carrier movable along said guides, said pillboard having pill pockets registerable with the aforesaid pill cavities, means to open said pill press and to partly open said molding press, means to eject pills upwardly from the pill cavities into the pillboard, means to move the catchboard into the partly open molding press and to move the pillboard out of the pill press and to move the powder carrier into the pill press, means to finish opening the molding press in order to strip the molded product onto the catchboard, means to move the catchboard out of the molding press onto the inclined guide ends and to move the pillboard into the molding press, means to discharge the pills from the pillboard into the mold, means to discharge powder from the powder carrier into the pill cavities, means to move the powder carrier out of the pill press, means to return the pillboard to the pill press, means to close the presses, and cycle control means for automatically producing the aforesaid operations in proper sequence.

41. Automatic molding apparatus comprising a molding press, a powder measurer spaced from the molding press and having multiple powder measuring cups, spaced parallel guides extending beneath said measurer and through said press, a catchboard and a carrier movable along said guides, said carrier having powder pockets registerable with the aforesaid measuring cups, means to partly open said molding press, means to move the catchboard along the guides into the partly open press, means to finish opening the press in order to strip the molded product onto the catchboard, means to move the catchboard along the guides out of the molding press and to move the carrier along the guides into the molding press, means to discharge the contents from the carrier into the mold cavities, means to fill the measuring cups with powder, means to return the carrier from the press along the guides, means to close the press, and cycle control means for automatically producing the aforesaid operations in proper sequence.

42. Automatic molding apparatus comprising a molding press having a multiple cavity mold with stripper means, a pill press having multiple pill cavities, a powder measurer having multiple powder measuring cups, guides extending beneath said measurer and through said presses and having downwardly inclined ends beyond said molding press, a catchboard and pillboard and powder carrier movable along said guides, said pillboard having pill pockets and said powder carrier having powder pockets registerable with the aforesaid mold cavities and pill cavities and measuring cups, means to open said pill press and to partly open said molding press, means to eject pills upwardly from the pill cavities into the pillboard, means to move the catchboard into the partly open press and to move the pillboard out of the pill press and to move the powder carrier into the pill press, means to finish opening the press in order to strip the molded pieces onto the catchboard, means to move the catchboard out of the molding press onto the inclined guide ends and to move the pillboard into the molding press, means to discharge the pills from the pillboard into the mold cavities, means to discharge the powder from the powder carrier pockets into the pill cavities, means to fill the measuring cups with powder, means to return the powder carrier to the powder measurer, means to return the pillboard to the pill press, means to close the presses, means to discharge powder from the measuring cups into the carrier pockets preparatory to another molding cycle, means to heat the pill press, means affording independent relative adjustment of the volumetric capacity of the measuring cups, and cycle control means for automatically producing the aforesaid operations in proper sequence.

43. The method of molding a thermosetting material which includes first subjecting the molding material in powdered condition to heat and pressure in a first mold and press to form a relatively crude embryonically shaped preform, opening said press and transferring the preform while in heated condition directly to a second mold and press, the pressure on the preform being completely relieved during the transfer to permit the escape of gases, and thereupon subjecting the hot preform to higher temperature heat and greater unit pressure in the second press to change the preform to finished shape and condition said first press being used for cooperation solely with said second press, and both presses being closed for approximately the same time, the first press working on a preform next to be used in the second press, while the second press is working on the preform previously made in the first press.

44. The method of molding a thermosetting molding material which includes periodically supplying powder to a first mold and press and subjecting the powder to heat and pressure to form a relatively crude embryonically shaped preform, periodically transferring the resulting preform while in heated condition to a second mold and press, the pressure on the preform being completely relieved during the transfer in order to vent gases therefrom, subjecting the heated preform to heat and pressure in a second press in order to change the preform to finished shape and to cure and set the molding material, both presses being closed for approximately the same time, the first press working on a preform next to be used in the second press, while the second press is working on the preform previously made in the first press, the treatment of the successive charges of powder being periodic and regularly repeated at predetermined intervals in order to accurately control the cure of the molding material.

45. Molding apparatus comprising a powder measurer, a pill press, a molding press, means for transferring powder from the measurer to the pill press in order to make the measured charges of powder into pills, means to transfer the resulting pills from the pill press to the molding press in order to finish molding the same, a master control producing a desired sequential and interrelated action of the aforementioned parts of the apparatus, and a separate sequence relay more immediately controlling the measurer and the means to deliver powder from the measurer to the pill press, whereby the latter parts of the apparatus may be held inoperative while the remaining parts of the apparatus continue operation in order to treat and dispose of previously delivered charges of molding material.

46. Molding apparatus comprising a powder measurer, a pill press, a molding press, a powder carrier for transferring powder from the measurer to the pill press in order to make the measured charges of powder into pills, a pillboard to transfer the resulting pills from the pill press to the molding press in order to finish molding the same, means including a first motor to move the pillboard, and additional means to move the powder board including a second motor and a decelerating means to nicely control and decelerate the powder carrier as it moves into the pill press, said decelerating means having no effect on the first motor.

47. Molding apparatus comprising a powder measurer, a pill press, a molding press, a powder carrier for transferring powder from the measurer to the pill press in order to make the measured charges of powder into pills, a pillboard to transfer the resulting pills from the pill press to the molding press in order to finish molding the same, a master control producing a desired sequential and interrelated action of the aforementioned parts of the apparatus, and a separate sequence relay more immediately controlling the powder carrier and the powder measurer, whereby the latter parts of the apparatus may be held inoperative while the remaining parts of the apparatus continue operation in order to treat and dispose of previously delivered charges of molding material, means including a first motor to move the pillboard, and additional means to move the powder board including a second motor and a decelerating means to nicely control and decelerate the powder carrier as it moves into the pill press, said decelerating means having no effect on the first motor.

48. Apparatus for molding a thermosetting material, said apparatus comprising an unheated powder measuring device, a first press having a mold fixed therein, means to heat the same, a second press having a mold fixed therein and arranged to close with a greater unit pressure than the first press, means to heat the second press to a higher temperature than the first press, means to transfer a charge of powder measured by the powder measuring device to the mold of the first press in order to make same into a heated preform, and means to transfer the heated preform from the mold of the first press to the mold of the second press for molding the preform to final shape.

49. Apparatus for molding a thermosetting material, said apparatus comprising an unheated powder measuring device, a first press having a mold fixed therein, means to heat the same, a second press having a mold, means to heat the same, means to transfer a charge of powder measured by the powder measuring device to the mold of the first press in order to make same into a heated preform, means to transfer the heated preform from the mold of the first press to the mold of the second press for molding the preform to final shape, and means to automatically cause periodic operation of said first and second presses and said transfer means.

50. Apparatus for molding a thermosetting material, said apparatus comprising an unheated powder measuring device, a pill press having a pill mold, a molding press having a mold, means to heat the same, means to transfer a charge of powder measured by the powder measuring device to the mold of the pill press in order to make the same into a pill, means to transfer the pill from the mold of the pill press to the mold of the molding press, and means to cause periodic operation of said pill press, transfer means and molding press.

51. Apparatus for molding a thermosetting material, said apparatus comprising a powder measurer, a pill press having a pill mold, means to heat the same, a molding press having a mold, means to heat the same, means to transfer a measured amount of powder from the measurer to the mold of the pill press, means to transfer a heated pill from the mold of the pill press to the mold of the molding press, and means to cause periodic operation of said measurer, said presses and said transfer means.

52. In the molding of plastics in a mold, the method which includes periodically simultaneously measuring out independently predetermined amounts of molding powder for each part of the mold, periodically simultaneously transferring the measured amounts of powder to a plurality of pill molds, periodically compressing the measured amounts of molding powder simultaneously to form a plurality of pills, one for each mold part, periodically bodily transferring the pills simultaneously each to its corresponding mold part, and then subjecting the pills simultaneously to heat and pressure for a predetermined time, the mold parts receiving independently predetermined amounts of molding material which may differ from one another so as to be properly related to the dimensions of the respective mold parts, the aforesaid steps being performed periodically in regularly recurring cycles in order to insure uniform optimum cure of the molding powder.

53. In the molding of plastics in a multiple-cavity mold, the method which includes periodically simultaneously measuring out independently predetermined amounts of molding powder for each mold cavity, periodically simultaneously transferring the measured amounts of powder to a plurality of pill molds, periodically compressing and heating the measured amounts of molding powder simultaneously to form a plurality of heated pills, one for each mold cavity, periodically bodily transferring the pills simultaneously each to its corresponding mold cavity, and then subjecting the pills simultaneously to heat and pressure for a predetermined time, each mold cavity receiving an independently predetermined amount of molding material properly related to the dimensions of the particular mold cavity, said amounts differing from one another where necessary, the aforesaid steps being performed periodically in regularly recurring cycles in order to insure uniform optimum cure of the molding powder.

54. Apparatus for molding a thermosetting material, said apparatus comprising an unheated multiple compartment powder measurer for simultaneously measuring a plurality of charges of molding powder, a pill press having a pill mold with a plurality of pill cavities, means to heat the pill mold, a molding press having a die with a plurality of die cavities, means to heat the die, a powder carrier having a plurality of powder pockets to simultaneously transfer a plurality of measured charges of powder from the powder measurer to the pill cavities, a pill carrier to simultaneously transfer the resulting heated pills from the pill cavities to the die cavities, and means to cause periodic interrelated operation of said measurer, said presses, and said carriers.

55. In combination, a molding press, a pill press having a pill cavity plate with a plurality of pill cavities, force plugs movable into or out of the pill cavities by the pill press, a pillboard having openings therethrough larger than the pills and having releasable means to hold the pills, the openings in the pillboard being registerable with the pill cavities in one position of the pillboard, means to move the pillboard between the pill press and the molding press, means to close the pill press to move the force plugs through the pillboard into the pill cavities to make pills, ejector plugs to eject the pills from the pill cavities into the pillboard, means to operate the ejector plugs, and cycle control means to automatically produce the desired operations in proper sequence, said cycle control means including an intermittently rotatable shaft, means to stop said shaft during the curing of the pieces being molded, and clock means to start said shaft at the end of the predetermined desired curing time.

56. In combination, a molding press having a multiple cavity mold, a pill press having a cavity plate with a plurality of pill cavities so relatively located as to be registerable with the mold cavities of the mold, force plugs movable into or out of the pill cavities by the pill press, a pillboard having openings therethrough larger than the pills and having releasable means to hold the pills, the openings in the pillboard being registerable with the pill cavities and mold cavities, means to move the pillboard into the pill press, means to close the pill press to move the force plugs through the pillboard into the pill cavities in order to make pills, ejector plugs to eject the pills from the pill cavities into the pillboard, means to operate the ejector plugs while the pillboard is in the pill press, means to move the pillboard to the molding press in order to transfer the pills bodily to the mold cavities, whereby the pill formed in any particular pill cavity is invariably transferred to a single corresponding mold cavity, means to independently adjust the relative mass of the pills in order to thereby compensate for variations in the relative size of the mold cavities, and cycle control means to automatically produce the desired operations in proper sequence, said cycle control means including an intermittently rotatable shaft, means to stop said shaft during curing of the pieces being molded, and clock means to start said shaft at the end of the predetermined desired curing time.

57. Automatic molding apparatus comprising a molding press, a pill press including a movable head, a pill cavity plate having multiple pill cavities, and force plugs and ejector plugs mating with the pill cavities, guides extending through said presses, a pillboard movable along said guides for transferring the pills from the pill press to the molding press, said pillboard having openings therein registerable with the pill cavities when the pillboard is in the pill press and having releasable means to hold the pills, power means for moving the pill press through a pill making cycle, hydraulic means including power operated valves for moving the molding press through a molding cycle, means including an intermittently step by step rotated control shaft for interrelating the press cycles and the transfer of the pills from the pill press to the molding press, and a safety interlock device operated by movement of the movable head of the pill press away from its rest position for preventing such step by step movement of the control shaft as will lead to attempted movement of the pill box out of the pill press if the pill press cycle is started but not completed.

58. Automatic molding apparatus comprising a molding press, a pill press having multiple pill cavities and mating force plugs and ejector plugs, a powder carrier for delivering powder to the pill cavities, a pillboard for transferring pills from the pill cavities to the molding press, said pillboard having openings registerable with the pill cavities when the pillboard is in the pill press, means to close the pill press to move the force plugs into the pill cavities, means to operate the ejector plugs, hydraulic means including power operated control valves for operating the molding press, means including an intermittently step by step rotated control shaft for interrelating the aforesaid operations, and a safety interlock device operated by the movable head of the pill press when the head is lowered to its bottom pill forming position for preventing operation of the ejector plugs, and consequent ejection of the powder from the pill cavities, prior to descent of the force plugs to form the powder into pills.

59. Automatic molding apparatus comprising a molding press, a pill press having multiple pill cavities and mating force plugs and ejector plugs, a pillboard having pill pockets registerable with the aforesaid pill cavities when the pillboard is in the pill press, means to move said pillboard between the pill press and the molding press, means to close the pill press to move the force plugs through the pillboard into the pill cavities, means to operate the ejector plugs to eject the pills upwardly from the pill cavities into the pillboard, an intermittently step by step rotated control shaft for interrelating the aforesaid operations, and a safety interlock device operated by the head of the pill press, for preventing the operation of the ejector plugs in order to prevent ejection of pills from the pill cavities before the head of the pill press has been raised a substantial distance so as to clear the way for upward movement of the ejector plugs and pills.

60. Automatic molding apparatus comprising a molding press, a pill press having multiple pill cavities and mating force plugs and ejector plugs, guides extending through said presses, a pillboard movable along said guides, said pillboard having pill pockets registerable with the aforesaid pill cavities when the pillboard is in the pill press, means to close the pill press in order to operate the force plugs, means to operate the ejector plugs to eject the pills upwardly into the pillboard, hydraulic means including power operated control valves for operating the molding press, means to move the pillboard out of the pill press toward the molding press, an intermittently step by step rotated control shaft for properly interrelating the aforesaid operations, and a safety interlock device operated by movement of the ejector plugs for preventing continued step by step movement of the control shaft, and thereby preventing the pillboard from being moved out of the pill press, while the ejection plugs are still raised.

61. Automatic molding apparatus comprising a molding press, a pill press having multiple pill cavities and mating force plugs and ejector plugs, guides extending through said presses, a pillboard movable along said guides, said pillboard having pill pockets registerable with the aforesaid pill cavities when the pillboard is in the pill press, said pillboard also having releasable means to grip the pills, a pillboard actuator to actuate said releasable means to grip the pills, hydraulic means including power operated control valves to operate the molding press, means to operate the force plugs to move the same into the pill cavities, means to operate the ejection plugs to eject the pills upwardly from the pill cavities into the pillboard, means to move the pillboard out of the pill press to the molding press, an intermittently step by step rotated control shaft for properly interrelating the aforesaid operations, and a safety interlock device operatively connected to and operated by the pillboard actuator to prevent lowering of the ejection plugs until the pillboard has been so manipulated by the pillboard actuator as to seize the pills from the plungers and to grip the same.

62. Automatic molding apparatus comprising a molding press, means to heat the mold, guides extending through said press, a carrier movable along said guides, hydraulic means including power operated control valves for operating the molding press, means to move the carrier along the guides, an intermittently step by step rotated control shaft for properly interrelating the operation of the press and the carrier in order to put the apparatus through repeated molding cycles, one dwell period of said shaft corresponding to curing of the pieces being molded, clock means to start said shaft at the end of the predetermined desired curing time, one revolution of said step by step control shaft corresponding to one complete operating cycle of the apparatus, and temperature responsive means responsive to improper cooling of the mold for stopping the control shaft and shutting down the apparatus at a point between complete cycles of the apparatus, whereby the apparatus is not stopped with molding material in the mold.

63. Automatic molding apparatus comprising a molding press and stripper means, and means for operating said stripper means in consequence of full opening of the press, guides extending through said press, a carrier movable along said guides, hydraulic means including power operated control valves for operating the molding press, means for moving the carrier along the guides, an intermittently step by step operated control shaft for properly interrelating the operation of the press and the carrier in order to put the apparatus through repeated molding cycles, and means operatively connected to and actuated by the movable head of the molding press for interrupting the continued step by step movement of the control shaft, and thereby stopping the apparatus, upon failure of the press to fully open so as to operate the stripper means.

64. Automatic molding apparatus comprising a molding press, a pill press having multiple pill cavities and mating force plugs and ejection plugs, tracks extending through said presses, a pillboard movable along said tracks, said pillboard having pill pockets registerable with the aforesaid pill cavities, hydraulic means including power operated control valves to operate the molding press, means to operate the force plugs, means to operate the ejection plugs, means to move the pillboard from the pill press to the molding press and back again, means including an intermittently step by step rotated control shaft for properly interrelating the aforesaid operations for automatic operation of the complete apparatus, and a safety interlock device including a trackside member and a part on the pillboard cooperating therewith upon return of the pillboard to proper position in the pill press in registration with the pill cavities, said safety interlock device stopping the operation of the apparatus if the pillboard fails to return to proper position in the pill press.

65. Automatic molding apparatus comprising a molding press, a pill press having multiple pill cavities and mating force plugs and ejector plugs, tracks extending through said presses, a pillboard movable along said tracks, said pillboard having pill pockets registerable with the aforesaid pill cavities and having releasable means to grip the pills, an actuator on said pillboard for operating said releasable means, hydraulic means including power operated control valves to operate the molding press, means to operate the force plugs, means to operate the ejection plugs, means to move the pillboard from the pill press to the molding press and back again, an intermittently step by step rotated control shaft for properly interrelating the aforesaid operation for automatic operation of the complete apparatus, and a safety interlock device including means on the aforesaid actuator cooperating with trackside means to stop the control shaft and apparatus, upon failure of the actuator to open the pill gripping means when the pillboard has returned to the pill press.

66. Automatic molding apparatus comprising a molding press, a pill press having multiple pill cavities and mating force plugs and ejection plugs, guides extending through said presses, a pillboard and a powder carrier movable along said guides, said pillboard having pill pockets registerable with the pill cavities when the pillboard is in the pill press, hydraulic means including power operated control valves for operating the molding press, means to operate the force plugs, means to operate the ejection plugs, means including sprocket wheels and a chain to move the pillboard along the guides into the molding press, means to move the powder carrier along the guides, releasable means on said pillboard to grip the pills, means on said powder carrier to discharge the contents thereof into the pill cavities, and means including an intermittently step by step rotated cycle control shaft for properly interrelating the operation of the aforesaid devices in proper sequence for automatic operation of the complete apparatus.

67. Automatic molding apparatus comprising a molding press including a stripper plate operated by full opening of the press, a pill press having multiple pill cavities and mating force plugs and ejection plugs, guides extending through said presses and having downwardly inclined ends beyond said molding press, a catchboard and a pillboard and a powder carrier movable along said guides, said pillboard having pill pockets registerable with the aforesaid pill cavities when the pillboard is in the pill press, hydraulic means including power operated valves to operate the molding press, means to operate the force plugs, means to operate the ejection plugs, means including sprocket wheels and a sprocket chain to move the catchboard and the pillboard along the guides, said catchboard when moved into the partially opened molding press being adapted to receive the molded product stripped by the stripper plate upon full opening of the press, and said catchboard serving to automatically dump the molded product when moved onto the inclined guide ends, releasable means on said pillboard to grip the pills, means on said powder carrier to discharge the contents thereof into the pill cavities, and means including an intermittently step by step rotated cycle control shaft for properly interrelating the operation of the aforesaid devices in proper sequence for automatic operation of the complete apparatus.

68. Automatic molding apparatus comprising a molding press having a multiple cavity mold and a stripper plate, a pill press having multiple pill cavities and mating force plugs and ejection plugs, a powder measurer having multiple powder measuring cups, guides extending beneath said measurer and through said presses and having downwardly inclined ends beyond said molding press, a catchboard and a pillboard and a powder carrier movable along said guides, said pillboard having pill pockets and said powder carrier having powder pockets registerable with the aforesaid mold cavities and pill cavities and measuring cups, hydraulic means including power operated control valves to operate the molding press and stripper plate, means to operate the force plugs, means to operate the ejection plugs, heating means to heat the pill cavities, heating means to heat the molding cavities, means including sprocket wheels and a chain to move the catchboard and pillboard along the guides, releasable means on said pillboard to grip the pills, said powder carrier having means to discharge the powder therefrom into the pill cavities, a supply hopper above the measuring cups for supplying and filling the same with powder, valve means at the measuring cups, means including adjusting screws to provide independent relative adjustment of the volumetric capacity of the measuring cups, and an intermittently step by step rotated control shaft to properly interrelate the operation of the aforesaid devices in proper sequence for automatic operation of the complete apparatus.

69. Apparatus for molding a thermosetting material, said apparatus comprising an unheated powder measuring device, a first press having a preform mold fixed therein, means to heat said preform mold, a second press having a finishing mold fixed therein, means to heat said finishing mold, a powder carrier to transfer a charge of powder measured by the powder measuring device to the preform mold of the first press in order to make the same into a heated preform, a preform carrier to transfer the heated preform from the preform mold of the first press to the finishing mold of the second press for molding the preform to final shape, and means including an intermittently step by step rotated control shaft to automatically cause periodic operation of said carriers and first and second presses, means to stop said shaft during pressing and curing of the pieces in the molds when the presses are closed, and additional independently adjustable timing clock means to start said shaft at the end of a predetermined desired time.

70. Automatic molding apparatus comprising a molding press having an upper head and a downwardly movable stripper means mounted on the upper head for stripping molded pieces downwardly from said head, guides extending through said press, a carrier movable along said guides from a point outside the press to a point inside the press for receiving the downwardly stripped pieces, means for moving the apparatus through repeated molding cycles, and means normally responsive to stripping of the molded pieces from the molding press for interrupting the cycles and stopping the apparatus in the event of failure of the stripper means to act.

71. Automatic molding apparatus comprising a molding press, a pill press having multiple pill cavities with mating force plugs and ejector plugs, tracks extending through said presses, a pillboard movable along said tracks, said pillboard having pill pockets registerable with the aforesaid pill cavities and having releasable means to grip the pills, an actuator on said pillboard for operating said releasable means, hydraulic means including power operated control valves to operate the molding press, means to operate the force plugs, means to operate the ejection plugs, means to move the pillboard from the pill press to the molding press and back again, an intermittently step by step rotated control shaft for properly interrelating the aforesaid operations and causing automatic operation of the apparatus, and a safety interlock device including means on the aforesaid actuator cooperating with trackside means to stop the control shaft and apparatus upon failure of the pillboard to return fully into the pill press and upon failure of the actuator to release or to open the pill gripping means when the pillboard has returned to the pill press.

72. Apparatus for molding thermosetting material, said apparatus comprising an unheated powder measurer having multiple powder measuring cups, a pill press having a pill mold with multiple cavities, means to heat said pill mold, a molding press having a finishing mold with multiple cavities, means to heat the finishing mold, a powder carrier having powder pockets registrable with the aforesaid measuring cups and mold cavities and pill cavities, said carrier serving to transfer charges of powder measured at the measuring cups to the mold of the pill press in order to make the same into heated pills, a pill-carrier to transfer the heated pills from the pill press to the finishing mold in the molding press, and means to cause periodic operation of said measurer, said presses and said carriers, said means including an intermittently step by step rotatable shaft, means to stop said shaft during curing of the pieces being molded while the presses are closed, and additional independently adjustable clock means or timing means to again start said shaft at the end of the predetermined desired curing time.

73. Automatic molding apparatus including a molding press, valves to operate said molding press, a master cycle control shaft for said apparatus, a motor, reduction gearing between said motor and said shaft, and means causing said motor to rotate the shaft with an intermittent step-by-step movement in which each step is only a fraction of one revolution and corresponds to one part of the operating cycle of the apparatus, control devices on said shaft corresponding to different steps in the complete molding cycle, and clock means to automatically time the duration of operation of the valves, one of said control devices functioning to initiate operation of the valves and timing of the valve operation by the aforesaid clock means.

74. Automatic molding apparatus including a molding press, valves to operate said molding press, a master cycle control shaft for said apparatus, means for rotating the shaft with an intermittent step-by-step movement in which each step is only a fraction of one revolution and corresponds to one part of the operating cycle of the apparatus, clock means to automatically time the duration of operation of the valves, means controlled by the position of the cycle control shaft to initiate operation of the valves and timing of the valve operation by the clock means, and safety means to prevent the shaft from being rotated to a succeeding step until the clock-timed operation has been successfully completed, whereby the cycle control shaft gives up its control to the clock means, following which control goes back to the cycle control shaft.

75. Automatic molding apparatus including a molding press, valves to operate said molding press, a master cycle control shaft for said apparatus, a continuously rotating motor, a self-disengaging clutch and reduction gearing between said motor and said shaft for rotating the shaft with an intermittent step-by-step movement in which each step is only a fraction of one revolution and corresponds to one part of the operating cycle of the apparatus, control devices on said shaft corresponding to different steps in the complete molding cycle, and safety means to prevent the shaft from being rotated to a succeeding step until the cycle part corresponding to the preceding step has been successfully completed, whereby the timing of the steps in the step-by-step movement of the shaft may be non-uniform.

76. Automatic molding apparatus including a molding press, valves to operate said molding press, a master cycle control shaft for said apparatus, a continuously rotating motor, a self-disengaging clutch and reduction gearing between said motor and said shaft for rotating the shaft with an intermittent step-by-step movement in which each step is only a fraction of one revolution and corresponds to one part of the operating cycle of the apparatus, control devices on said shaft corresponding to different steps in the complete molding cycle, clock means to automatically time the duration of operation of the valves, one of said control devices functioning to initiate operation of the valves and timing of the valve operation by the clock means, and means to prevent the shaft from being rotated to a succeeding step until the cycle part corresponding to the timed valve operation has been successfully completed, whereby the timing of the step-by-step movement of the shaft is non-uniform and at one or more steps depends on the timing of the clock means.

77. Automatic molding apparatus comprising a molding press, a pill press, means for conveying the pills from the pill press to the molding press, a powder measurer including a plurality of measuring cups, means to transfer the measured powder from the cups to the pill press, a powder box above the measuring cups for gravitationally supplying molding powder to the cups, means to operate the aforesaid apparatus through automatically repeated molding cycles, a high speed vibrator secured to the measurer in order to impart thereto a high-speed vibration of substantially imperceptible amplitude, thereby insuring complete filling and complete emptying thereof, and means to start the vibrator upon operation of the powder measurer, and to stop it thereafter, during each molding cycle of the complete apparatus.

GORDON B. SAYRE.